| (12) | United States Patent | (10) Patent No.: | US 11,388,882 B2 |
|---|---|---|---|
| | Krone et al. | (45) Date of Patent: | *Jul. 19, 2022 |

(54) SPACE DIVIDER OF A MILKING PARLOR ARRANGEMENT, AND MILKING PARLOR ARRANGEMENT

(71) Applicant: GEA Farm Technologies GmbH, Bönen (DE)

(72) Inventors: Otto Krone, Ibbenbüren (DE); Derk Hensel, Jessen (DE); Thomas Mader, Rheda-Wiedenbrück (DE); Rolf Teckentrup, Oelde (DE); Armin Hönscheid, Bönen (DE); Dieter Hille, Oelde (DE); Magnus Wiethoff, Oelde (DE); Marc Trossehl, Werne (DE); Reinhard Balkenhol, Paderborn (DE); Adib Matty, Essen (DE)

(73) Assignee: GEA FARM TECHNOLOGIES GMBH, Bönen (DE)

( * ) Notice: Subject to any disclaimer, the term of this patent is extended or adjusted under 35 U.S.C. 154(b) by 191 days.

This patent is subject to a terminal disclaimer.

(21) Appl. No.: 15/720,405

(22) Filed: Sep. 29, 2017

(65) Prior Publication Data

US 2018/0020632 A1 Jan. 25, 2018

Related U.S. Application Data

(63) Continuation of application No. 14/384,352, filed as application No. PCT/EP2013/055288 on Mar. 14, 2013, now Pat. No. 9,918,450.

(30) Foreign Application Priority Data

Mar. 14, 2012 (DE) ..................... 10 2012 102 132.5
Nov. 2, 2012 (DE) ..................... 10 2012 110 503.0

(51) Int. Cl.
*A01J 5/003* (2006.01)
*A01J 5/04* (2006.01)
(Continued)

(52) U.S. Cl.
CPC ............... *A01J 5/041* (2013.01); *A01J 5/003* (2013.01); *A01J 5/007* (2013.01); *A01J 5/017* (2013.01);
(Continued)

(58) Field of Classification Search
CPC .... A01J 5/00; A01J 5/003; A01J 5/017; A01J 5/0175
(Continued)

(56) References Cited

U.S. PATENT DOCUMENTS 1,525,837 A 2/1925 Walker et al.
2,357,373 A 9/1944 Anderson
(Continued)

FOREIGN PATENT DOCUMENTS

DE 3931769 4/1991
DE 4101530 A1 7/1992
(Continued)

OTHER PUBLICATIONS

Non-Final Office Action dated Apr. 24, 2019, U.S. Appl. No. 14/384,678, 22 pages.
(Continued)

*Primary Examiner* — David J Parsley
(74) *Attorney, Agent, or Firm* — Patent Portfolio Builders PLLC

(57) ABSTRACT

A space divider of a milking parlor arrangement for at least one milking parlor for milking milk-producing animals, wherein the space divider is arranged approximately parallel to a longitudinal axis of the animal to be milked, has an arm device having a milking cluster, which can be adjusted from (Continued)

a parking position to a working position and back. The arm device is arranged with the milking cluster in the parking position in the space divider and can be adjusted into the working position laterally to the animal to be milked between the front and rear legs thereof. The space divider may include a replaceable service unit.

40 Claims, 43 Drawing Sheets

(51) Int. Cl.
  *A01K 1/12* (2006.01)
  *A01J 5/017* (2006.01)
  *A01J 7/02* (2006.01)
  *A01J 5/007* (2006.01)
(52) U.S. Cl.
  CPC .............. *A01J 5/0175* (2013.01); *A01J 7/02* (2013.01); *A01J 7/025* (2013.01); *A01K 1/12* (2013.01); *A01K 1/123* (2013.01); *A01K 1/126* (2013.01)
(58) Field of Classification Search
  USPC .......... 119/14.01, 14.03, 14.04, 14.08, 14.18
  See application file for complete search history.

(56) References Cited

U.S. PATENT DOCUMENTS

| | | |
|---|---|---|
| 3,100,475 A | 8/1963 | Edge |
| 3,448,725 A | 6/1969 | Holm et al. |
| 3,861,355 A | 1/1975 | Johnson et al. |
| 3,870,021 A | 3/1975 | Nederbragt |
| 4,171,684 A | 10/1979 | Herr et al. |
| 4,401,055 A | 8/1983 | Street et al. |
| 4,459,940 A | 6/1984 | Noorlander |
| 4,479,453 A | 10/1984 | Bonassi |
| 4,508,058 A | 4/1985 | Jakobson et al. |
| 4,838,207 A | 6/1989 | Fraas et al. |
| 4,854,268 A | 8/1989 | Kipe |
| 4,941,433 A | 7/1990 | Hanauer |
| 5,042,428 A | 8/1991 | Van Der Lely et al. |
| 5,056,466 A | 10/1991 | Dessing et al. |
| 5,080,040 A * | 1/1992 | van der Lely .......... A01J 5/007 119/14.09 |
| 5,383,423 A | 1/1995 | Van Der Lely |
| 5,524,572 A | 6/1996 | Dessing et al. |
| 5,586,518 A | 12/1996 | Carrano |
| 5,595,945 A | 1/1997 | Wicks |
| 5,596,945 A | 1/1997 | Van Der Lely |
| 5,606,932 A | 3/1997 | Van Der Lely |
| 5,678,506 A | 10/1997 | Van Der Berg |
| 5,697,324 A | 12/1997 | Van Der Lely |
| 5,718,185 A | 2/1998 | Pichler et al. |
| 5,718,186 A | 2/1998 | Van Der Lely |
| 5,784,994 A | 7/1998 | Van Der Lely |
| 5,826,536 A | 10/1998 | Van Der Lely et al. |
| 5,862,776 A | 1/1999 | Van Den Berg |
| 5,918,566 A | 7/1999 | Van Den Berg |
| 5,950,561 A | 9/1999 | Redmond et al. |
| 5,979,359 A | 11/1999 | Hansson |
| 6,044,793 A | 4/2000 | Van Der Lely |
| 6,050,219 A | 4/2000 | Van Der Lely |
| 6,116,188 A | 9/2000 | Van Der Lely |
| 6,148,766 A | 11/2000 | Van Der Lely |
| 6,205,949 B1 | 3/2001 | Van Den Berg |
| 6,213,051 B1 | 4/2001 | Fransen |
| 6,244,215 B1 | 6/2001 | Oosterling |
| 6,269,766 B1 | 8/2001 | Birk |
| 6,279,507 B1 | 8/2001 | Van Der Lely et al. |
| 6,336,424 B1 | 1/2002 | Kullberg et al. |
| 6,357,387 B1 | 3/2002 | Johannesson |
| 6,363,883 B1 | 4/2002 | Birk |
| 6,382,130 B1 | 5/2002 | Rooney |
| 6,386,141 B1 | 5/2002 | Forsen et al. |
| 6,532,893 B1 | 3/2003 | Edholm |
| 6,584,929 B2 | 7/2003 | Van Der Lely et al. |
| 6,684,809 B1 | 2/2004 | Sjolund |
| 6,814,027 B2 | 11/2004 | Hein et al. |
| 6,814,224 B2 | 11/2004 | Garbagnati |
| 6,843,203 B2 | 1/2005 | Johannesson et al. |
| 7,104,218 B2 | 9/2006 | Teckentrup et al. |
| 7,131,394 B2 | 11/2006 | Johannesson et al. |
| 7,246,571 B2 | 7/2007 | Van Den Berg et al. |
| 7,699,024 B2 | 4/2010 | Rysewyk et al. |
| 7,762,405 B2 | 7/2010 | Vogel et al. |
| 7,874,263 B2 | 1/2011 | Schulte |
| 8,015,941 B2 | 9/2011 | Hallström |
| 8,205,574 B2 | 6/2012 | Danneker et al. |
| 8,210,122 B2 * | 7/2012 | Pettersson ............. A01J 5/0175 119/14.08 |
| 8,281,744 B2 | 10/2012 | Van Den Berg |
| 8,281,746 B2 | 10/2012 | Nilsson et al. |
| 8,286,583 B2 | 10/2012 | Van Den Berg |
| 8,393,296 B2 * | 3/2013 | Hofman .................... A01J 7/04 119/14.08 |
| 8,438,992 B2 | 5/2013 | Auburger |
| 8,601,979 B2 | 12/2013 | Van Der Sluis |
| 8,646,412 B2 | 2/2014 | Eriksson |
| 8,670,867 B2 | 3/2014 | Seaton et al. |
| 8,704,396 B2 | 4/2014 | Leijon et al. |
| 9,107,378 B2 | 8/2015 | Hofman |
| 9,161,512 B2 | 10/2015 | Hofman |
| 9,215,858 B2 | 12/2015 | Johannesson et al. |
| 9,215,861 B2 | 12/2015 | Hofman et al. |
| 9,402,364 B2 | 8/2016 | Seaton et al. |
| 9,426,966 B2 | 8/2016 | Krone |
| 9,491,924 B2 | 11/2016 | Hofman |
| 9,549,530 B2 | 1/2017 | Harty et al. |
| 9,681,634 B2 | 6/2017 | Hofman et al. |
| 9,730,424 B2 | 8/2017 | Krone et al. |
| 9,848,576 B2 | 12/2017 | Krone et al. |
| 9,918,450 B2 | 3/2018 | Krone et al. |
| 10,154,645 B2 | 12/2018 | Foresman et al. |
| 10,440,931 B2 | 10/2019 | Krone |
| 10,694,717 B2 | 6/2020 | Krone et al. |
| 10,849,304 B2 | 12/2020 | Krone et al. |
| 2001/0028021 A1 | 10/2001 | Martin |
| 2002/0033137 A1 | 3/2002 | Van Der Lely et al. |
| 2002/0189547 A1 | 12/2002 | Eppers, Jr. et al. |
| 2004/0050331 A1 | 3/2004 | Hein et al. |
| 2004/0168645 A1 | 9/2004 | Deelstra |
| 2005/0066904 A1 | 3/2005 | Berg |
| 2005/0072363 A1 | 4/2005 | Van Der Lingen |
| 2007/0277737 A1 | 12/2007 | Maier |
| 2008/0149034 A1 | 6/2008 | Van Den Berg |
| 2008/0178811 A1 * | 7/2008 | Heinrich ............... A01J 5/0175 119/14.04 |
| 2009/0007850 A1 | 1/2009 | Mehinovic |
| 2010/0058990 A1 | 3/2010 | Danneker et al. |
| 2010/0186676 A1 | 7/2010 | Van Den Berg |
| 2010/0326361 A1 | 12/2010 | Van Den Berg |
| 2011/0048329 A1 | 3/2011 | Van Den Berg |
| 2011/0061596 A1 | 3/2011 | Nilsson et al. |
| 2011/0114024 A1 | 5/2011 | Van Den Berg |
| 2012/0055408 A1 | 3/2012 | Van Der Sluis et al. |
| 2012/0275894 A1 | 11/2012 | Hofman |
| 2013/0061807 A1 | 3/2013 | Axelsson |
| 2013/0112142 A1 | 5/2013 | Harty et al. |
| 2013/0112145 A1 | 5/2013 | Carroll et al. |
| 2013/0152861 A1 | 6/2013 | Johannesson et al. |
| 2014/0041591 A1 | 2/2014 | Krone |
| 2014/0060436 A1 | 3/2014 | Krone |
| 2015/0020738 A1 | 1/2015 | Krone et al. |
| 2015/0020739 A1 | 1/2015 | Krone et al. |
| 2015/0059649 A1 | 3/2015 | Van Der Sluis |
| 2015/0189854 A1 | 7/2015 | Krone |
| 2015/0296737 A1 | 10/2015 | Krone et al. |
| 2015/0373943 A1 | 12/2015 | Hofman |
| 2017/0042110 A1 | 2/2017 | Krone et al. |

(56) References Cited

U.S. PATENT DOCUMENTS

| | | | |
|---|---|---|---|
| 2017/0086419 | A1 | 3/2017 | Krone et al. |
| 2018/0249670 | A1 | 9/2018 | Krone |

FOREIGN PATENT DOCUMENTS

| | | | |
|---|---|---|---|
| DE | 4113700 | A1 | 10/1992 |
| DE | 4237949 | A1 | 5/1994 |
| DE | 4339131 | A1 | 5/1995 |
| DE | 29522237 | | 12/2000 |
| DE | 102006027919 | | 12/2006 |
| DE | 102006049948 | A1 | 4/2007 |
| DE | 102008063751 | A1 | 7/2009 |
| DE | 202012005042 | U1 | 10/2013 |
| DE | 60106877 | T3 | 6/2014 |
| EP | 0576085 | A2 | 12/1993 |
| EP | 0647390 | | 4/1995 |
| EP | 0647391 | A2 | 4/1995 |
| EP | 0689762 | A1 | 1/1996 |
| EP | 689762 | A1 | 1/1996 |
| EP | 0736246 | A1 | 10/1996 |
| EP | 0734649 | A2 | 3/1997 |
| EP | 0811319 | | 12/1997 |
| EP | 0689762 | | 8/2000 |
| EP | 0657097 | | 2/2002 |
| EP | 0862360 | | 3/2003 |
| EP | 1084611 | B1 | 9/2004 |
| EP | 0551960 | | 9/2006 |
| EP | 1263283 | B2 | 3/2014 |
| EP | 3335548 | A1 | 6/2018 |
| EP | 1266565 | A1 | 12/2018 |
| GB | 1383038 | | 2/1975 |
| RU | 2244417 | C2 | 1/2005 |
| RU | 2279796 | C2 | 7/2006 |
| WO | 93/13651 | | 7/1993 |
| WO | 94/23565 | | 10/1994 |
| WO | 96/01041 | | 1/1996 |
| WO | 96/17314 | | 3/1996 |
| WO | 96/19916 | | 7/1996 |
| WO | 96/19917 | | 7/1996 |
| WO | 98/04121 | | 2/1998 |
| WO | 98/05201 | | 2/1998 |
| WO | 98/31212 | | 7/1998 |
| WO | 98/46069 | A1 | 10/1998 |
| WO | 00/13492 | A1 | 3/2000 |
| WO | 00/13495 | | 3/2000 |
| WO | 01/67852 | | 9/2001 |
| WO | 02/15676 | | 2/2002 |
| WO | 2007/1114778 | | 10/2007 |
| WO | 2008/030084 | A2 | 3/2008 |
| WO | 2008/118068 | A1 | 10/2008 |
| WO | 2010/052156 | A1 | 5/2010 |
| WO | 2011/098454 | A1 | 8/2011 |
| WO | 2011/098994 | | 8/2011 |
| WO | WO 2013/135842 | A1 | 9/2013 |

OTHER PUBLICATIONS

Non-Final Office Action dated Jun. 28, 2019, U.S. Appl. No. 14/384,668, 15 pages.

Non-Final Office Action dated Sep. 12, 2019, U.S. Appl. No. 15/971,187, 32 pages.

Non-Final Office Action dated Jan. 4, 2018, U.S. Appl. No. 14/384,678, 29 pages.

German Search Report dated Feb. 2, 2015 for German Application No. 10 2014 107 124.7, 6 pages.

Extended European Search Report for EP Application No. 18154736 dated May 2, 2018, 1 page.

Final Office Action dated Sep. 21, 2018, U.S. Appl. No. 14/384,678, 23 pages.

Final Office Action dated Sep. 21, 2018, U.S. Appl. No. 14/384,668, 24 pages.

Germania Home Page on Jul. 28, 2005, http://www.germaniadairy.com/, 1 page.

Boumatic Home Page on Jul. 28, 2005, http://www.bou-matic.com/html/gallery/rotary_curtin.htm, 2 pages.

WestfaliaSurge brochure "External Autorotor" dated Jan. 2001, 22 pages.

Germania sales brochure "Introducing—Profundly Productive Pro-Time Parlors From Germania: Milking Parlors for the Next Century—And Beyond?" printed Nov. 1996, 8 pages.

Germania Dutch brochure "Vele Nederlandse melkveehouders ginge u voor!: Germania Melksystemen de trots van eleke veehouder", 6 pages.

"Offer of Germania milking systems VOF, Oude Lievervelderweg2. 7137 MA Lievelde, NL, to Mr Hummel, Am Milchweg 01,Ivenack, DE, dated Aug. 12, 1997, 10 pages."

"Fax cover sheet of a Germania milking system VOF fax,Lievelde, NL, sent to M. Hummel Jul. 10, 1997, 1 page."

Germania Final Quality Control/Inspection Certificate, dated Oct. 9, 1999, 1 page.

Germania technical drawing titled "Protime I Stall" dated May 10, 1997, 1 page.

Photos of a Germania double-herringbone parlor installed in Hummel GmbH cattle plant in 1999, 13 pages.

Westfalia Landtechnik GmbH advertising brochure "AutoRotor—Milk Carousel Systems" publication date Feb. 1997, 12 pages.

Westfalia Separator AG order confirmation and invoice dated Aug. 17, 1995, 22 pages.

Photos of a Westfalia Separator AG milking parlor installation at the Birkholz Estate, dated Sep. 2018, 7 pages.

"Reflections: A history of DeLaval" 5 pages.

International Search report for International Application No. PCT/EP2013/055265 dated May 28, 2013, 7 pages.

International Search report for International Application No. PCT/EP2013/055272 dated May 28, 2013, 9 pages.

International Search Report in for International Application No. PCT/EP2013/055288 dated May 24, 2013, 9 pages.

International Search Report for PCT Application No. PCT/EP2013/055270 dated May 28, 2013, 13 pages.

German Search Report dated Feb. 17, 2012 from German Patent Application No. 102011001404.7, 6 pages.

International Preliminary Report on Patentability and Written Opinion for PCT/EP2012/054645, English translation dated Sep. 24, 2013, 6 pages.

Non-Final Office Action dated Sep. 24, 2015, U.S. Appl. No. 14/002,076, 8 pages.

Non-Final Office Action dated Feb. 10, 2017, U.S. Appl. No. 15/247,544, 7 pages.

Non-Final Office Action dated Apr. 7, 2016, U.S. Appl. No. 14/002,610, 7 pages.

Non-Final Office Action dated Jun. 2, 2017, U.S. Appl. No. 14/002,610, 10 pages.

Final Office Action dated Dec. 19, 2016, U.S. Appl. No. 14/002,610, 6 pages.

Final Office Action dated Feb. 27, 2017, U.S. Appl. No. 14/384,678, 15 pages.

Non-Final Office Action dated Mar. 11, 2016, U.S. Appl. No. 14/384,678, 15 pages.

Non-Final Office Action dated Dec. 7, 2016, U.S. Appl. No. 14/384,676 15 pages.

International Search Report for PCT/EP2015/061087 dated Sep. 9, 2015.

Non-Final Office Action dated Oct. 26, 2017, U.S. Appl. No. 14/384,668, 23 pages.

Ex Parte Quayle Action issued Mar. 6, 2020, U.S. Appl. No. 14/384,668, 17 pages.

Final Office Action dated Apr. 14, 2020, U.S. Appl. No. 15/971,187, 12 pages.

Notice of Allowance dated Jul. 23, 2020, U.S. Appl. No. 14/384,668, 13 pages.

Non-Final Office Action dated Sep. 11, 2020, U.S. Appl. No. 15/971,187, 15 pages.

Corrected Notice of Allowability dated Sep. 8, 2020, U.S. Appl. No. 14/384,668, 8 pages.

(56) References Cited

OTHER PUBLICATIONS

Sep. 14, 2020 EPO Office action in case: 19 168 642.7-1004, 5 pages.

* cited by examiner

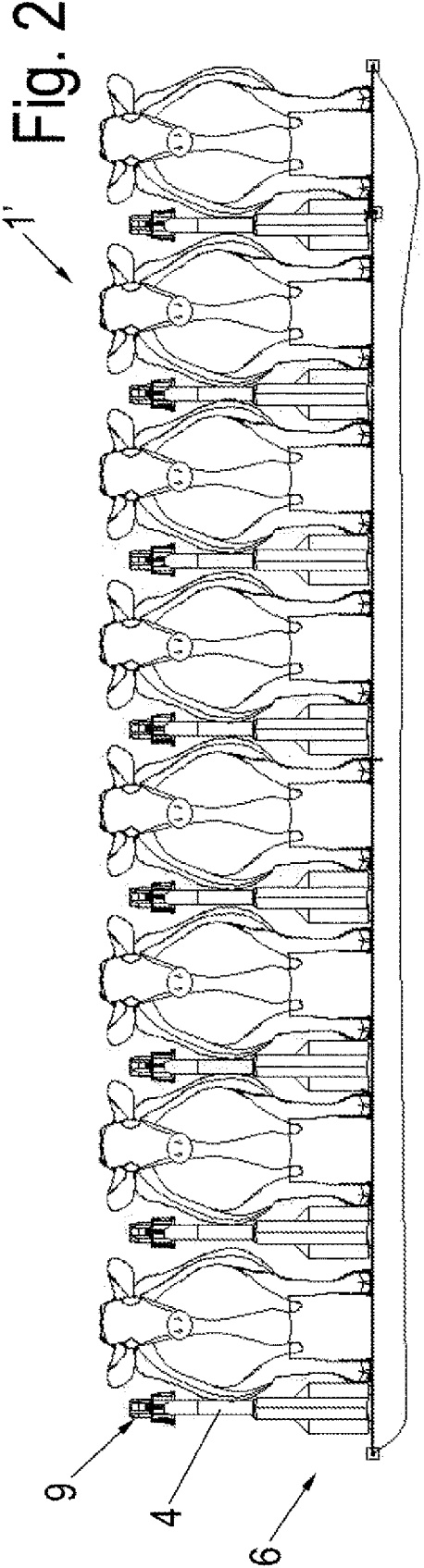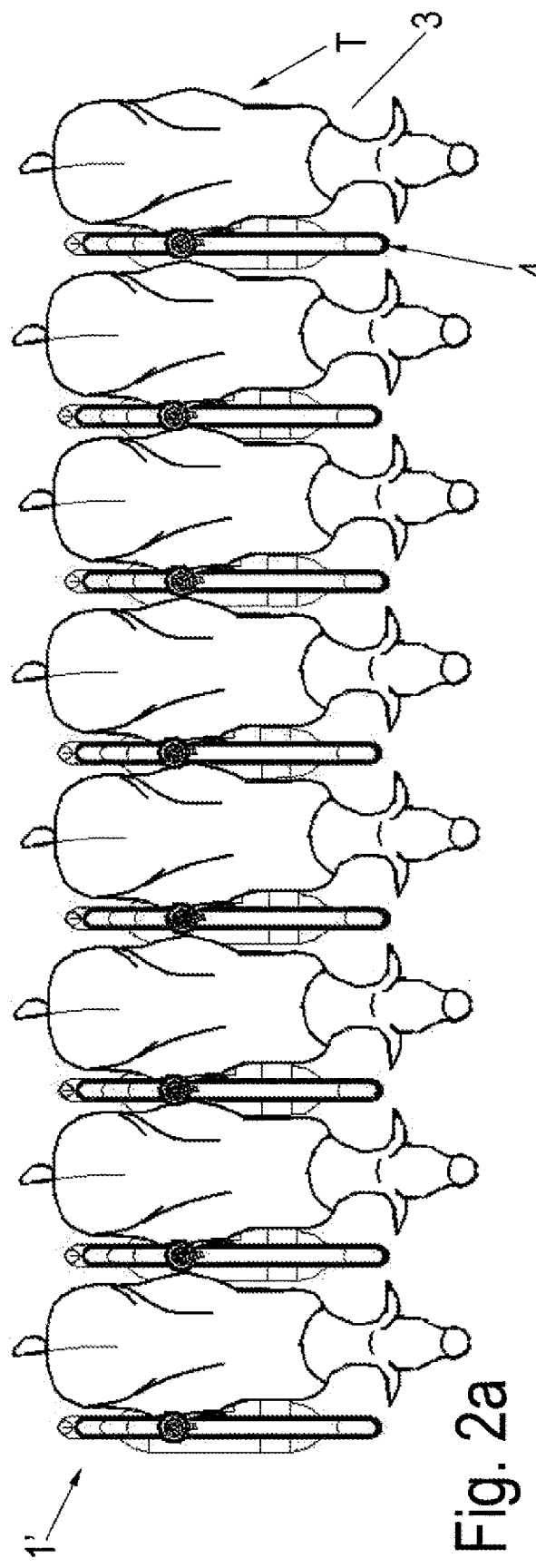

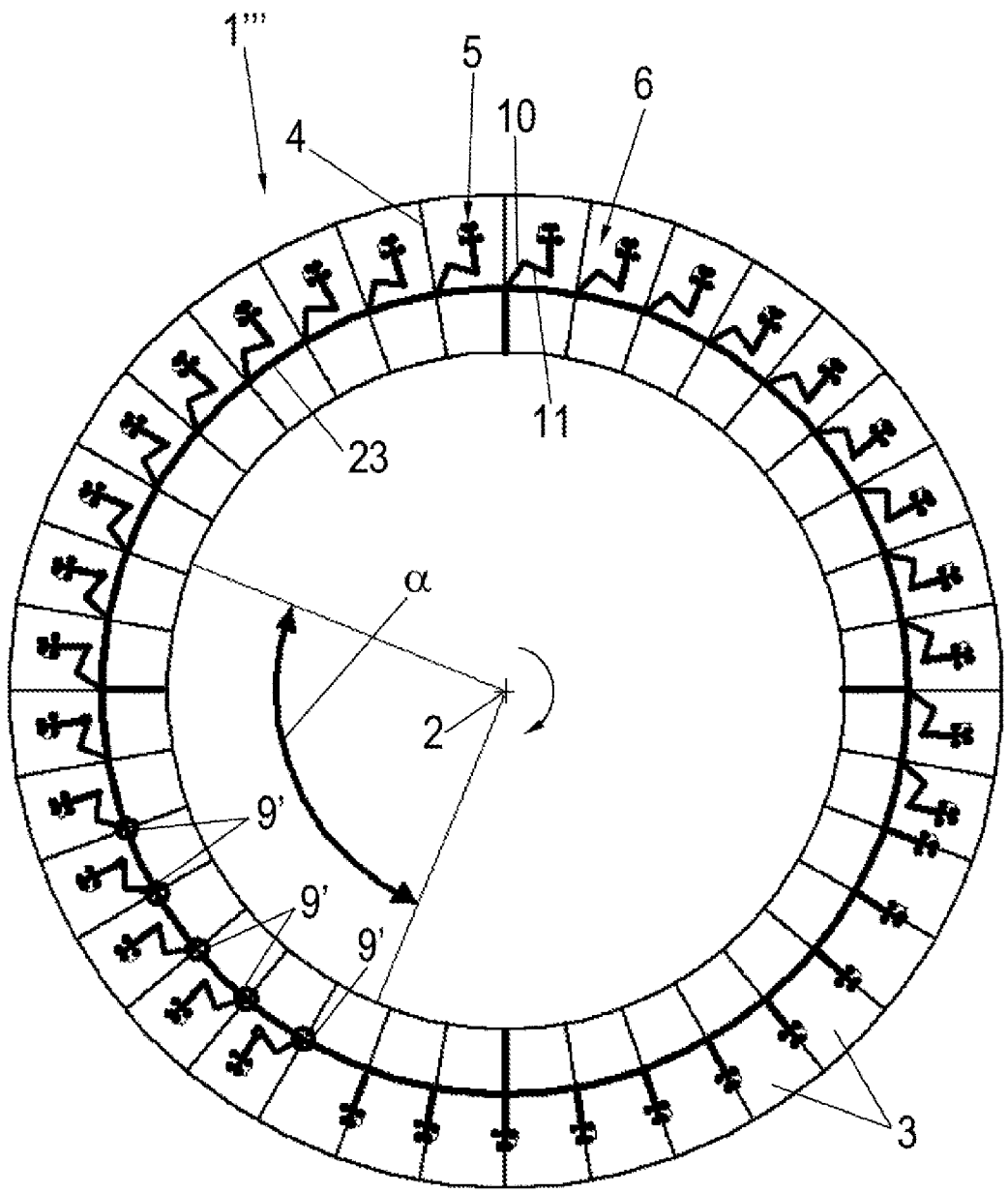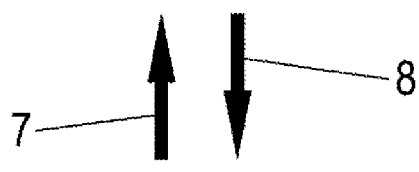
Fig. 14

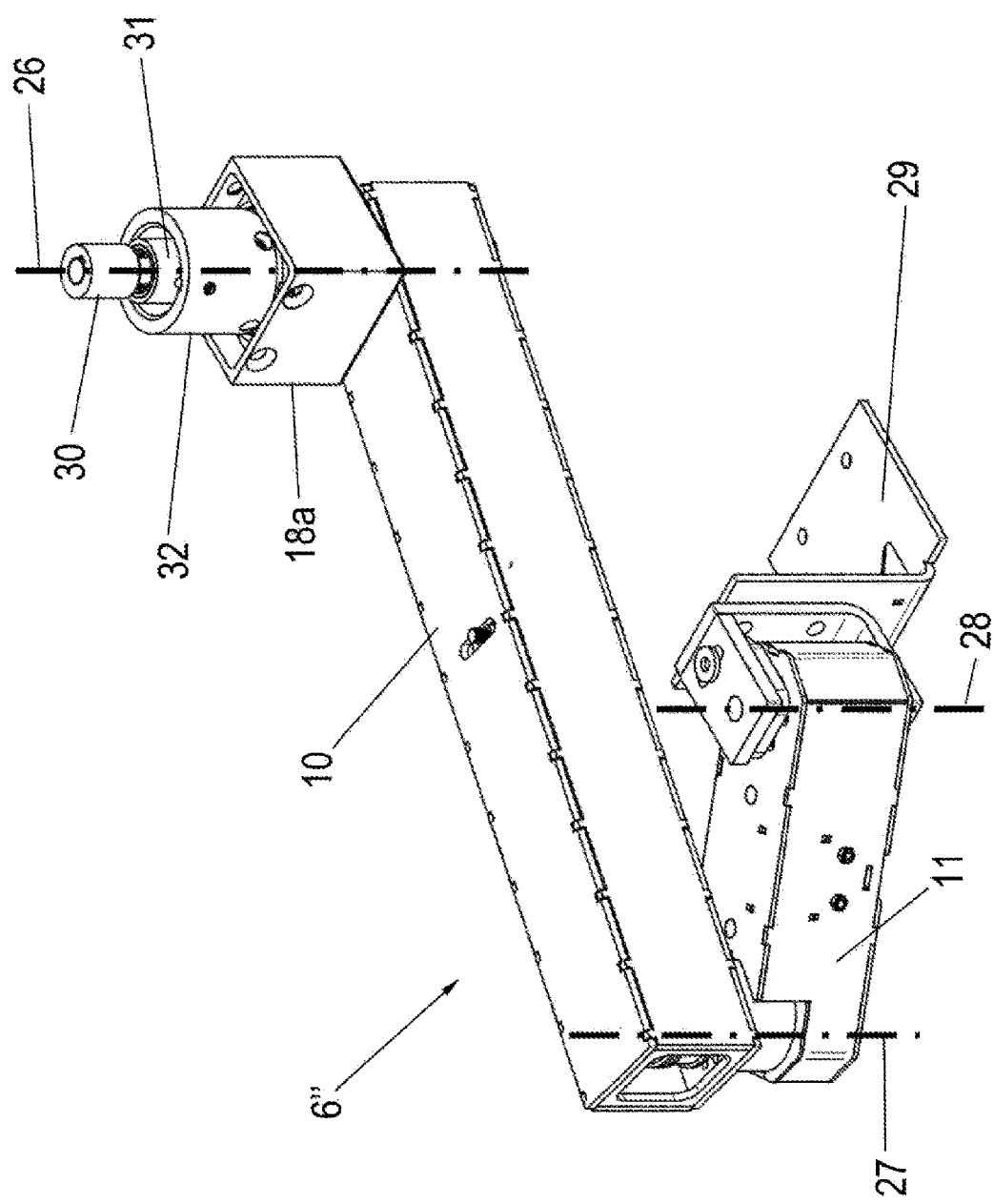

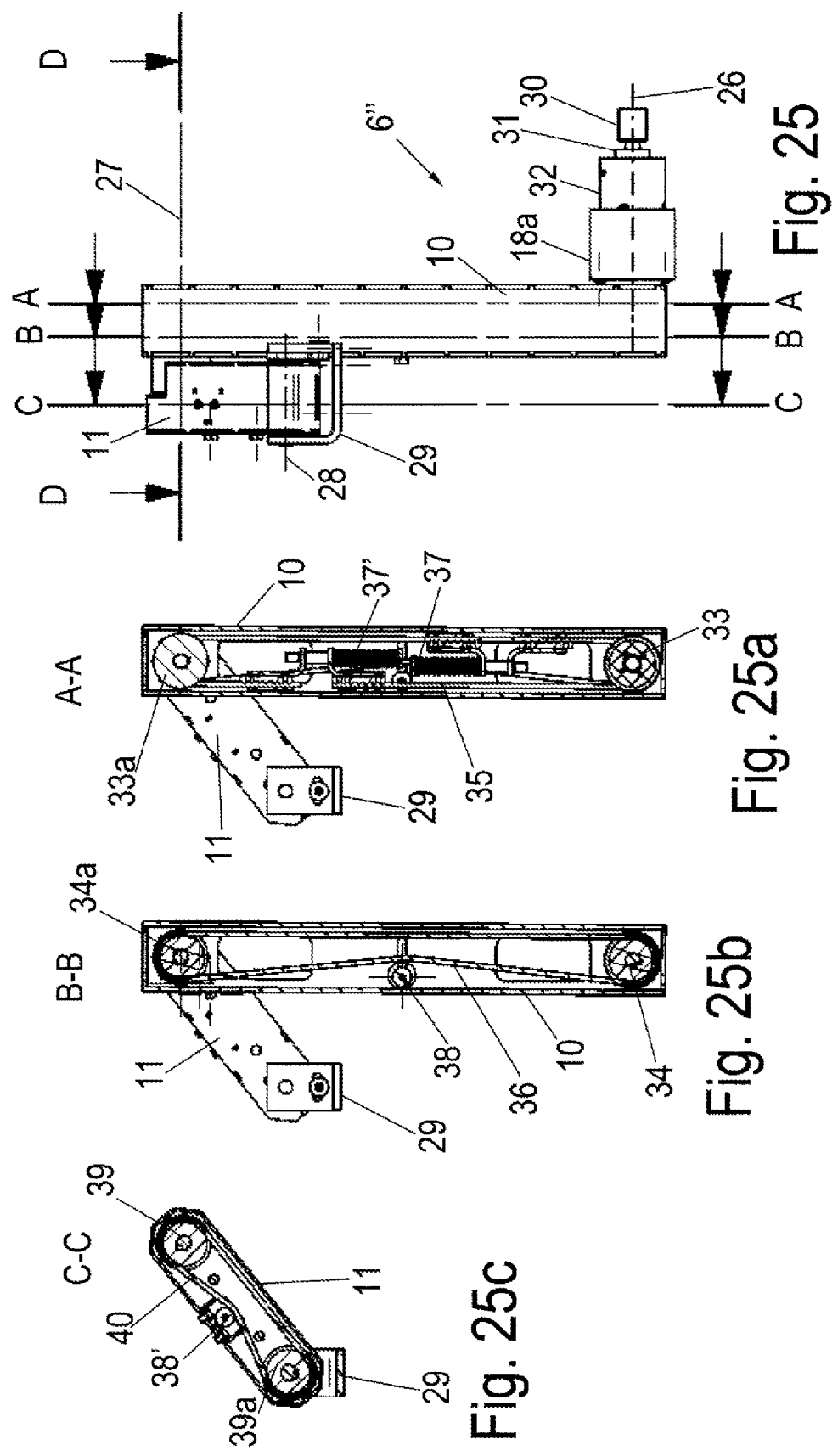

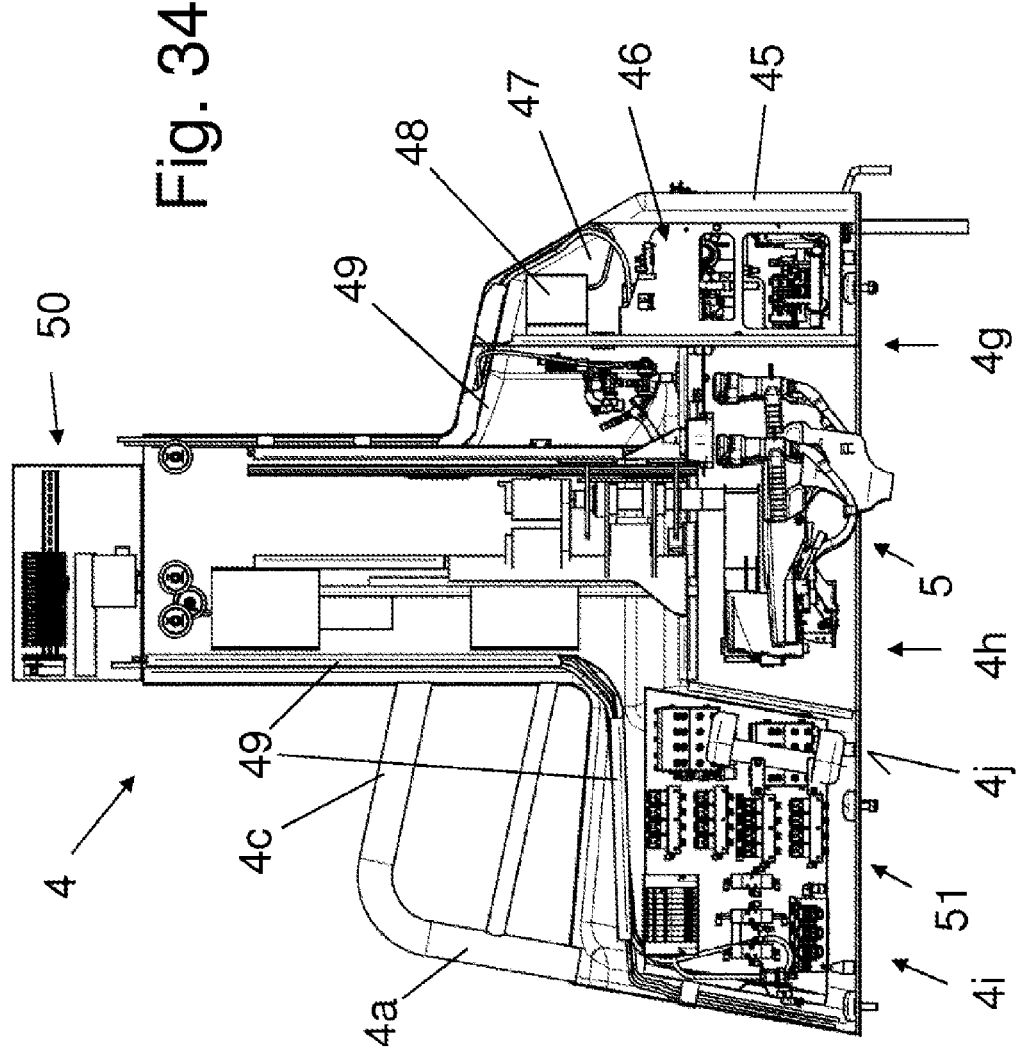

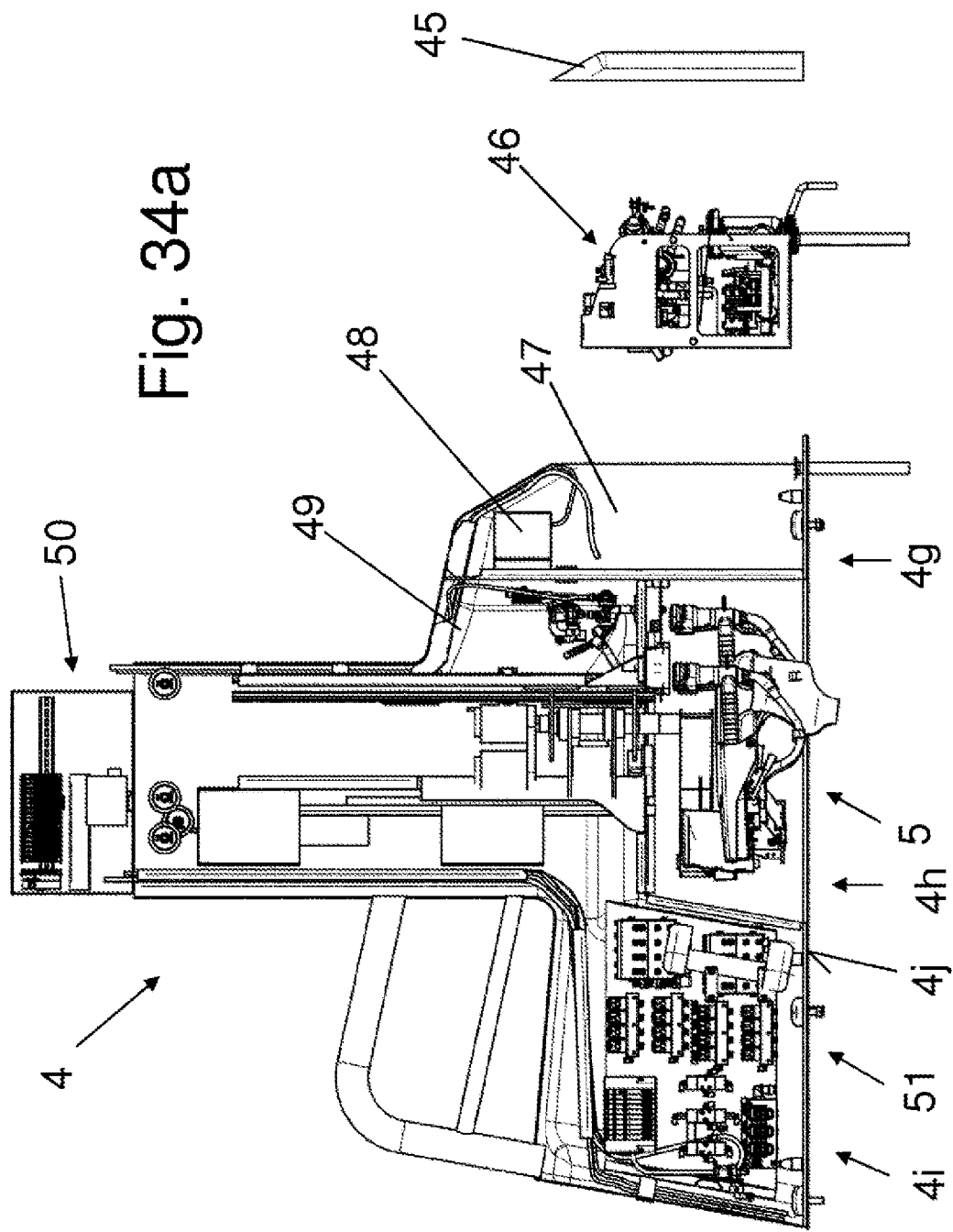

SPACE DIVIDER OF A MILKING PARLOR ARRANGEMENT, AND MILKING PARLOR ARRANGEMENT

CROSS REFERENCE TO RELATED APPLICATIONS

This application is a continuation of U.S. application Ser. No. 14/384,352 filed Sep. 10, 2014, which is a national phase application under 35 U.S.C. § 371 of PCT International Application No. PCT/EP2013/055288 filed Mar. 14, 2013, which claims priority to German Application No. 10 2012 110 503.0 filed Nov. 2, 2012, and German Application No. 10 2012 102 132.5 filed Mar. 14, 2012, the disclosures of which are incorporated by reference herein.

FIELD AND BACKGROUND OF THE INVENTION

The invention relates to a divider of a milking parlor according to the preamble of claim 1. The invention is concerned with a milking parlor.

Such a milking parlor is used for the mechanical milking of milk-producing animals. Examples of milk-producing animals are cows, goats, sheep, etc. The milking parlor has milking stalls which are separated by dividers. The milking operation can be automated by means of so-called milking robots. Use is made, for example, of rotary milking parlors.

The expression milking parlor is to be understood as constituting arrangements of milking stalls, wherein an angled position of an animal which is to be milked, or an angled position of an imaginary longitudinal axis of an animal which is to be milked, in a milking stall in relation to a reference point or to a reference line may be between 0° and 90°. An example of a reference point used is a pit or a region accessible to staff (e.g. an aisle), which is the location where the milking staff are stationed. An example of a reference line used is the longitudinal side of a rectilinear pit or a tangent to a circular pit.

Milking parlors are, for example, mobile and fixed. Examples of mobile milking parlors are rotary milking parlors in the form of external milking parlors and internal milking parlors, both with any desired direction of rotation. So-called side-by-side milking parlors may also be designed in mobile form. There are also group milking parlors which are fixed, e.g. fishbone milking parlors and tandem milking parlors. This listing is given merely by way of example and is not limiting.

EP 1 084 611 B1 describes a robot-arm structure with a pivotable carrying unit for a milking cluster. The structure can be moved on one or more rails along one or more milking boxes.

The low throughput of milked cows/animals per hour means that the existing automation technology is suitable only to a limited extent, if at all, for large installations. The ever increasing requirements in particular for high throughput numbers and continuous operation require today's milking robots, which are complex and costly, to be used for a number of milking stalls together. This can have a disadvantageous effect, inter alia on account of high complexity levels, and the associated high probability of failure, discontinuous operation and regions barred to staff (safety in the robot area).

SUMMARY OF THE INVENTION

Against this background, it is an object of the invention to provide an improved milking parlor and a milking stall and to improve the possible throughput.

A divider according to the invention of a milking parlor for at least one milking stall for milking milk-producing animals, wherein the divider is arranged more or less parallel to a longitudinal axis of the animal which is to be milked, has a with a milking cluster which can be adjusted from a parked position into an operating position and back. The arm device of the milking cluster here, in the parked position, is arranged in the divider and can be adjusted laterally in relation to the animal which is to be milked, between the front and hind legs of the latter, into the operating position.

A further divider according to the invention of a milking parlor for at least one milking stall for milking milk-producing animals is arranged on a longitudinal side of the milking stall and has an arm device with a milking cluster which can be adjusted from a parked position into an operating position and back. The arm device is arranged with the milking cluster, in the parked position, in the divider and can be adjusted laterally in relation to an animal which is to be milked, between the front and hind legs of the latter, into the operating position.

In the case of a milking parlor having right-angled milking stalls arranged one beside the other, said milking stalls each having parallel longitudinal sides, as is the case, for example, in a side-by-side arrangement, the divider is arranged parallel to an imaginary longitudinal axis of the animal which is to be milked. It is assumed here, to simplify matters, that the imaginary longitudinal axis of the animal which is to be milked is at a standstill, in an ideal state, during the milking operation.

In the case of a milking parlor having milking stalls arranged in a circle, as in the case of a rotary milking parlor, the longitudinal sides of the milking stalls are not parallel. In this case, the longitudinal sides are portions of radii of a circle of the rotary milking parlor and intersect, in an imaginary extension, at the center point of said circle or at the point of rotation of the rotary milking parlor, forming a center-point angle in the process. The imaginary longitudinal axis of the animal which is to be milked, ideally, also runs through the point of rotation and bisects the center-point angle. This case is indicated for short hereinbelow by the expression "more or less parallel".

An animal which is to be milked can enter into the milking stall provided with the divider without coming into contact with the arm device. It is only when the animal is standing in the milking stall that the milking cluster is adjusted from the side into the operating position beneath the animal. For this purpose, it may be necessary for the entire divider to be displaced from a rest position, during animal changeover, into an ideal milking position for the new animal, for example in the longitudinal direction of the divider. The divider is designed such that there is no additional need for space. This gives the advantage that the animals can still stand belly to belly. This has further advantages: on the one hand, it is possible, in this way, for a large number of animals to be milked in the smallest possible amount of space, as a result of which costs for the milking parlor and also for the associated building can be kept low. On the other hand, the distances over which milking staff and the animals have to walk remain shorter, i.e. time is saved.

With the adjustment of the arm device with the milking cluster from the side, between the front legs and hind legs, beneath and animal's udder, the milking cluster is displaced outside the region between the hind legs. In the region between the hind legs, there is a vastly increased risk of contamination by animal excrement. This region is avoided, then, which considerably reduces contamination of the milking cluster and of the arm device. This also cuts back on cleaning times and thus costs.

A further advantage of this compact construction is that it is possible for the divider to be retrofitted, in existing installations without milking stalls/space being lost.

Staff have easy access and can intervene in the milking operation at any time without being obstructed by equipment, i.e. the carrying-arm device and accessories. There is no need for any additional protective apparatuses. If the milking parlor is a rotary milking parlor, this can maintain its rotary operation without interruption since the milking staff can intervene at all points for example from outside. Any risk to the milking staff is considerably reduced.

In one embodiment, the arm device can be adjusted fully automatically from the parked position, in the operating position, into an attachment position for the automatic attachment of the milking cluster to the teats of the animal which is to be milked, wherein the milking cluster has at least one position sensor. The milking cluster here is moved, by the arm device, beneath the udder of the animal which is to be milked, and the teat cups are attached automatically to the teats with the aid of the teat-detecting position sensor, the arm device and the drive unit. This operation is also referred to as automatic operation.

Each of the teat cups can be positioned individually here.

As an alternative, another embodiment provides that the arm device can be adjusted semi-automatically from the parked position into the operating position, wherein the operating position is a fixed preliminary position which can be defined beforehand by stop means, wherein the milking cluster, in the preliminary position, is positioned in a manner advantageous for a milker. The milking cluster here is adjusted, with the aid of straightforward drive means, e.g. pneumatic cylinders, provided with adjustable stops, into a fixed preliminary position, which is easy for the milking staff to access, beneath the udder of the animal which is to be milked. It is then possible for the milker, standing behind the animal, to grip the teat cups straightforwardly and easily and attach them to the teats. As soon as the first teat cup has been attached to a teat, this is detected, for example, with the aid of a pneumatic pressure sensor, and the milking cluster is freed from the fixed preliminary position into a free horizontal position. In the vertical position, the milking cluster, as in the case of automatic attachment, remains in a floating state. This ensures that, as with automatic attachment, the milking cluster, following the attachment operation, follows the movement of the animal which is to be milked.

This preliminary positioning of the milking cluster with the arm device during said so-called semi-automatic milking is such that the milker need move the teat cups only to a very small extent, and exert pretty much no force, for attachment to the teats. This cuts back on the amount of force exerted and time used up. Since this embodiment requires only a straightforward drive, rather than a position sensor or drive apparatus for activating all the teat positions, this embodiment may be advantageously cost-effective. A further advantage here is that this semi-automatic embodiment can be upgraded to the automatic embodiment. This is possible by way of a plurality of identical components.

The arm device has an upper arm and a lower arm coupled in a pivotable manner thereto. This gives rise to a swing-in design which is accommodated, and protected, in the divider in the parked position.

In one embodiment, the arm device is connected to a drive unit, which is arranged on the divider above the animal which is to be milked. It is also possible, however, for the drive unit to be arranged beneath a milking platform. It is thus possible for all the drive and control elements to be provided centrally, and in an integrated manner, in the divider.

In an alternative embodiment, the arm device may be designed such that it can be connected to a drive unit. It is thus possible for example for five drive units to be displaced, in an attachment region, on a rail together with movement of the milking parlor, wherein they are docked to the arm device for adjustment of the same into the operating position and into the parked position. It is thus possible for a large number of milking stalls to be supplied using a small number of drives.

In a further embodiment, the drive device has at least one servomotor. The at least one servomotor may be coupled to a suitable transmission. In yet a further embodiment, the drive device has at least one direct drive.

If the drive unit has at least one torque motor, this gives rise to a certain level of elasticity. This can aid overload protection of the arm device, e.g. against kicking on the part of the animal which is to be milked. Since the torque motors do not require any transmission, the arm device can yield to a certain extent when kicked. Damage to the arm device is reduced, as is injury to the animal. The torque motors can yield upon manipulation of the arm device, e.g. as a result of contact from the legs of the animal. Furthermore, emergency milking is also possible if, in the case of a de-energized state, the milking cluster has to be applied by the milker, since there is no need here for the transmission and motor to overcome any resistances. Even if the driving action of the torque motors is de-energized, the angle sensors of said motors can be switched on, as a result of which there is always information present regarding the position of the torque motors and the position of the arm device with the milking cluster.

It is, of course, also possible to use other drives, e.g. pneumatic cylinders.

A further advantage here is that as soon as the teat cups have been attached to the teats of the udder, the motors can be switched off. This gives rise to smooth running of the arm device, as a result of which the milking cluster can follow the animal's movements. This means that the teats of the animal's udder are not subjected to any negative leverages.

A further advantage of this so-called passive trailing movement in contrast to an active trailing movement with the aid of the drive unit is that a large amount of energy is saved, since energy is required only for the attachment of the milking cluster. This may be, for example, only approximately 5% of the time required for milking an animal.

In a further embodiment, the arm device with the milking cluster, in the parked position in the divider, is arranged in an opening of a cladding of the divider (4). This gives rise to a compact and narrow construction.

It is also possible for the opening of the cladding of the divider with the arm device with the milking cluster arranged therein in the parked position to be closable by a protective covering. This can reduce the risk of injury to the animals, in particular restless animals.

In a further embodiment, a cleaning device for the milking cluster may be arranged in the divider. The expression cleaning device is also to be understood as providing for internal cleaning of the teat cups and external cleaning. Disinfection prior to, and following, the milking operation is, of course, also possible. It is likewise possible for interim disinfection of the milking cluster to take place. This improves the compact construction with additional functions. The amount of time required for cleaning is reduced, i.e. distances to cleaning locations are done away with, since cleaning can be carried out on site.

In addition, it is also possible to provide, on the milking cluster, a teat-treatment device, which disinfects the teats prior to, and following, the milking operation.

In another embodiment, the arm device may have a parallel guide for the milking cluster. If the parallel guide has push rods and/or connecting rods, or is formed from parallel-guide drive elements, there is no need to have either measuring systems or drive systems for a parallel guide. A narrow and space-saving construction is particularly advantageous, when the parallel guide is arranged within the arms of the arm device. Moreover, there is no need for any additional protective devices.

In another embodiment, the parallel-guide drive elements may be traction means, for example belts. These can aid overload protection.

In a further embodiment, the arm device has at least one traction-means drive. Belts in the form of traction means result in an extremely low level of noise. For precise positioning, toothed belts are advantageous.

In yet a further embodiment, the divider, with its functional units and components, forms a complete, preassembled unit. This allows quick assembly and dismantling and also retrofitting of existing milking parlors to take place easily. The functional units and components of the divider are the arm device and the milking cluster. Others may be constituted by the drive unit(s), the cleaning device, the protective covering, etc.

It is advantageous if the arm device and the milking cluster, in the parked position, can be collapsed in scissors form since, in this way, it is possible to minimize the width of the divider.

In a variant, the divider has a cladding made of two self-supporting half-shells. These may be formed, for example, from a stainless-steel sheet and by means of hydroforming. This is particularly advantageous since, in this way, it is possible to dispense with a carrying framework in the interior of the divider and space for functional groups and components is created. The divider may thus be designed in the form of an independent module.

In a further embodiment, the divider may have at least one service unit which can be inserted and removed again. Such an interchangeable service unit may have all the service-specific functional groups and components. These may also include all the milk-channeling functional groups and components and. This allows service-specific parts to be changed over quickly and straightforwardly, and down times can thus be reduced.

For quick interchangeability, the divider may be provided with quick-acting closures for connection to an infrastructure of a milking stall which is to be assigned to it.

Quick changeover of a divider, which may have a weight of for example 300 kg, can be facilitated by the divider being provided with rollers for transportation purposes.

This makes it possible to realize changeover times for a divider of 10 minutes, as a result of which downtimes are reduced.

A milking parlor for milking milk-producing animals may be provided with the divider described above.

The milking parlor may be a rotary milking parlor. The rotary milking parlor may be designed in the form of an external rotary milking parlor.

Moreover, a further embodiment may provide that the milking parlor is provided with a service stage. This allows quick access to, and changeover of, for example dividers, wherein a standstill period of the milking parlor is minimized.

A milking parlor may be designed in the form of a side-by-side, steeply angled or normal fishbone milking parlor. In one embodiment here, at least one divider of a number of dividers can be adjusted in its longitudinal direction from a milking position into an access position and back again, wherein an end of the at least one divider which is oriented in the direction of a partitioning of a pit for milkers is arranged in closer proximity to the pit partitioning in the milking position than in the access position, and a distance is formed between said end, in the access position, and the pit partitioning for access, in an access direction, for animals which are to be milked. This makes it possible for all the milking stalls to be occupied one after the other by animals which are to be milked, without milking stalls remaining empty. The distance for access prevents the animals from coming into contact with the pit partitioning or with the ends.

In an alternative embodiment of the side-by-side, steeply angled or normal fishbone milking parlor, a number of dividers can be adjusted in their respective longitudinal direction from a milking position into an access position and back again, wherein ends of the number of dividers which are oriented in the direction of a partitioning of a pit for milkers are arranged in closer proximity to the pit partitioning in the milking position than in the access position, and a distance is formed between said ends, in the access position, and the pit partitioning for access, in an access direction, for animals which are to be milked.

A further embodiment provides that the number of dividers can be adjusted separately, in groups or all together in their respective longitudinal direction from a milking position into an access position and back again. This makes it possible to control animal movement straightforwardly and effectively.

In another embodiment, the dividers are designed such that, in the access position, they free in the first instance a sub-region of the associated milking stall for the animal which is to be milked in each case, until all the animals which are to be milked have entered the milking stalls of the milking parlor, and then they free the associated milking stall completely. This makes it easy to influence animal movement.

Throughpassage detection is also possible here if the milking parlor has a throughpassage-detection system for the animals which are to be milked, said system being arranged in the dividers. This means that animal movement can be not just controlled, but also monitored straightforwardly.

The dependent claims in each case relate to advantageous developments and configurations of the milking cluster and/or of the milking stall.

BRIEF DESCRIPTION OF THE DRAWINGS

Further advantages and details can be gathered from the exemplary embodiment illustrated in the figures of the drawing, in which:

FIGS. 2-2a show schematic views of a second exemplary embodiment of the milking parlor according to the invention having the dividers according to the invention;

FIG. 14 shows the schematic plan view of a variation of the first exemplary embodiment of the milking parlor according to the invention with a second variation of the dividers according to the invention;

FIG. 24 shows a perspective illustration of a second variation of the arm device of the divider according to the invention;

FIGS. 25-25d show different illustrations of different views of the second variation of the arm device according to FIG. 24.

FIG. 27 shows a schematic plan view of a variant of the second exemplary embodiment according to FIGS. 2-2a;

FIG. 34 shows a schematic inside view of the variant according to FIG. 32 with a service unit inserted;

FIG. 34a shows the inside view of the variant according to FIG. 34 with the service unit removed;

DETAILED DESCRIPTION OF THE DRAWINGS

The same or like functional elements are provided with like designations in the figures. A number of figures indicate a vertical direction z.

Figure 1:
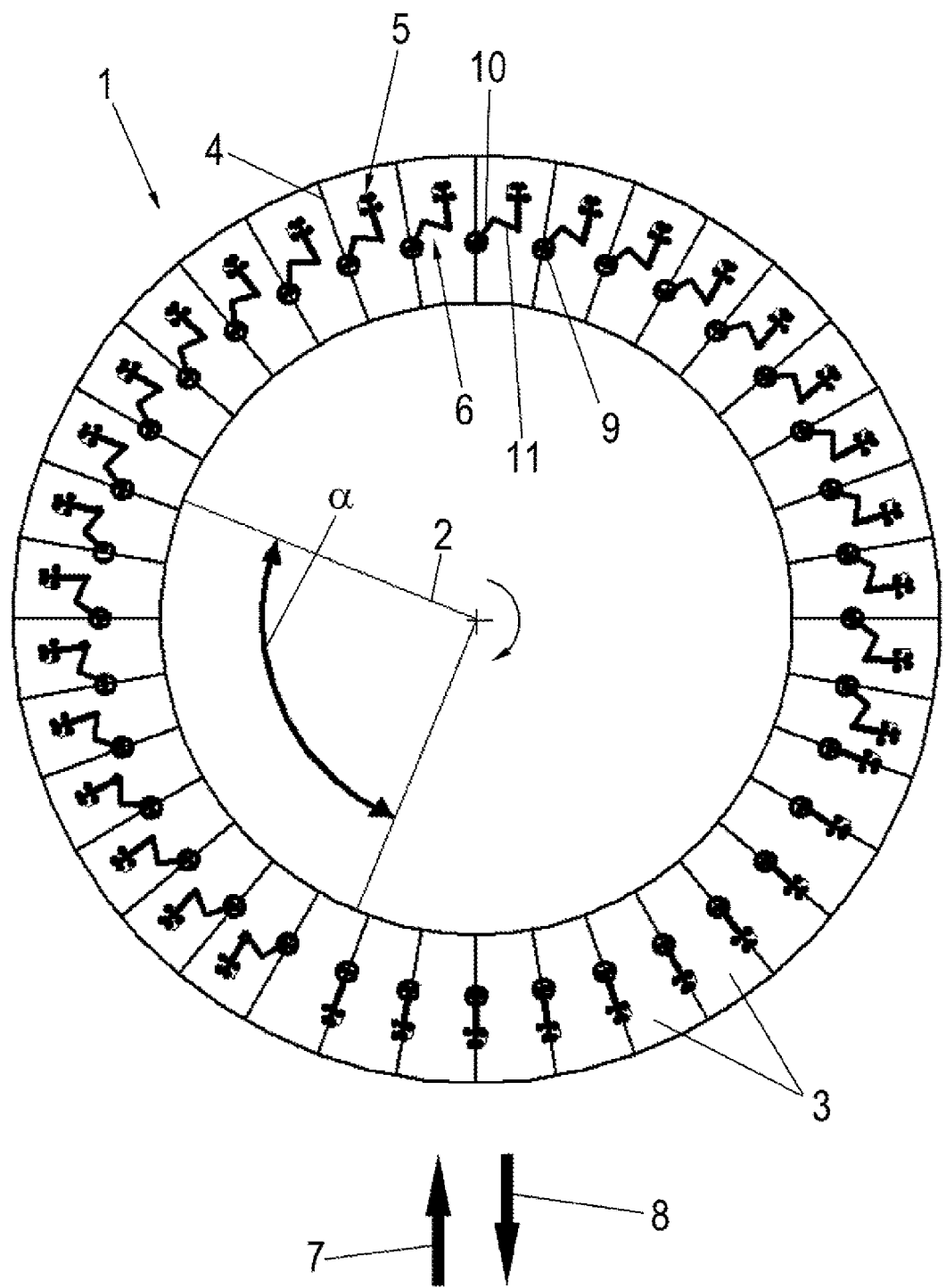
FIG. 1 shows a schematic plan view of a first exemplary embodiment of a milking parlor according to the invention having dividers according to the invention in a first exemplary embodiment.

FIG. 1 shows a schematic plan view of a first exemplary embodiment of a milking parlor 1 according to the invention having dividers according to the invention in a first exemplary embodiment.

The milking parlor 1 is constructed in the manner of a so-called external rotary milking parlor. The animals which are to be milked here have their heads directed toward a center, i.e. a point of rotation 2. The rotary milking parlor here can be rotated in a clockwise direction about the point of rotation 2. It is also possible, of course, for the rotary milking parlor, in another embodiment, to be rotated in the counterclockwise direction. In this example, thirty-six milking stalls 3 are arranged on the circumference of the rotary milking parlor and are separated by dividers 4. The dividers 4 are also referred to, for example, as side rails and are oriented more or less parallel to the longitudinal axis of an animal which is to be milked. The milking parlor 1 is used for the mechanical milking of milk-producing animals, e.g. cows, by means of milking clusters 5. Each milking stall 3 has a respective milking cluster 5, which can be adjusted, via an arm device 6, from a parked position into an operating position beneath the udder of an animal which is to be milked, e.g. a cow, in a milking stall 3. Each milking cluster 5 is arranged within a divider 4. The positions will be explained in yet more detail hereinbelow.

The animals can enter the rotary milking parlor via an entrance 7 and leave it again via an exit 8. Once an animal has entered a milking stall 3, it is important for the animal to assume a predefined position. This is achieved by the divider 4 forming an enclosed milking stall 3. When the animal is standing in the milking stall 3, it is preferably the case that within a part of a circle referred to here as attachment region α, the milking cluster 5 is adjusted from the parked position in the divider 4 from the side of the animal, between the front legs and hind legs of the latter, into the operating position beneath the animal's udder and is attached to the latter with the aid of a position sensor (see FIGS. 4 and 5). Attachment, however, can take place basically at any position of the rotary milking parlor, e.g. if a milking cluster has fallen off again. In the first exemplary embodiment of the divider 4, each divider 4 has a drive unit 9, which is connected to the arm device 6. Following completion of the milking operation, the milking cluster 5 is removed again from the animal by means of the arm device 6 and drive unit 9 or drops of its own accord into a standby position or milking end position and is then adjusted into the parked position.

All the milking stalls 3 are freely accessible to a milker on the outer circumference of the milking parlor 1, and this allows him to intervene in a milking operation at any time. This operating region is therefore kept free of additional equipment. Any risk to the milker is minimized. The rotary milking parlor can remain constantly in rotation; even the inner region of such a milking parlor/milking system is always accessible to a monitor, without him being at any risk.

The milking cluster 5 is moved laterally up to the animal which is to be milked in the milking stall 3 and positioned beneath the animal's udder from the side.

The arm device 6 has an upper arm 10 and a lower arm 11 and has the function of carrying the milking cluster 5 in a neutral-weight state and of running smoothly enough to follow the movements of the animal which is to be milked.

Different variations of the arm device 6 will be described in yet more detail hereinbelow.

FIGS. 2 and 2a illustrate schematic views of a second exemplary embodiment of the milking parlor 1' according to the invention having the dividers 4 according to the invention. FIG. 2 shows a front view and FIG. 2a illustrates a plan view. The milking stalls 3 here are arranged one beside the other and are also separated by dividers 4. Animals T which are to be milked, in this case cows, are located in the milking stalls 3. Each divider 4 has a drive unit 9 for a respective arm device 6 with the milking cluster 5.

Figure 3:
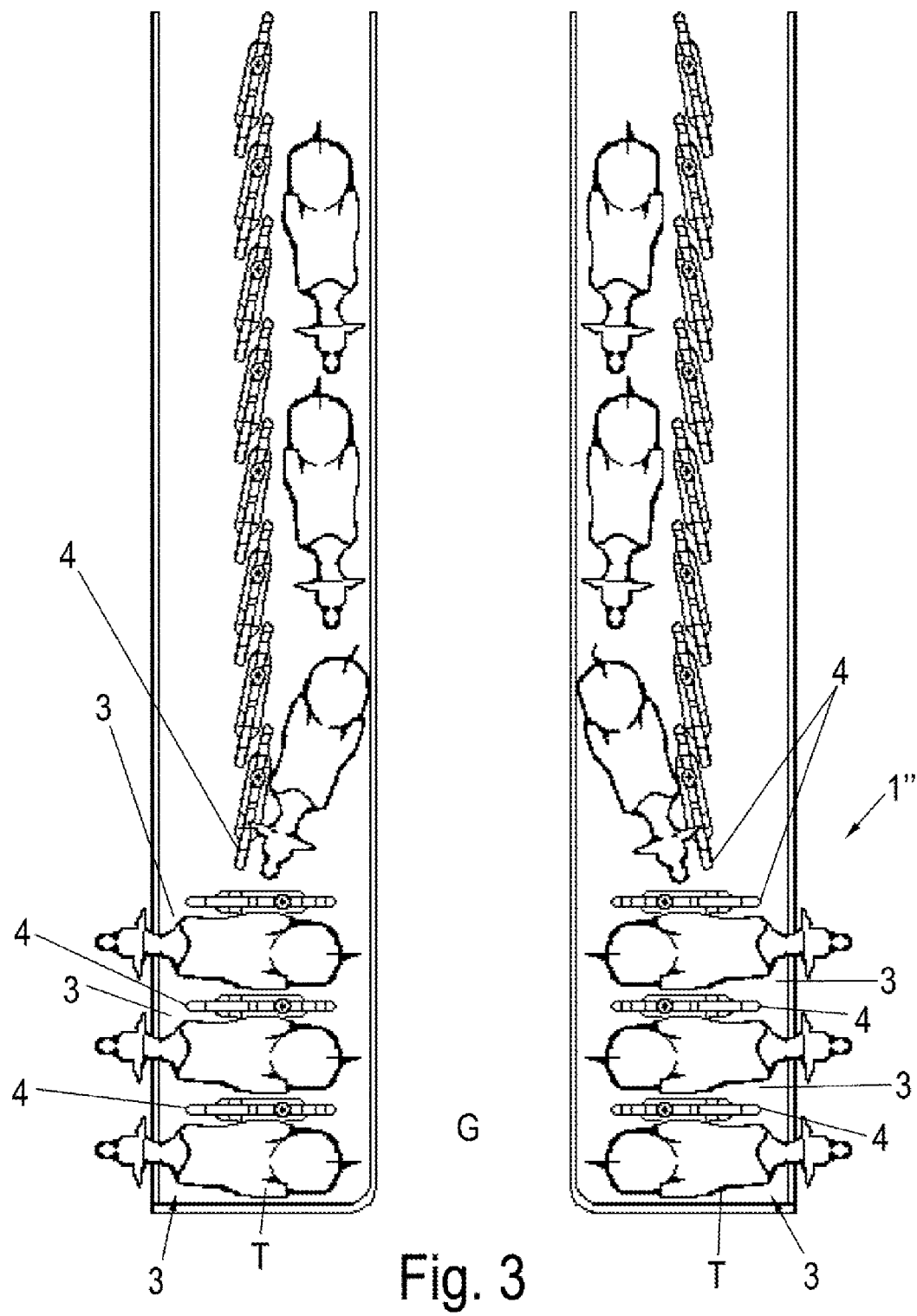
FIG. 3 shows a schematic plan view of a third exemplary embodiment of the milking parlor according to the invention having the dividers according to the invention.

FIG. 3 shows a schematic plan view of a third exemplary embodiment of the milking parlor 1" according to the invention having the dividers 4 according to the invention. In this third exemplary embodiment, the dividers 4 are arranged in a pivotable manner in a U-shaped walkway passage, wherein they form a passage in the first instance by being pivoted in a line and directing the animals T. As soon as the first animal has arrived at the end of the U-shaped walkway passage, the first divider on the left in FIG. 3 pivots in the counterclockwise direction to form a milking stall 3. It is possible for the pivoting action either to be controlled via a rotary actuator or to take place automatically as a result of the movement of the animal T. These operations proceed until all the animals have been placed in the milking parlor 1". Here too, each divider 4 has a drive unit 9 for a respective arm device 6 with the milking cluster 5. It is also possible here for drive units 9', which are displaced via a rail located at the top or bottom, to be docked (which will be explained in detail hereinbelow).

Two U-shaped walkway passages are arranged here in mirror-inverted form and are separated by a so-called pit G. The pit G is the region where a milker is stationed, it being possible for said milker, from here, to monitor the milking, and intervene with help, on either side without being obstructed by the movement of the arm devices 6.

Figure 4:
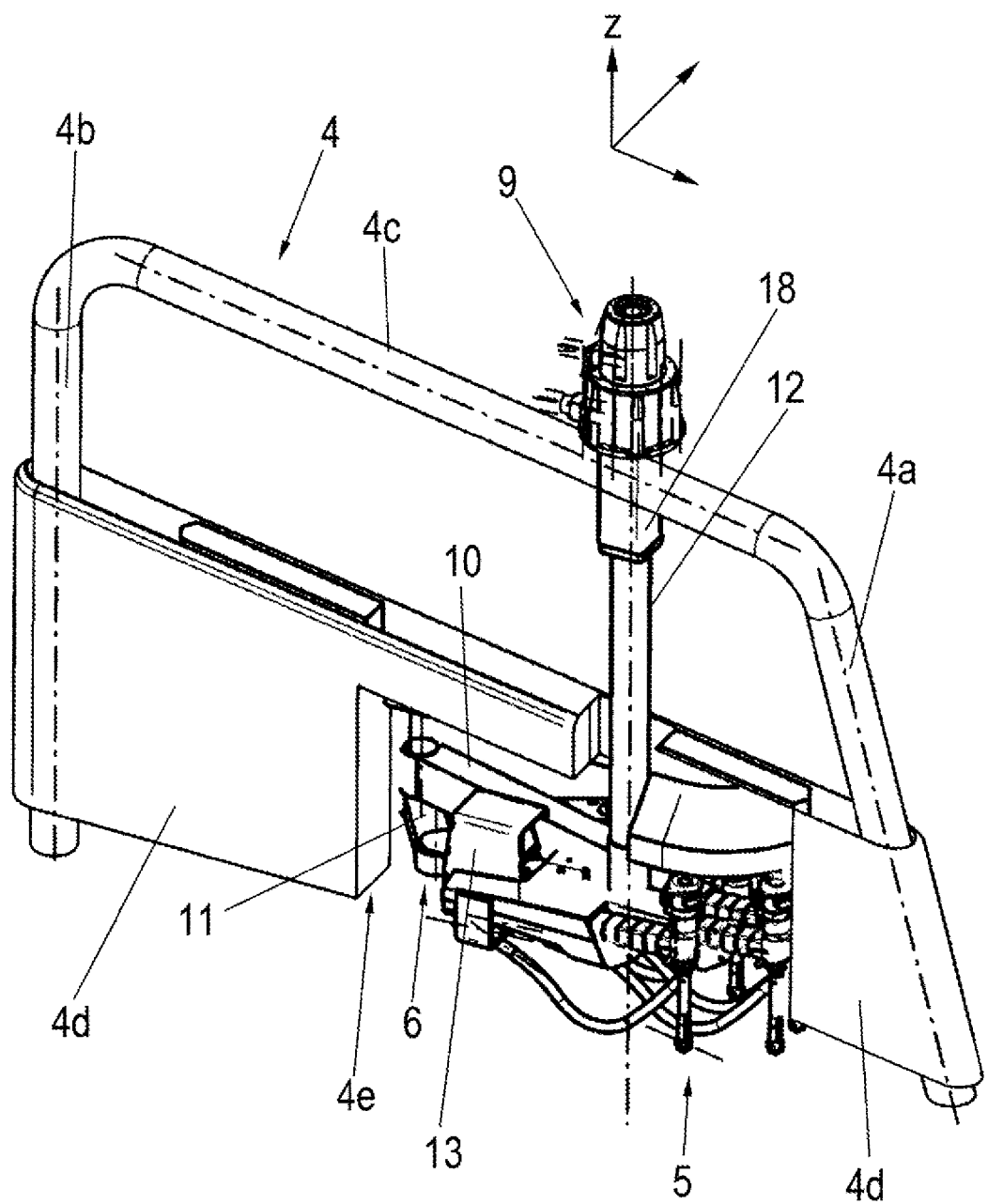
FIG. 4 shows a schematic view, in perspective, of the divider according to the invention with an arm device in a parked position.
Figure 5:
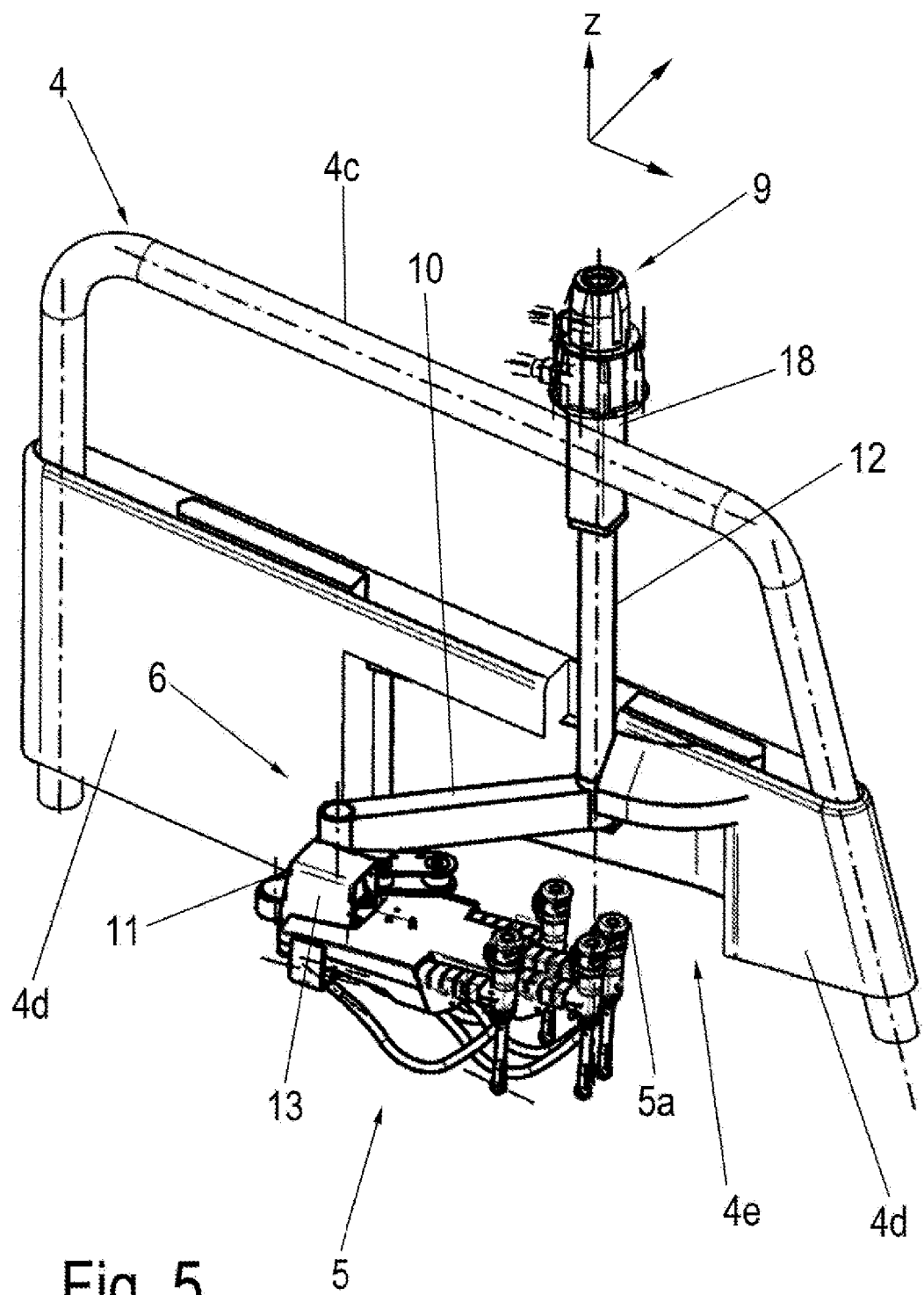
FIG. 5 shows the perspective view according to FIG. 4 with the arm device in an operating position.
Figure 6:
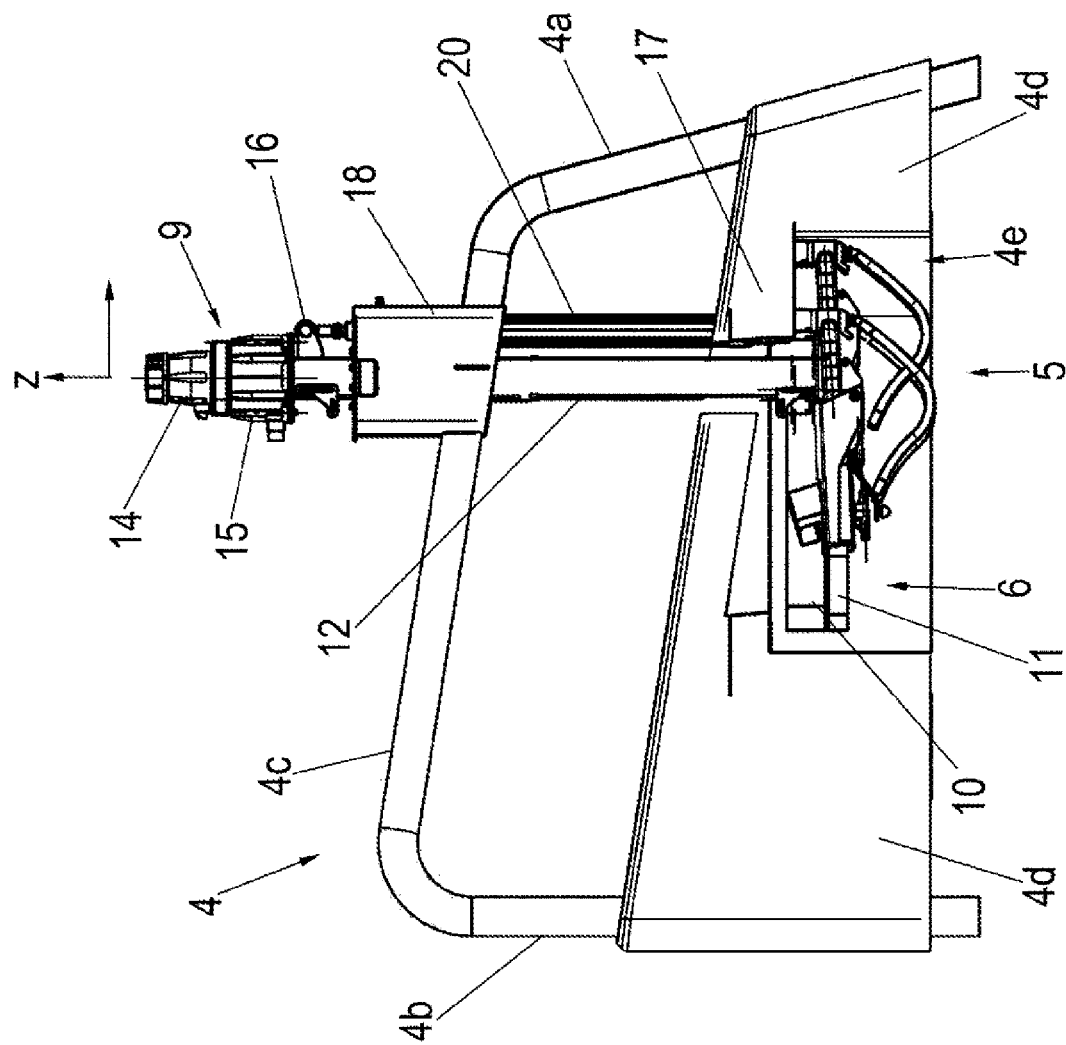
FIG. 6 shows a side view of the divider according to the invention.

FIG. 4 illustrates a schematic view, in perspective, of the divider 4 according to the invention with the arm device 6 in the parked position. FIG. 5 shows a schematic view, in perspective, of the divider 4 according to the invention with the arm device 6 in an operating position. FIG. 6 illustrates a side view.

The divider 4 is designed here in the form of a housing which contains all the actuating equipment for the arm device 6 and the milking cluster 5 and also control elements and drive units. The divider 4 thus forms a complete unit, which can be preassembled at a given location and can be changed over, or retrofitted, as a complete unit.

The divider 4 here is in the form of a tube structure with a front post 4a, which is slightly inclined, and a rear post 4b. The posts 4a, 4b are connected via a horizontally running horizontal bar 4c. Approximately halfway along their height, the posts 4a, 4b are encased by a cladding 4d, which extends approximately as far as the feet of the posts 4a, 4b. The posts 4a, 4b and the horizontal bar 4c may also be produced in a single piece from bent tubing. The front half of the cladding 4d contains an opening 4e, and this gives a mount, within the divider 4, in the cladding 4d, which may also be curved convexly in the direction of the sides (see, for example, FIG. 7) such that it accommodates, and encloses, the milking cluster 5 parked therein. An additional protective covering (not shown) for protecting the milking cluster 5 may be fitted on the side of the opening 4e. Upon activation of the milking cluster 5, said protective covering may be displaced, for example, in the direction of the divider 4, in order to free the opening 4e. In a further embodiment, the protective covering may also be fitted on the milking cluster 5. This means that the protective covering remains fixed to the milking cluster 5 and also moves therewith. It may also be reduced in size in the operating position, e.g. by being automatically collapsed or pushed together.

The milking cluster 5 is fitted on the lower arm 11 of the arm device 6. The milking cluster 5, in this exemplary embodiment, has four teat cups 5a. It is possible for each of the four teat cups 5a, independently of the others, to assume a different position and be fixed automatically or rendered freely moveable. It is thus possible for the teat cups 5a, in the attached state, to assume individual positions, since the teat cups 5a are attached individually. It is also conceivable to have an individual teat-cup-preliminary-positioning means (not illustrated), which can then attach a plurality of teat cups at the same time.

The milking cluster 5 is also provided with a position sensor 13, which in this case is designed in the form of a three-dimensional optical sensor. By way of the position sensor 13, the milking cluster 5 is adjusted from the parked position into the operating position according to FIG. 5 by means of the arm device 6 and a drive unit 9.

The arm device 6 can be collapsed in scissors form together with the milking cluster 5, as a result of which the width of the milking cluster 5 in the lower swung-in region in the parked position, when the milking cluster 5 is located, for example, in a so-called Clean(ing)-in-Place (CIP) position (see, in this respect, FIG. 11), is not significantly exceeded.

The milking cluster 5 can assume various positions in the operating state. An attachment position serves, for example, for positioning the teat cups 5a such that they can be fitted in each case to a corresponding teat of an animal which is to be milked. During the milking operation, the arm device 6 supports the milking cluster such that the weight of the milking cluster does not adversely affect the milking operation. Following completion of milking, the teat cups 5a are released again from the udder of the animal which has been milked.

The movement operations of the arm device 6 and of the milking cluster 5 are controlled by means of a control device (not shown here). The control device is connected to the position sensor 13 and the drive unit 9. In this exemplary embodiment, the drive unit 9 is fitted at an upper end of an upper-arm drive shaft 12. The upper-arm drive shaft 12 and, with it, the drive unit 9 and the arm device 6 with the milking cluster 5 are fastened in a guide unit 18 on the horizontal bar 4c of the divider 4 and guided in a rotary and vertically adjustable manner. The upper-arm drive shaft 12 has its lower end fixed to one end of the upper arm 10 of the arm device 6. At its upper end, the upper-arm shaft 12 is coupled to a drive of the drive unit 9. The upper-arm shaft 12, which is designed in the form of a hollow shaft, contains a further shaft for driving the lower arm 11, it being possible for said further shaft to be driven by a further drive of the drive unit 9. The upper-arm drive shaft 12 and the arm device 6 with milking cluster 5, said arm device being connected to said shaft, can be adjusted vertically by a vertical drive 20 (see FIG. 6), e.g. a pneumatic cylinder. The vertical drive 20 has a lower end connected to the divider 4 and an upper end articulated, via an articulation 16 in the region of the upper end of the upper-arm shaft 12, on a retaining means (not described in any more detail) of the drive unit 9.

The drives of the drive unit 9 may be realized in different ways, for example as servomotors with corresponding transmissions, although direct-drive motors are also possible. They are also designed, for example, in the form of so-called torque motors, this achieving a certain level of elasticity of the arm device 6 and of the milking cluster 5. For example it is possible to cushion kicking on the part of the animal which is to be milked.

Both the upper arm 10 and the lower arm 11 can thus be driven specifically independently of one another.

The drive unit 9 here is arranged in the upper region of the divider 4, above an animal which is to be milked, beyond the reach of said animal. On the one hand, this has the advantage that the drive unit 9 is not at risk of being kicked. Moreover, the upper region above the animal is better protected against moisture and the associated damage. Furthermore, this also allows the particularly narrow construction of the divider 4. The arm device 6 with the milking cluster 5 is arranged in the lower region of the divider 4 such that a necessary pivoting action of the arm device 6 with the milking cluster 5 beneath the belly of an animal which is to be milked can take place from the side. It is also possible here not to come into contact with the legs of the animal which is to be milked.

With the milking cluster 5 and the arm device 6 parked within the cladding 4d of the divider 4, the milking cluster 5 can be moved beneath a cleaning device 17, which will be described in yet more detail hereinbelow.

Figure 7:
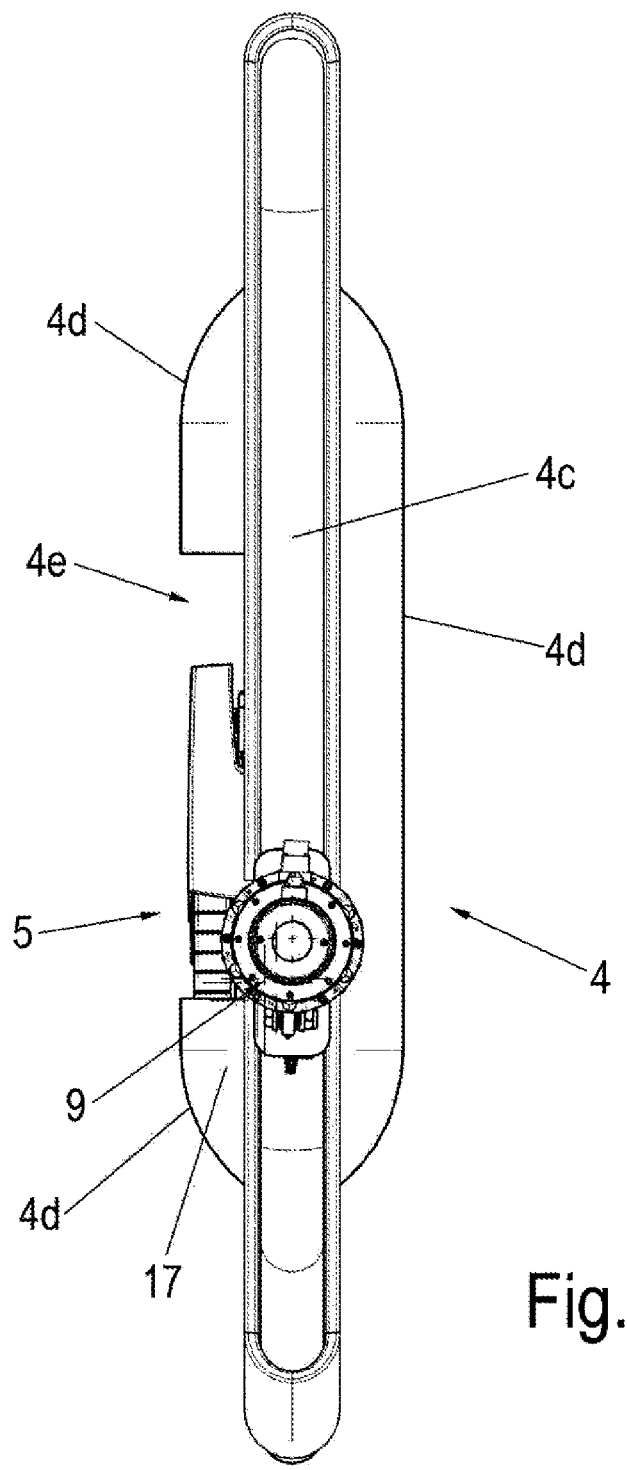
FIGS. 7 and 8 show a plan view and a bottom view of the divider according to the invention with the arm device in the parked position.
Figure 8:
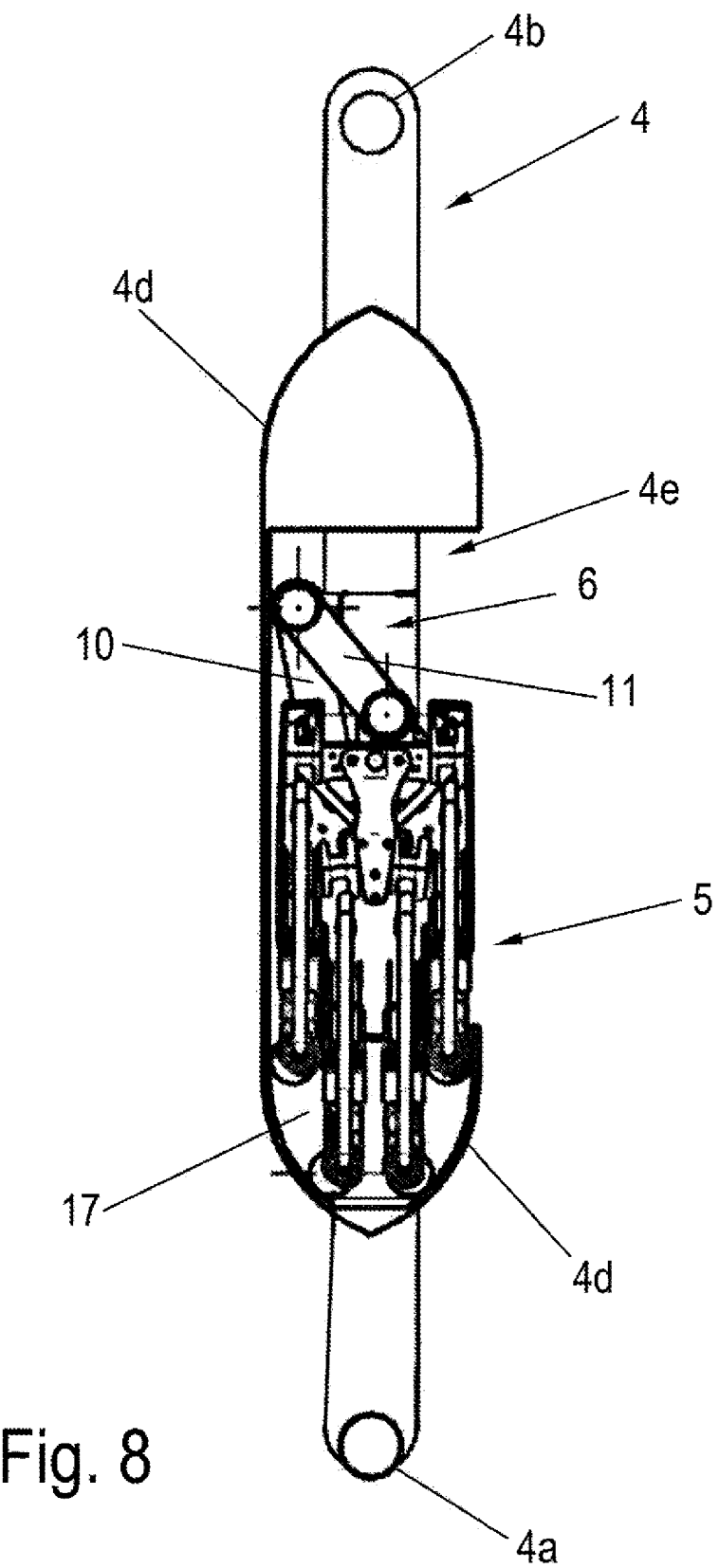

FIG. 7 illustrates a plan view of the divider 4 according to the invention with the arm device 6 in the parked position. It can clearly be seen that the cladding is curved convexly on either side of a longitudinal center axis of the divider 4 and accommodates the arm device 6 with milking cluster 5 in full. FIG. 8 shows a bottom view of the same.

Figure 9:
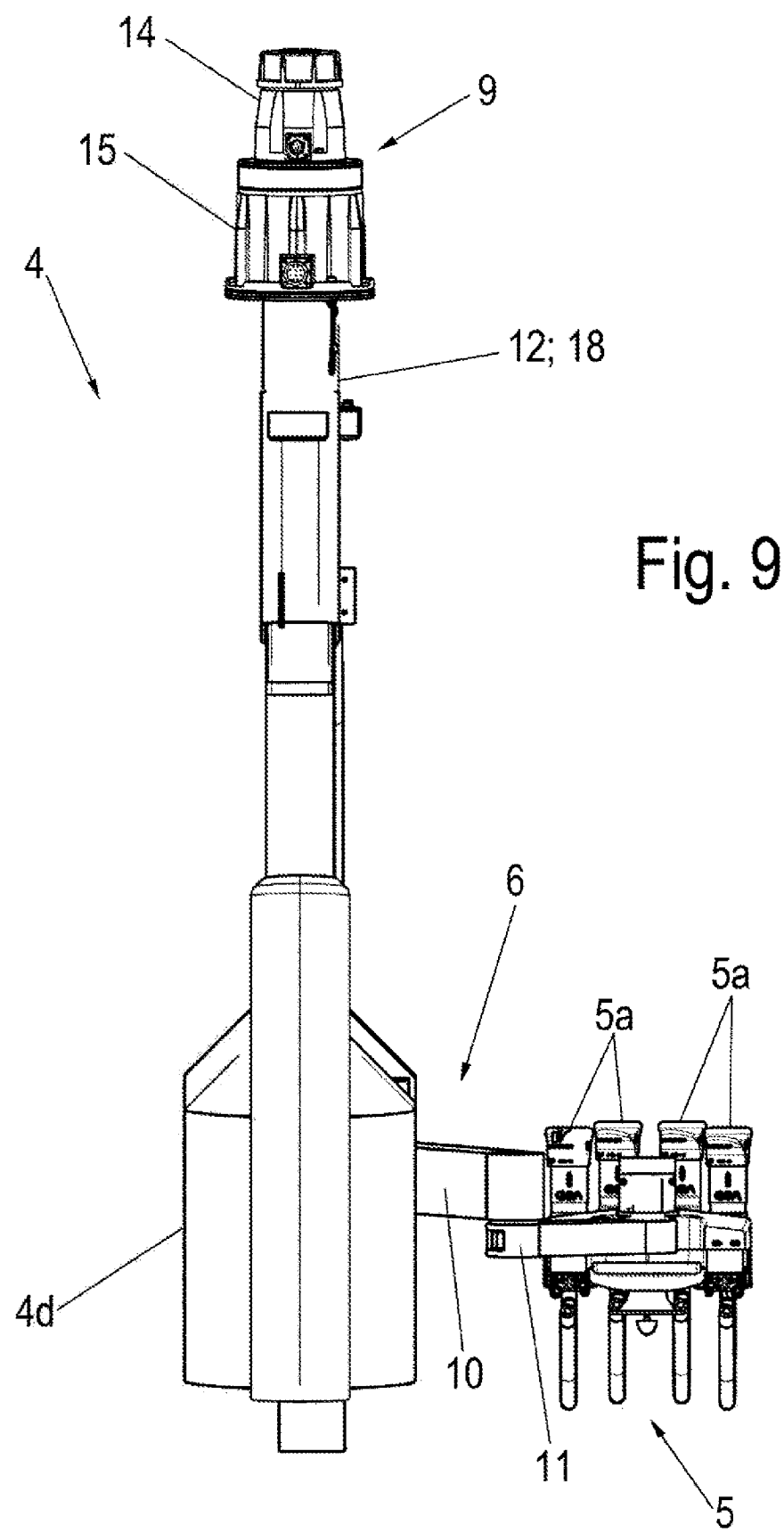
FIGS. 9-11 show a rear view, plan view and bottom view of the divider according to the invention with the arm device in the operating position.

FIG. 9 shows a rear view of the divider 4 according to the invention with the milking cluster 5 in the operating position. The cladding 4d of the divider 4 is curved convexly in the lower region, e.g. beneath the belly of an animal standing to the side thereof, and therefore the amount of installation space taken up is minimal. This means that the animals T can stand beside one another in precisely as close proximity as if there were no divider with integrated arm device 6 and milking cluster 5 present. The drive unit 9 is shown here with two motors, wherein the upper one, in the form of lower-arm drive 14, is connected to the lower arm 11. The lower drive is an upper-arm drive 15 for driving the upper arm 10.

Figure 10:
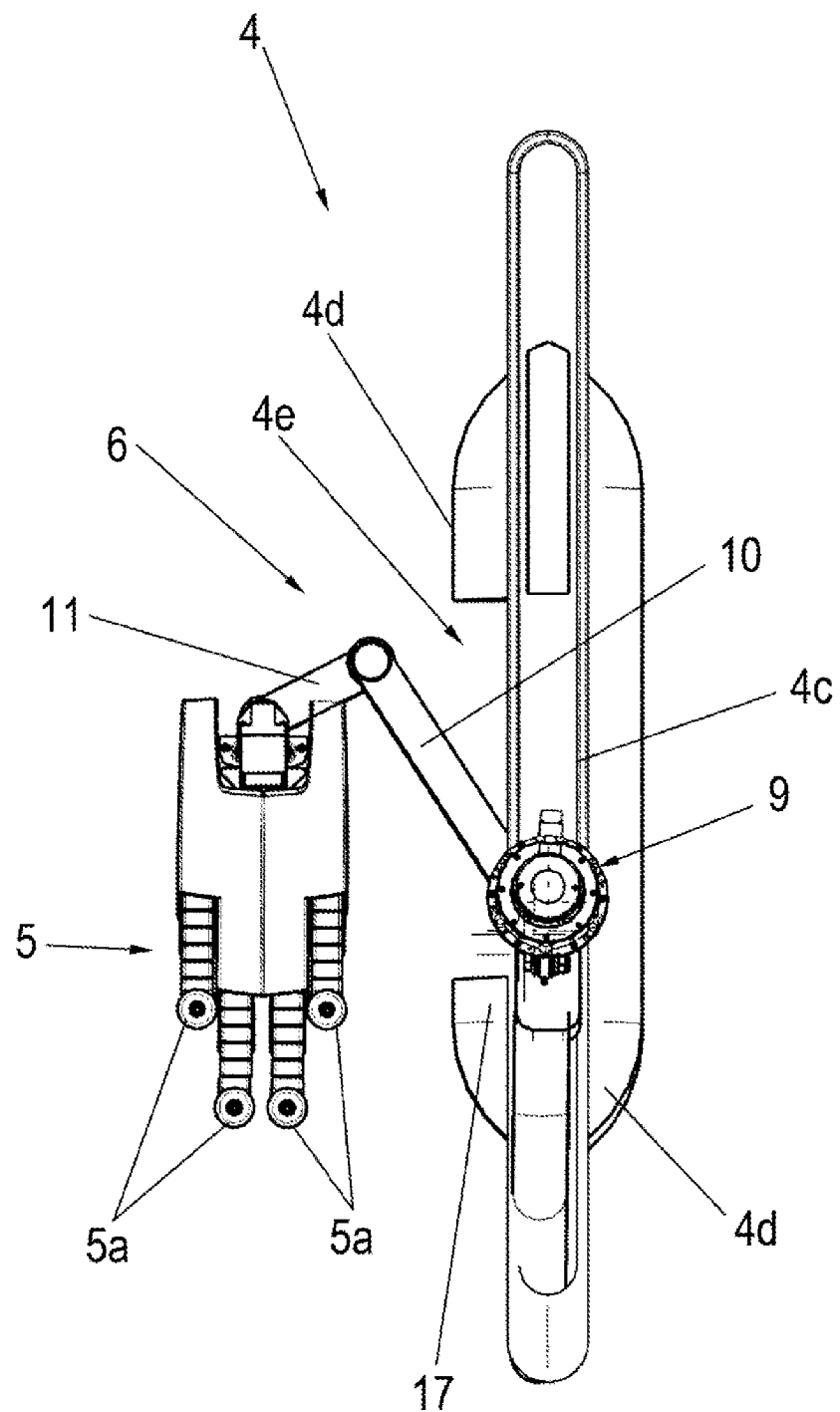

FIG. 10 illustrates a plan view of the divider 4 with the arm device 6 and the milking cluster 5 in the operating position. The milking cluster 5 runs more or less parallel to the divider 4. A parallel guide of the arm device 6 will be explained in detail hereinbelow.

Figure 11:
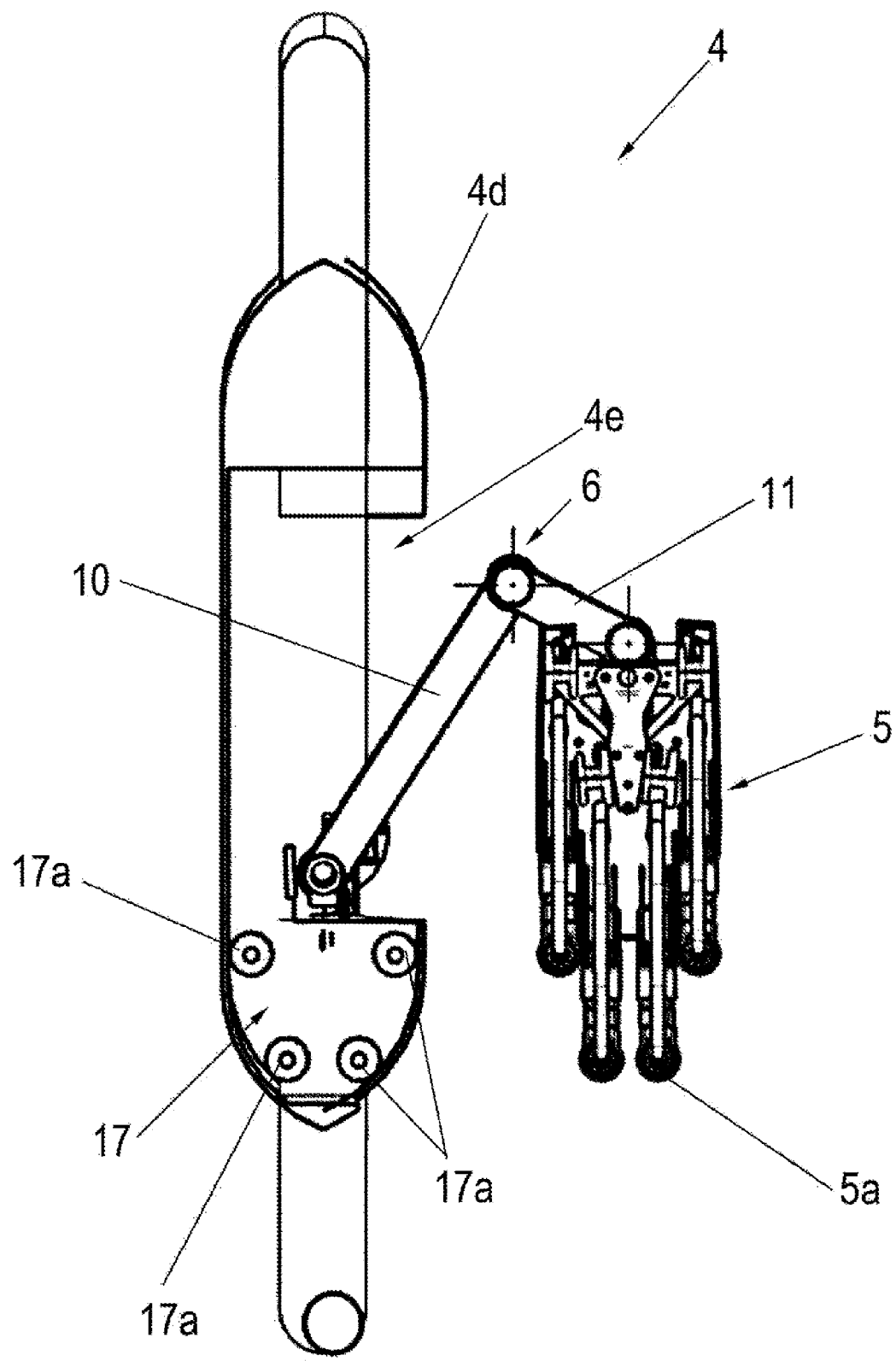

FIG. 11 illustrates the cleaning device 17 with cleaning nozzles 17a in a bottom view of the divider 4. When the milking cluster 5 assumes the parked position, this position, at the same time, is the so-called Clean(ing)-in-Place (CIP) position. The vertical drive 20 here displaces the arm device 6 with the milking cluster 5 upward in a vertical direction z until the cleaning nozzles 17a interact in each case with a teat cup 5a of the milking cluster 5, in order to clean said teat cup with a cleaning fluid. The cleaning nozzles 17a may also be charged with air, in order for the teat cups to be dried following cleaning. It is also possible for the vertical drive 20 to move the milking cluster 5, and thus the teat cups 5a, up and down by a certain distance in the vertical direction, it being possible for the cleaning nozzles 17a for example to clean within the teat cups 5a. The cleaning nozzles 17a may be designed appropriately for this purpose, e.g. in the form of conical-jet nozzles and/or radial-jet nozzles. In addition to the cleaning nozzles 17a, it is also possible, in a particular configuration, for external cleaning nozzles (not illustrated here) to clean the teat cups 5a externally. Disinfection may also take place in addition.

Figure 12:
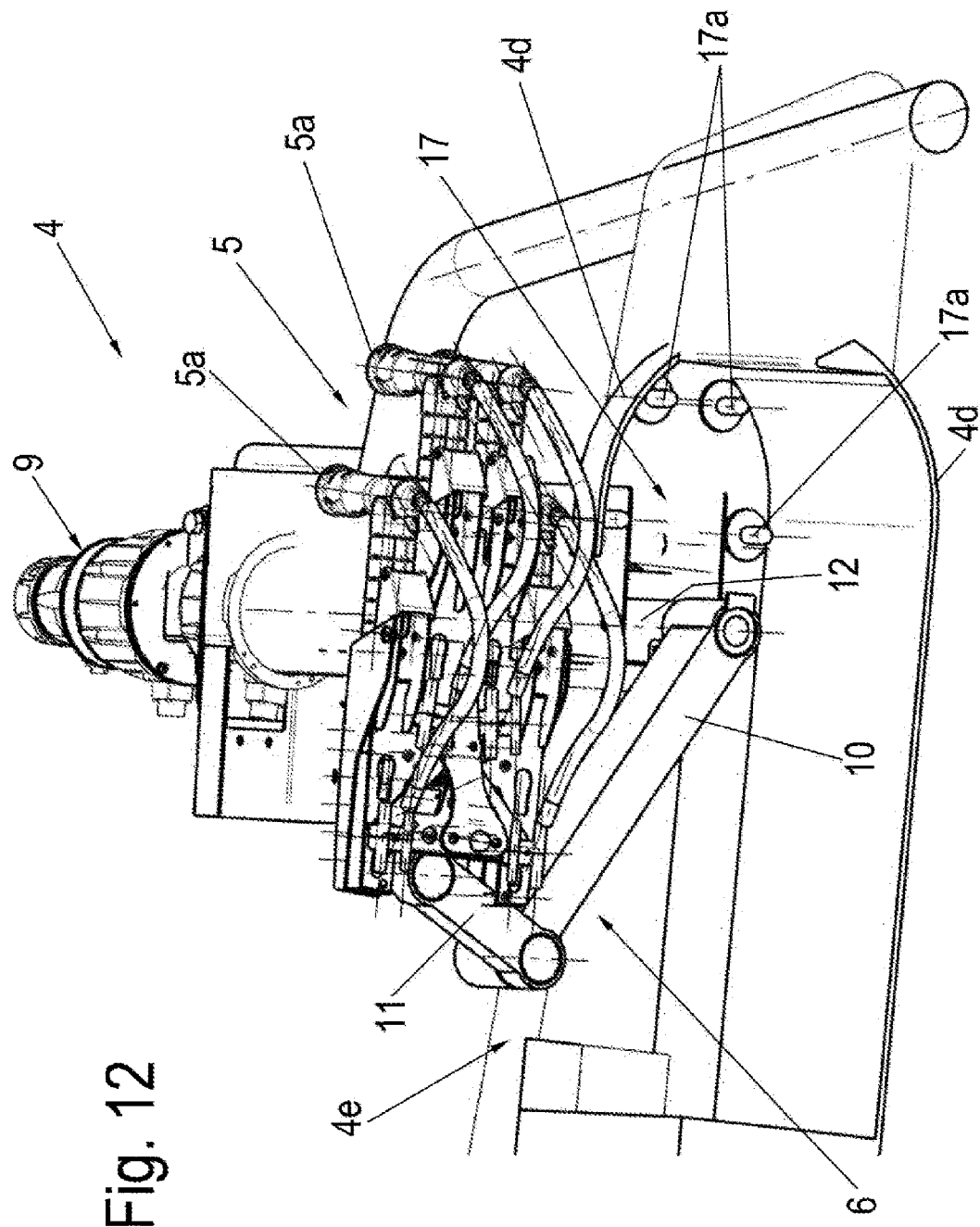
FIG. 12 shows a perspective view of part of the divider according to the invention with the arm device in the operating position, as seen from beneath.

FIG. 12 illustrates a perspective view of part of the divider 4 according to the invention with the arm device in the operating position, as seen from beneath, the cleaning device 17 with the cleaning nozzles 17a being clearly visible beneath the cladding 4d.

Milking is started by the control device establishing that the animal which is to be milked is standing in the milking position. This can be established, for example, by camera or foot sensors, proximity sensors or the like. Milking begins with the attachment operation in the operating position of the milking cluster 5. Rough positioning in the heightwise direction can take place by a pneumatic cylinder, which forms the vertical drive 20. This is followed by the teat cups being attached to the teats of the udder of the animal which is to be milked, wherein positioning is carried out by way of the position sensor 13, the milking cluster 5 being positioned precisely by the arm device 6.

Figure 13:
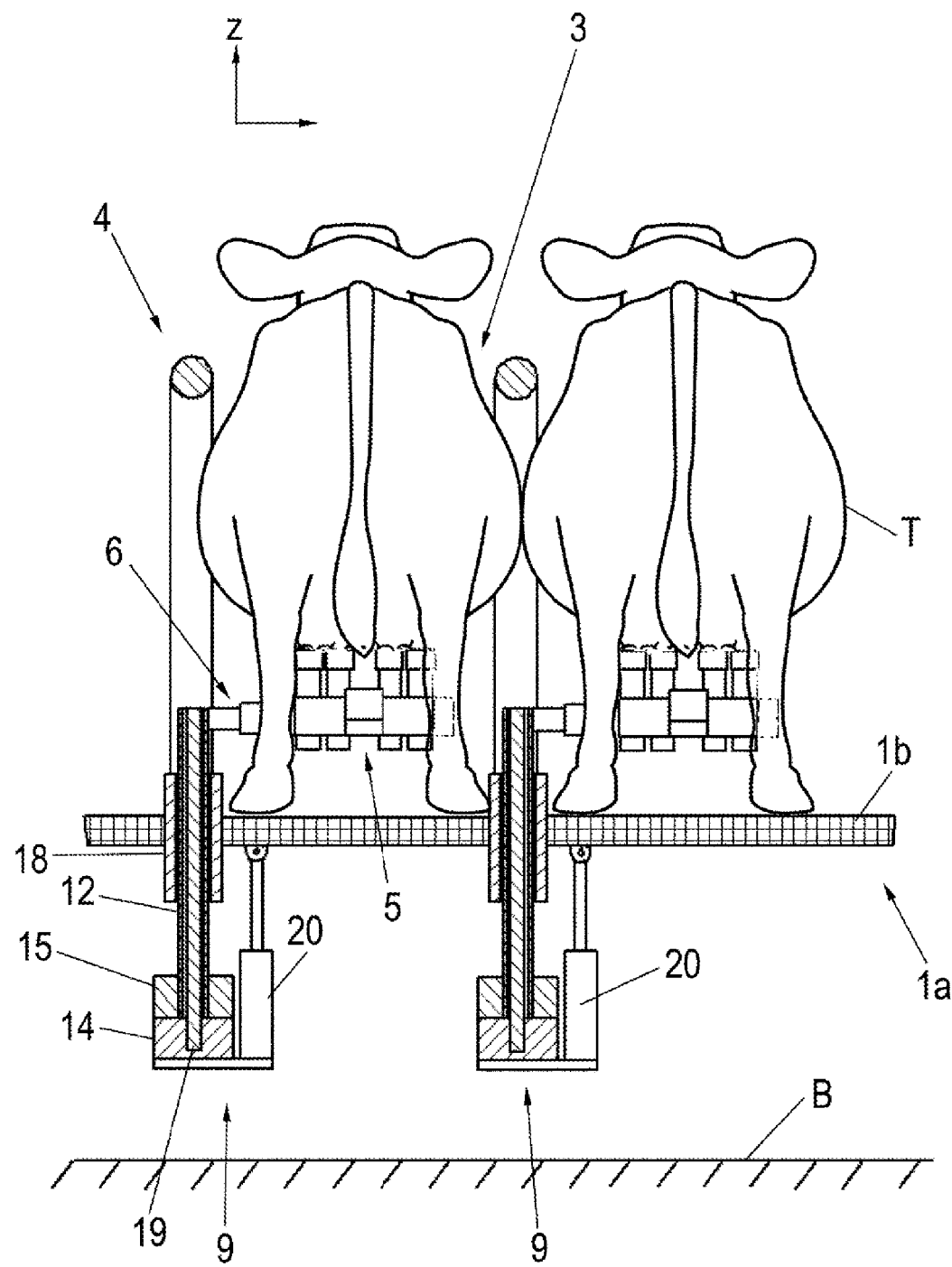
FIG. 13 shows a first variation of the divider according to the invention with the arm device in the operating position.

FIG. 13 illustrates a first variation of the divider 4 according to the invention with the arm device 6 in the operating position. This variation can be used, for example, in a rotary milking parlor as shown in FIG. 1, but is not restricted thereto. The drive unit 9 is located beneath a milking platform 1b of the milking stall 1, on an underside 1a above a floor B. The guide unit 18 for the upper-arm drive shaft 12 has been inserted into the milking platform 1b, and fastened, beneath the divider 4. The guide unit 18 also serves here for the rotary and vertical longitudinal guidance of the upper-arm drive shaft 12, and thus of the milking cluster 5, with the arm device 6, fitted thereon. FIG. 13 illustrates schematically that the lower-arm drive 14 of the drive unit 9 is fitted on an installation panel and connected to a lower-arm drive shaft 19, which extends through the upper-arm drive shaft 12, which is designed in the form of a hollow shaft. The upper-arm drive 15 is arranged at the lower end of the upper-arm drive shaft 12 and coupled thereto. It is also the case that the vertical drive 20 has one end articulated on the installation panel, its other end being connected to the milking platform 1b. Since the drive unit 9 is arranged beneath the milking platform 1b, above the floor B, it is easily accessible for maintenance and repair purposes, but cannot be reached by an animal T in the milking stall 3.

FIG. 14 shows a schematic plan view of a variation of the first exemplary embodiment of the milking parlor 1''' according to the invention with a second variation of the dividers 4 according to the invention.

In contrast to FIG. 1, each divider 4 has the arm device 6 with the milking cluster 5, but the drive unit 9 is absent. There are, for example, five drive units 9', and these are arranged in a displaceable manner on a rail 23. The rail 23 is fixed to the milking parlor 1. This allows the rotary milking parlor and the drive unit 9' to move synchronously. Each drive unit 9' is provided for docking to the drive shafts of the arm device 6 of each divider 4. A docking operation takes place preferably only in the attachment region α of the milking parlor 1'''. This will be explained in yet more detail hereinbelow. It is also possible, however, for one or more drive units 9' to be displaced outside the attachment region α, in order for example for knocked-off milking clusters 5 to be re-attached. The drive units 9' execute the same movement as the milking parlor 1''' within the part of the circle forming the attachment region α. They actuate in each case the arm device 6 with the milking cluster 5 of the dividers 4 assigned to them by docking.

FIGS. 15-18 show sectional illustrations of a drive portion of the arm device 6 of the second variation of the divider 4 according to the invention in different operating positions.

Figure 15:
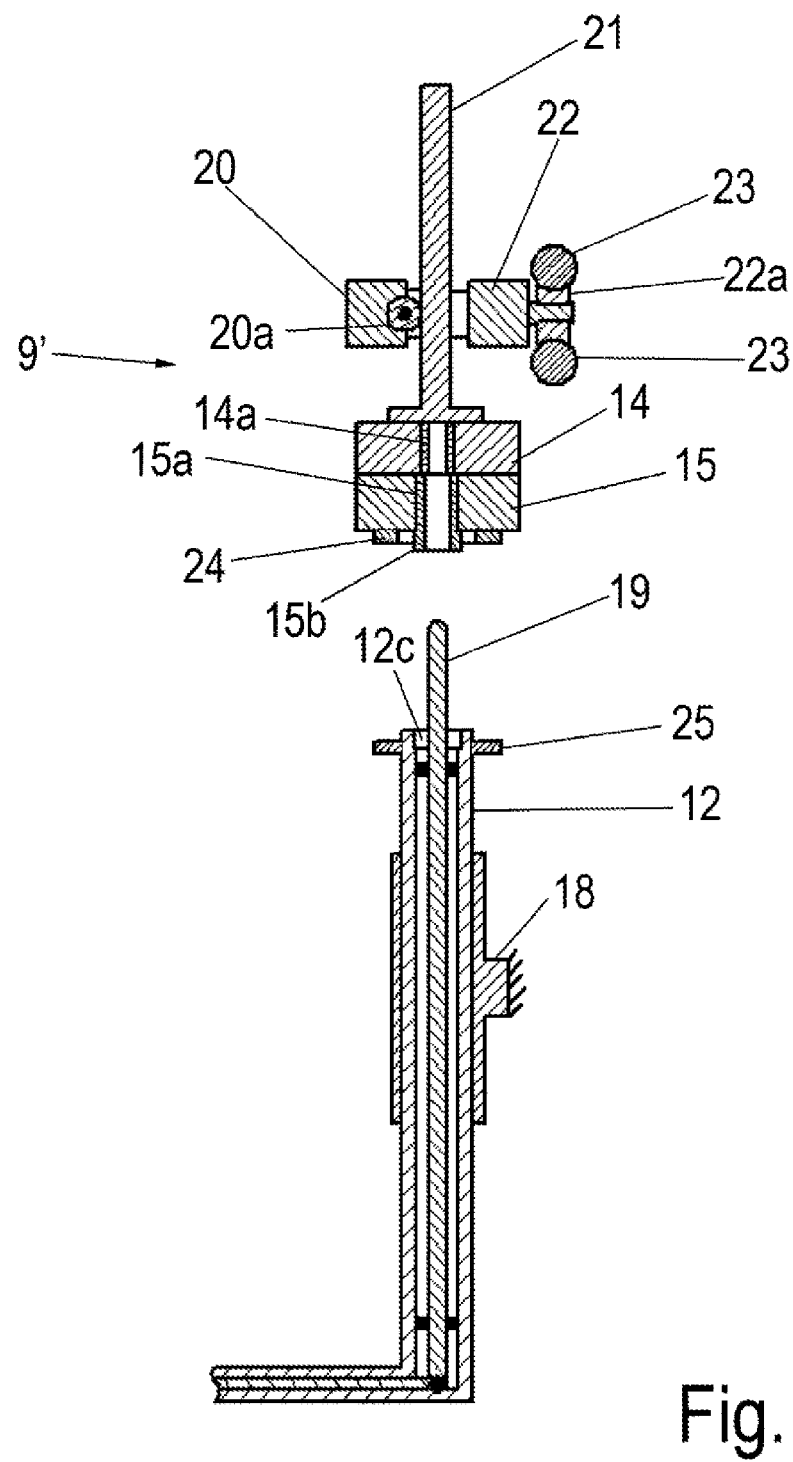
FIGS. 15-18 show sectional illustrations of a drive portion of the arm device of the second variation of the divider according to the invention in different operating positions.

FIG. 15 shows an operating position prior to the drive unit 9' being docked. The drive unit 9' comprises a holder 21, the lower-arm drive 14 and the upper-arm drive 15 being fitted at the lower end of the same. The holder 21 is, for example, a rod which can be adjusted in the vertical direction in a vertical drive 20 (shown merely schematically) by means of a vertical-drive wheel 20a. This can take place, for example, by means of a rack. The vertical drive 20 is connected to a traveling drive 22, which drives a traveling-drive wheel 22a. The traveling-drive wheel 22a is adapted to the rail 23 and runs between two rails 23 arranged one above the other. By means of the traveling drive 22, the drive unit 9' can be displaced on the rails 23 and, for docking to the arm device 6, is moved beyond the latter and oriented such that the longitudinal axes of the drive unit 9' and of the drive shafts of the arm device 6 are in alignment.

A coupling unit 24, e.g. an electromagnetic coupling, is arranged beneath the upper-arm drive 15 and is intended for interacting with a coupling element 25, which is fitted at the upper end of the upper-arm drive shaft 12. The upper-arm drive shaft 12 and the lower-arm drive shaft 19, which is arranged in it, are guided in a rotary and vertically adjustable manner in the guide unit 18.

The upper end of the lower-arm drive shaft 19 projects by a certain distance out of the upper end of the upper-arm drive shaft 12.

The upper end of the lower-arm drive shaft 19 has an outer cross section which corresponds with the inner cross section of a lower-arm shaft coupling 14a of the lower-arm drive 14, in order to transmit torque. Similarly, the upper end of the upper-arm drive shaft 12 is provided with an inner-coupling portion 12c with an inner cross section which corresponds with the outer cross section of a projecting outer-coupling portion 15b of an upper-arm shaft coupling 15a of the upper-arm drive 15.

Figure 16:
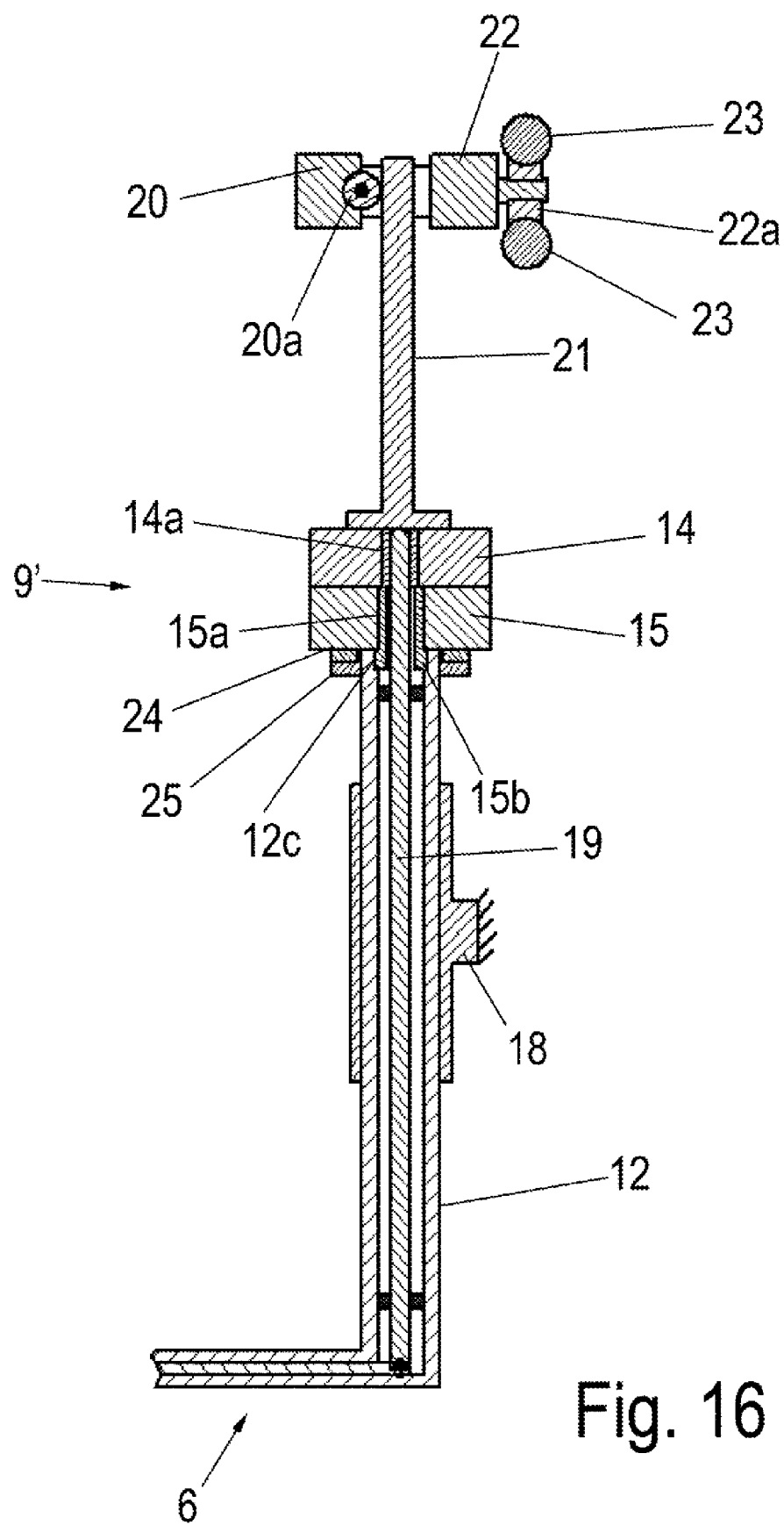
Figure 17:
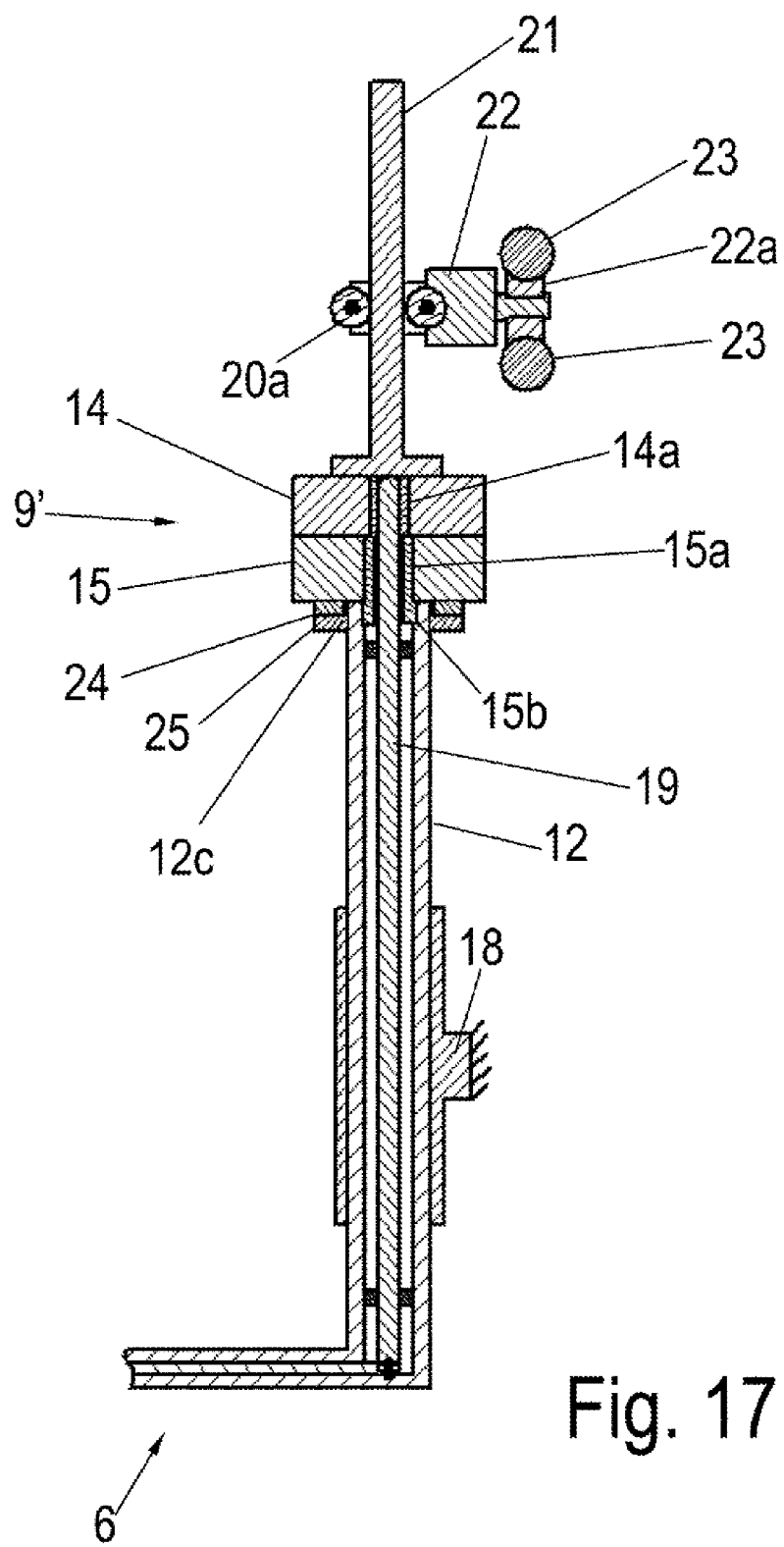

During the docking operation, the vertical drive 20 adjusts the drive unit 9' vertically downward by means of the holder 21. FIG. 16 shows the "docked" operating position. The coupling unit 24 here interacts with the coupling element 25 and thus establishes a connection between the drive unit 9' and arm device 6. The upper end of the lower-arm drive shaft 19 is introduced in the lower-arm shaft coupling 14a of the lower-arm drive 14 and is connected thereto in a form-fitting manner. The projecting outer-coupling portion 15b of the lower end of the upper-arm shaft coupling 15a of the upper-arm drive 15 is introduced into the inner-coupling portion 12c of the upper end of the upper-arm drive shaft 12 and connected thereto in a form-fitting manner. The drive unit 9' can then drive the arm device 6 by way of the shaft-drive motors 14 and 15, wherein the vertical drive 20 can adjust the arm device 6 with the milking cluster 5 in the vertical direction via the holder 21 and the coupling unit 24. FIG. 17 shows this in an "attachment" operating position. At the same time, it is also, of course, possible for the arms 10 and 11 to execute dedicated, independent movements by way of the drive unit 9'.

Figure 18:
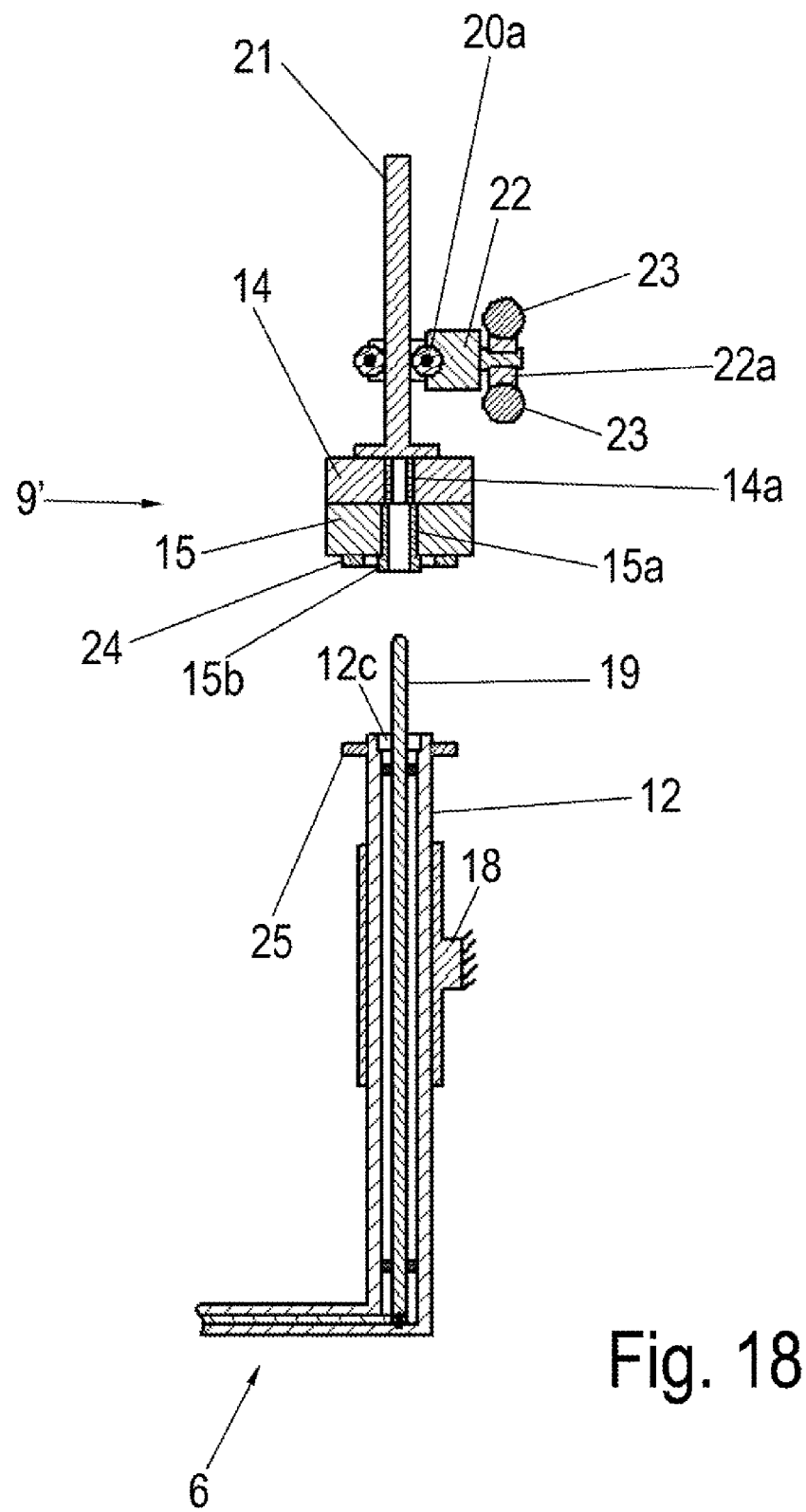

Following attachment of the milking cluster 5 with the arm device 6, the drive unit 9' can be removed again, which is shown in FIG. 18. This is done by the coupling unit 24 being released and the holder 21 being displaced upward by means of the vertical drive 20.

The operation of the arm devices 6 being moved back into the respective parked position following completion of the milking operation likewise takes place by way of the dockable drive units 9', wherein the latter are then displaced, on the rail 23, into the corresponding region of the milking parlor 1'''. This can be executed by the same drive units 9' or by additional ones.

Figure 19:
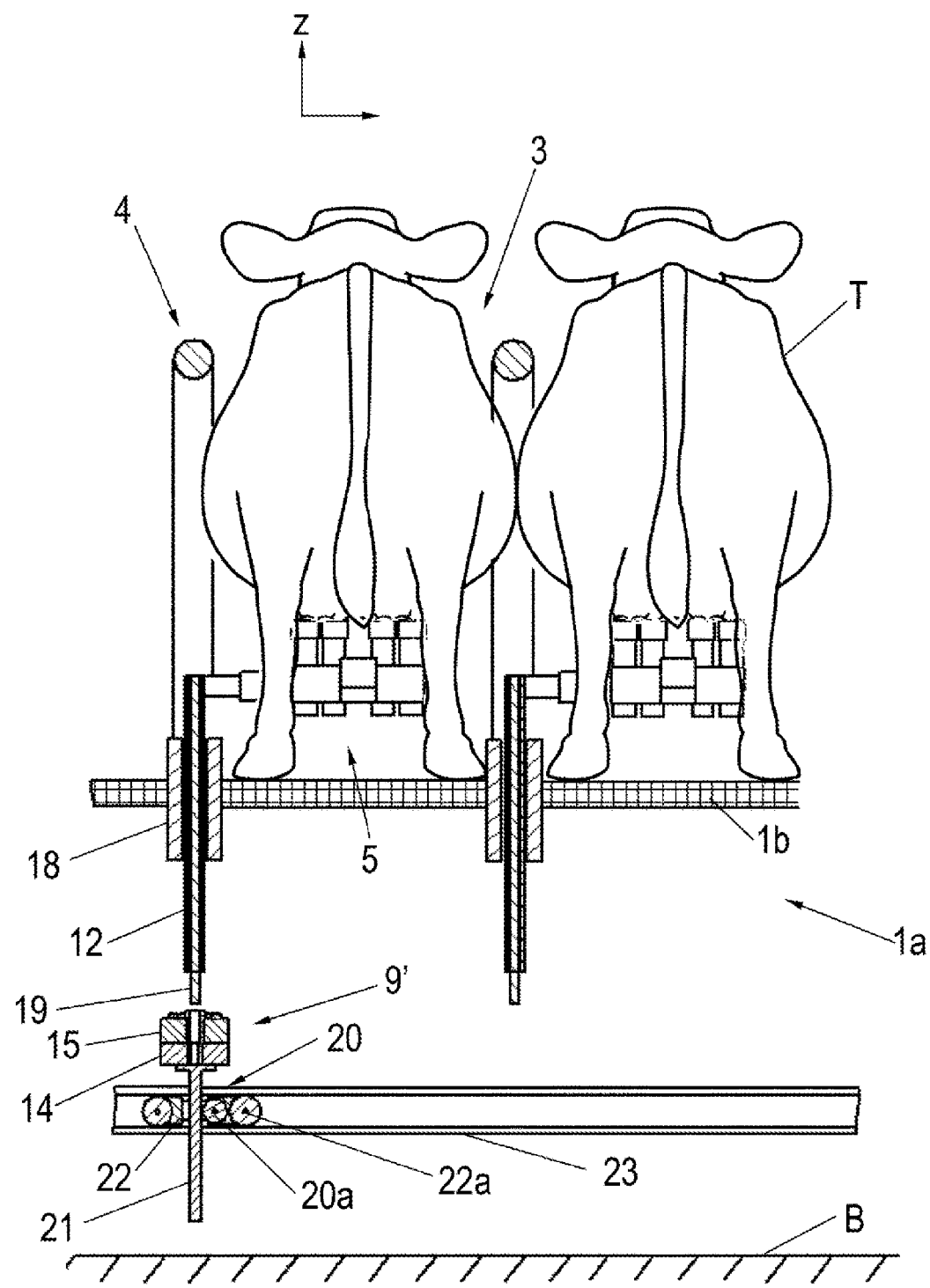
FIG. 19 shows a third variation of the divider according to the invention with the arm device in the operating position with drive unit dockable from beneath.

FIG. 19 shows a third variation of the divider 4 according to the invention with the arm device 6 in the operating position, in a manner similar to FIG. 13. The rail 23 here is arranged beneath the milking platform 1b, above the floor B, and the drive units 9', as described above, can now be docked onto the respective arm devices 6 from beneath.

Figure 20:
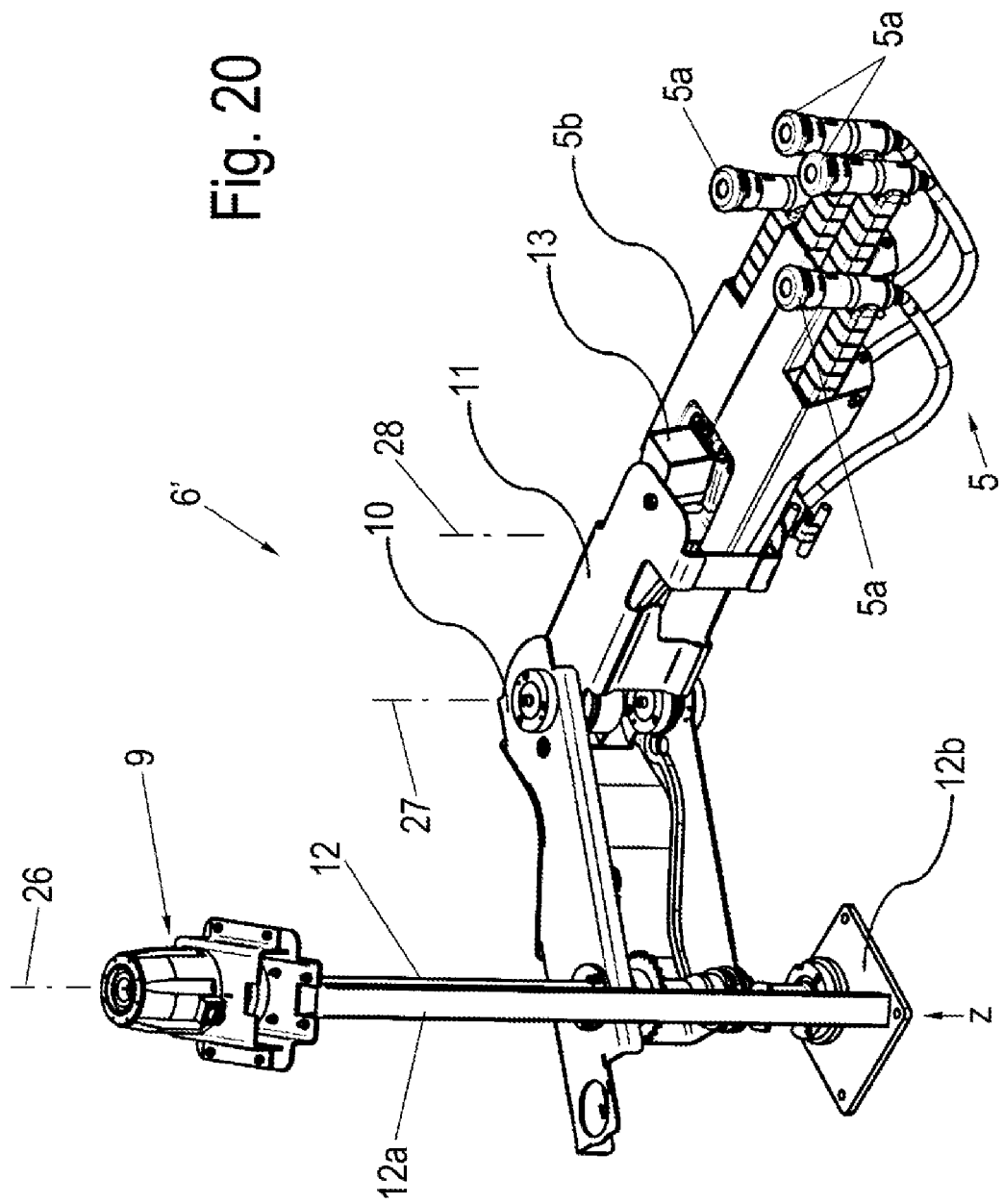
FIGS. 20-22 show perspective illustrations of different views of a first variation of the arm device of the divider according to the invention.
Figure 21:
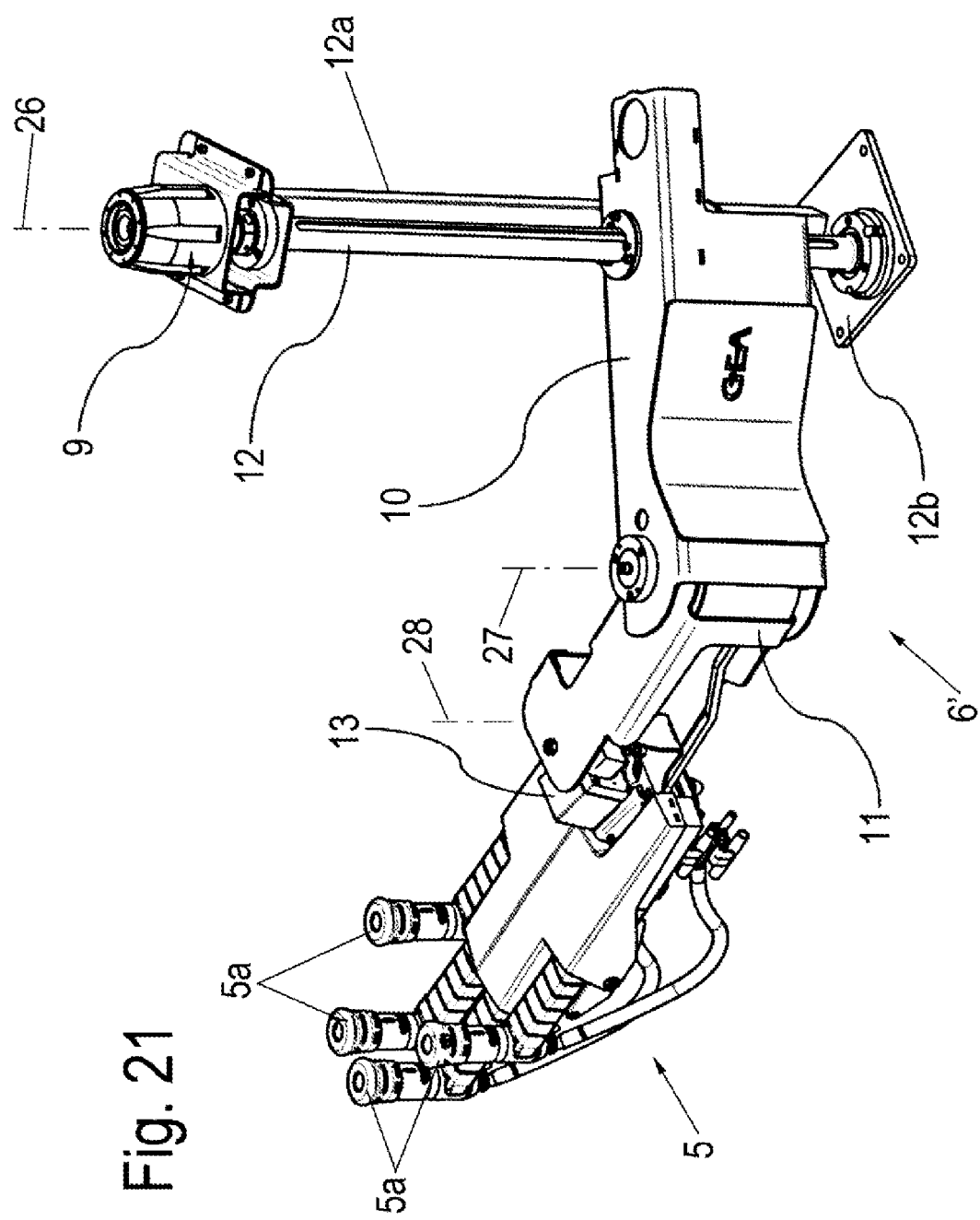
Figure 22:
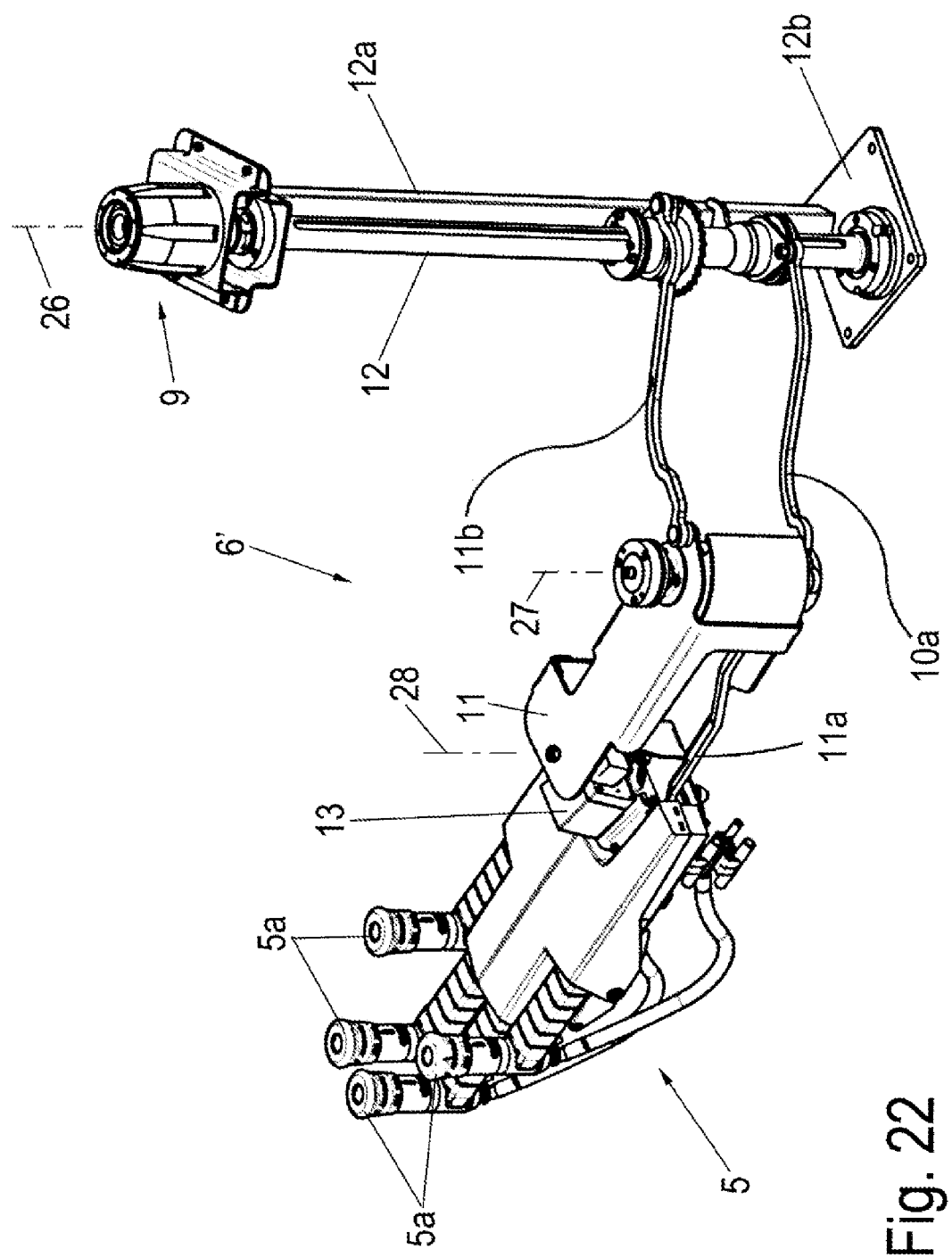

FIGS. 20-22 show perspective illustrations of different views of a first variation of the arm device 6' of the divider 4 according to the invention.

The drive unit 9 is fastened on the divider 4, or on a milking platform 1b, via an upright 12a with a fastening plate 12b.

The lower-arm drive 14 and the upper-arm drive 15 of the drive unit 9 move the milking cluster 5 laterally beneath the animal which is to be milked from the parked position in the divider 4 (not illustrated here) into the operating and attachment positions. The upper-arm drive 15 moves the upper arm 10 directly. The upper-arm drive 15, upper-arm drive shaft 12 and upper arm 10 form a single unit. The lower-arm drive 14 moves, and positions, the lower arm 11 via a push rod of the lower arm 10a.

The drive unit 9 is located along a vertical axis 26. The upper arm 10 and lower arm 11 are connected such that they can be pivoted along a vertical intermediate axis 27. The milking cluster 5 is fastened on the lower arm 11 by way of a milking-cluster carrier 5b such that it can be pivoted along a holder axis 28.

A parallel guide of the milking cluster 5 is realized by a fixed connection with intermediate articulations between the milking cluster 5 and lower arm 11 and a fixed-location fastening plate 12b by way of pushrods of the parallel guide 10b and 11a. The parallel positioning can be varied via adjustment at the fixed-location fastening plate 12b.

The arm device 6' is moved vertically along the vertical axis 26 by means of a vertical drive (not shown here).

The upper arm is displaced linearly on the upper-arm drive shaft 12, wherein the upper-arm drive shaft 12 is connected in a rotationally fixed manner to the upper arm 10, but forms a linear guide for the same.

FIGS. 23A through 23E show schematic illustrations of a movement sequence of the arm device 6' according to FIGS. 20 to 22.

Figure 23A:
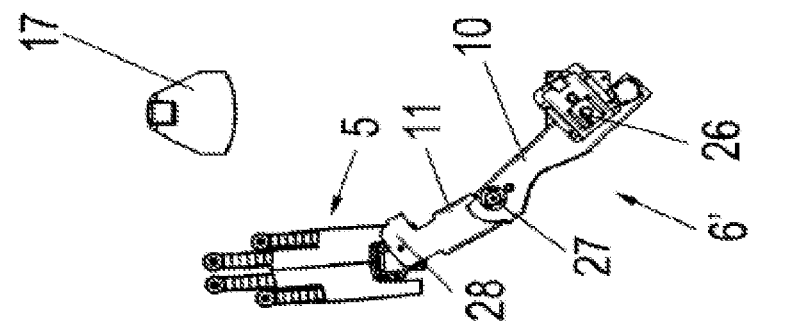
FIG. 23A shows a schematic of the arm device in a parked position.
Figure 23B:
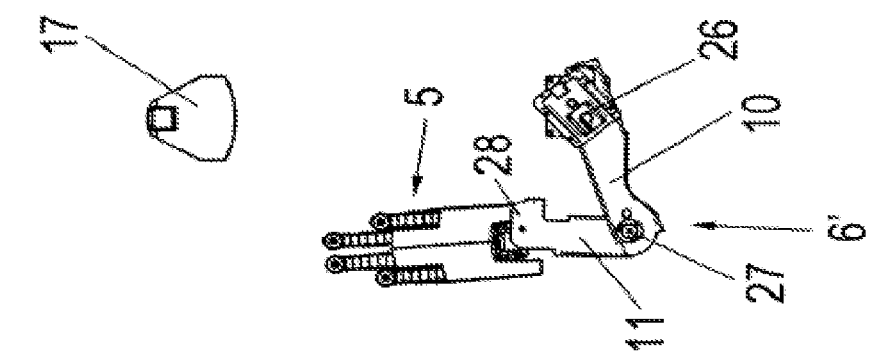
FIG. 23B shows a schematic of the arm device of FIG. 23A with the upper arm pivoted.
Figure 23C:
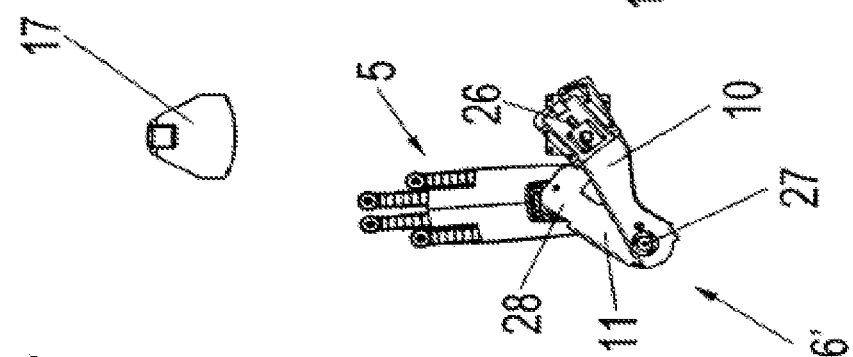
FIG. 23C shows a schematic of the arm device of FIG. 23A with the milking cluster spaced apart from a longitudinal axis of a divider.
Figure 23D:
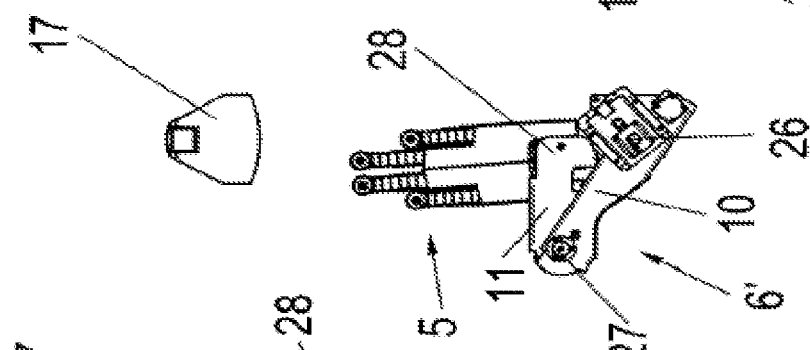
FIG. 23D shows a schematic of the arm device of FIG. 23A with the lower arm pivoted and the milking cluster spaced further apart from the longitudinal axis of the divider.

In position A (FIG. 23A), the milking cluster 5 is located in the parked position beneath the cleaning device 7 and is cleaned. At the start of milking, the milking cluster 5 is adjusted, in the first instance, vertically downward. Thereafter, the upper arm 10 pivots in the counterclockwise direction about the vertical axis 26 and pulls with it the milking cluster 5, which always remains in the same position relative to the longitudinal axis of the divider 4 (not shown, but easily conceivable, here) as a result of the parallel guide. This is shown in position B (FIG. 23B).

The upper arm 10 pivots further in the counterclockwise direction and reaches the position C (FIG. 23C), wherein the milking cluster 5 is spaced apart from the longitudinal axis of the divider 4.

In position D (FIG. 23D), the lower arm 11 is pivoted in the counterclockwise direction and the distance between the milking cluster 5 and longitudinal axis of the divider 4 increases.

Figure 23E:
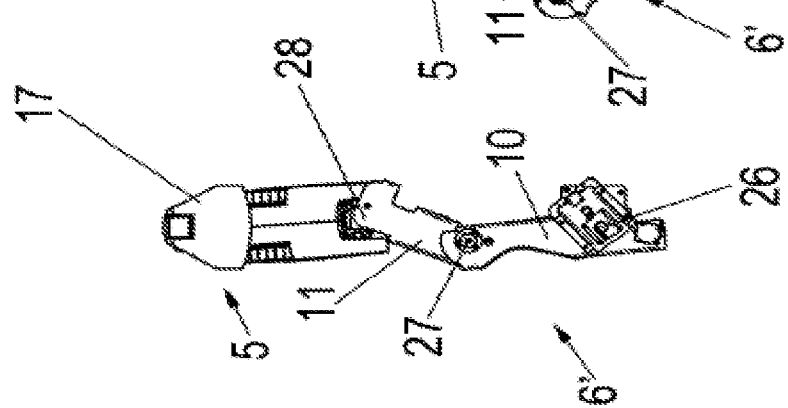
FIG. 23E shows a schematic of the arm device of FIG. 23A in an operating position.

Finally, the upper arm 10 is pivoted in the clockwise direction, wherein the lower arm 11 pivots in the counterclockwise direction and reaches the operating or attachment position at E (FIG. 23E). For attachment purposes, a further vertical adjustment of the arm device 6' takes place in the upward direction, it being possible for said adjustment, depending on the animal, to be preset.

The milking cluster 5 is thus pivoted in a U-shaped movement from the parked position into the operating position.

Figure 25D:
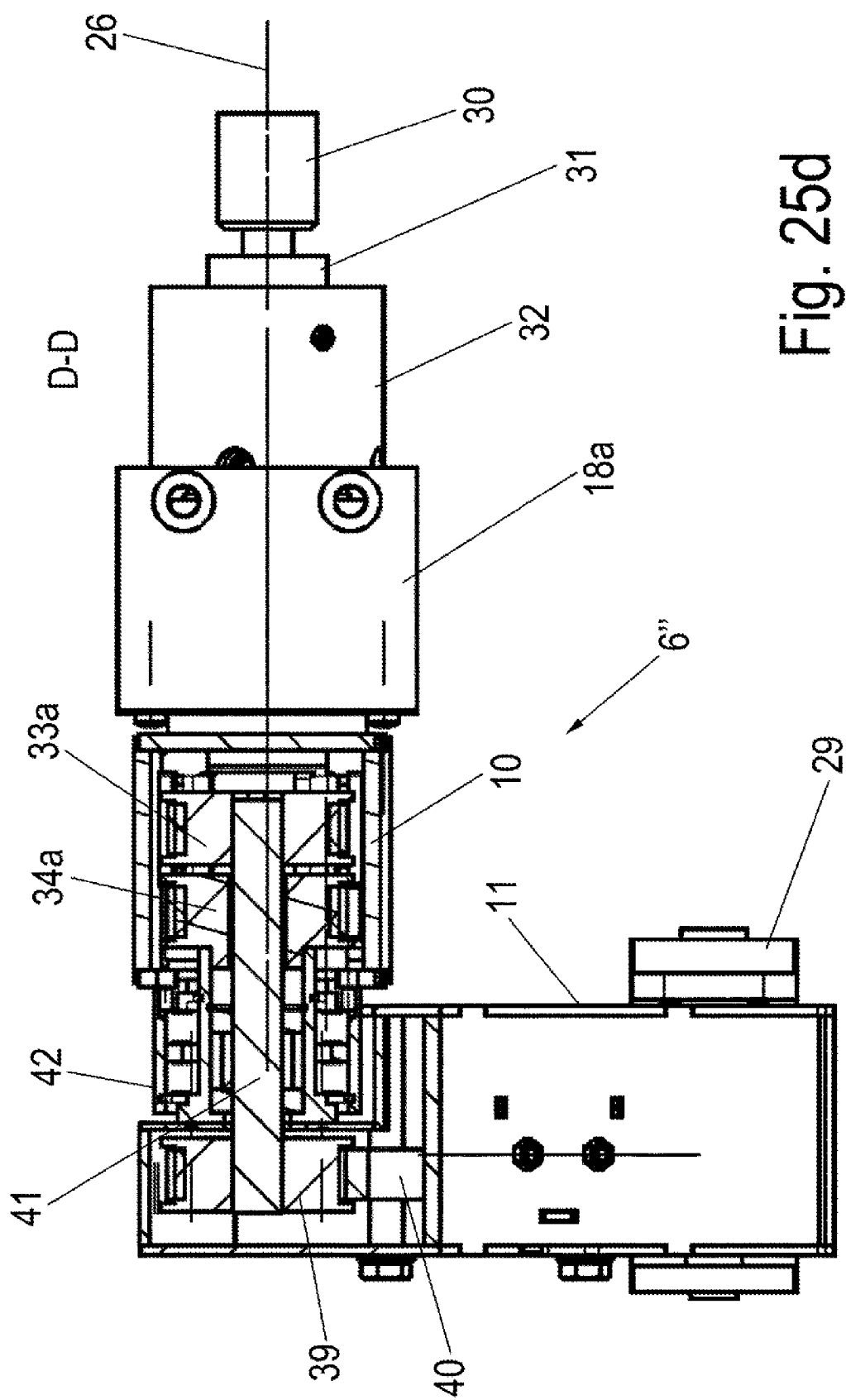

FIG. 24 shows a perspective illustration of a second variation of the arm device 6" of the divider 4 according to the invention. FIGS. 25 to 25d show different illustrations of different views and sections of the second variation of the arm device 6" according to FIG. 24.

A guide unit 18a is designed here in the form of a quadrilateral tube and serves for fitting the arm device 6" at a fixed location, and in a rotationally fixed manner, for example on the divider 4.

A lower-arm drive shaft 30, a parallel-guide reference means 31, in the form of a first hollow shaft, and an upper-arm hollow drive shaft 32 are arranged within the guide unit 18a, in alignment with the vertical axis 26.

The upper arm 10 and the lower arm 11 are configured here, for example, in the form of hollow profiles. Of course, they may also be designed in some other way. An angled holder 29 for the milking cluster 5, it being possible for said holder to be pivoted about the holder axis 28, is provided at the free end of the lower arm 11.

If the upper-arm hollow drive shaft 32 is driven, the upper arm 10 pivots about the vertical axis 26. If the lower-arm drive shaft 30 is driven, then in this case a traction means, e.g. a belt, which forms the lower-arm drive element 36 (FIG. 25b), transmits the pivoting movement from a lower-arm drive roller 34, which is connected to the lower-arm drive shaft 30, to a further lower-arm drive roller 34a, which is arranged along the intermediate axis 27. The further lower-arm drive roller 34a is connected to the lower arm 11 and thus pivots the lower arm 11.

The lower-arm drive element 36 is coupled to a tensioning unit 38, e.g. a belt tensioner, and thus forms elastic overload protection against kicking or for cushioning purposes in the event of collisions with animals, e.g. the legs thereof.

The parallel-guide reference means 31 predetermines the angled position of the parallel guide and is not driven in an active sense. This angled position can be defined beforehand and altered. This angled position is transmitted directly via a parallel-guide drive element 35, e.g. traction means (belt) from a parallel-guide roller 33, which is connected to the parallel-guide reference means 31, to a further parallel-guide roller 33a, which is arranged along the intermediate axis 27, as can be gathered from FIG. 25a. The further parallel-guide roller 33a is connected to a parallel-guide roller 39 of the lower arm 11 via a coupling shaft 41. The two parallel-guide rollers 33a and 39 thus have the same angled positions. The coupling shaft 41 is mounted in a bearing unit 42 (FIG. 25d) and extends through the lower-arm drive roller 34a, which is fixed to the lower arm 11 via the bearing unit 42. A further parallel-guide drive element 40, e.g. a traction means (belt) transmits the angled position of the parallel-guide roller 39 to a further parallel-guide roller 39a, which is arranged along the holder axis 28 and is coupled to the holder 29 for the milking cluster 5. This is shown in FIG. 25c.

In this way, the pivoting action of the milking cluster 5 about the holder axis 28 has parallel guidance and, irrespective of the movements of the upper arm 10 and lower arm 11 about the axes 26, 27, a constant angled position determined by the parallel-guide reference means 32.

Also arranged in the lower arm 11 is a tension unit 38', e.g. a belt tensioner, and this further contributes to the elastic overload protection. Moreover, the parallel-guide drive element 35 in the upper arm 10 is coupled to two damping units 37, 37', comprising spring tensioners, and also contributes to the overload protection.

The advantages of the arm device 6" with the drive elements 35, 36, 40, i.e. traction means, are listed hereinbelow.

Figure 26:
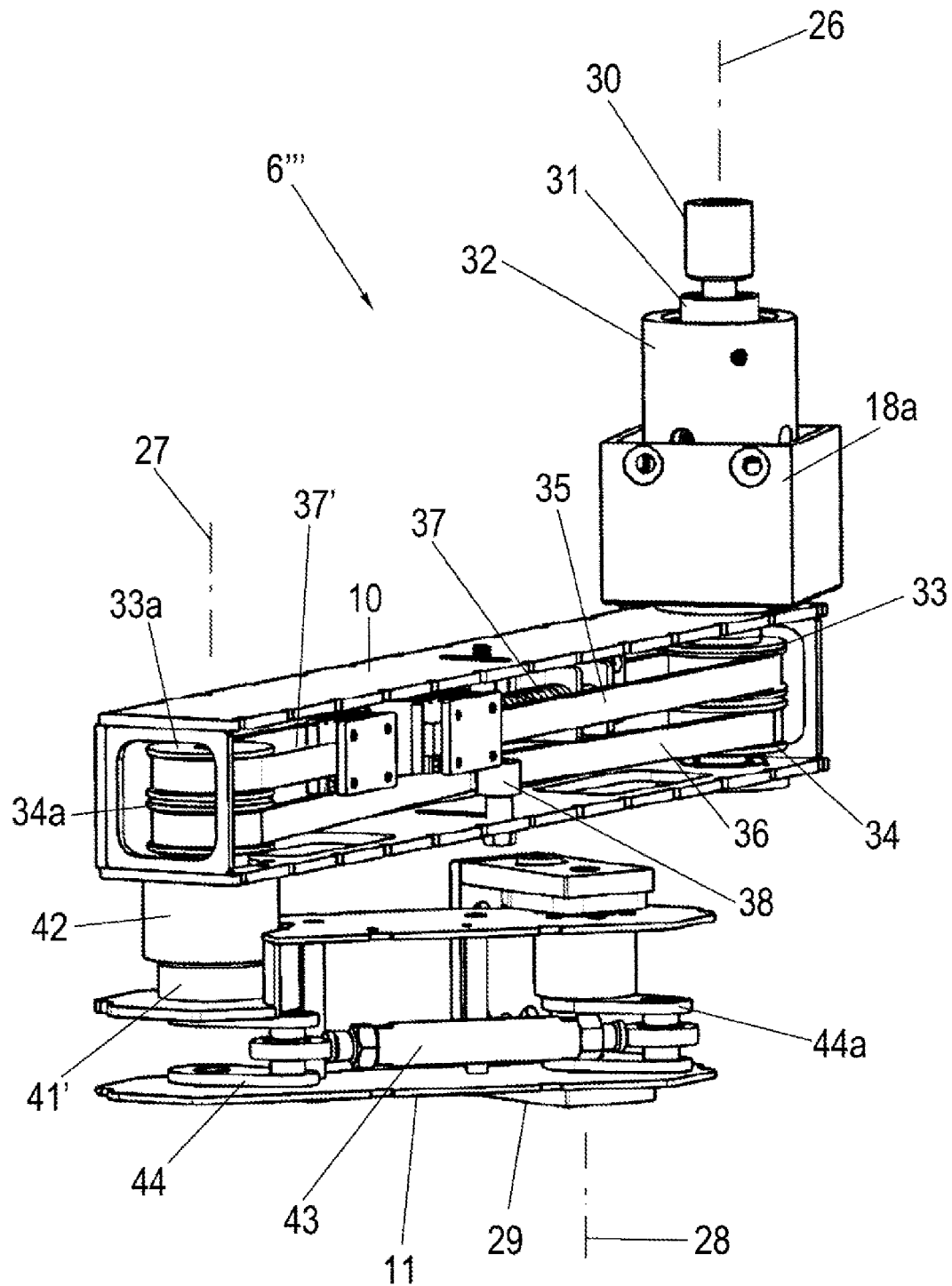
FIG. 26 shows a perspective illustration, partly in section, of a third variation of the arm device of the divider according to the invention.

The parallel guide has positive guidance without any additional measuring systems The parallel guide does not require any additional actuator Drive elements 35, 36, 40 arranged inside the arms allow for a very narrow construction There are no dead centers, as in the case of push rods Using shafts in hollow shafts gives rise to a narrow construction Belts give a low noise level Compliance (kicking protection), action like a small spring General overload protection provided by traction means and also additional tensioners FIG. 26 shows a perspective illustration, partly in section, of a third variation of the arm device 6''' of the divider 4 according to the invention. The arms 10 and 11, to give a better illustration, are shown in the open state.

In this variation, the upper arm 10 is configured like the upper arm 10 including the drive shafts of the second variation according to FIGS. 24-25. The parallel guide of the lower arm 11 is formed here, in combination with the traction means of the upper arm 10, by a connecting rod 43, which has its ends articulated on coupling levers 44, 44a and thus renders the parallel guide possible. The coupling lever 44 is connected to the parallel-guide roller 33a of the upper arm 10 via the coupling shaft 41' and thus transmits the angled position of the parallel-guide reference means 32 to the connecting rod 43 and the holder 29 with the milking cluster 5.

Figure 27:
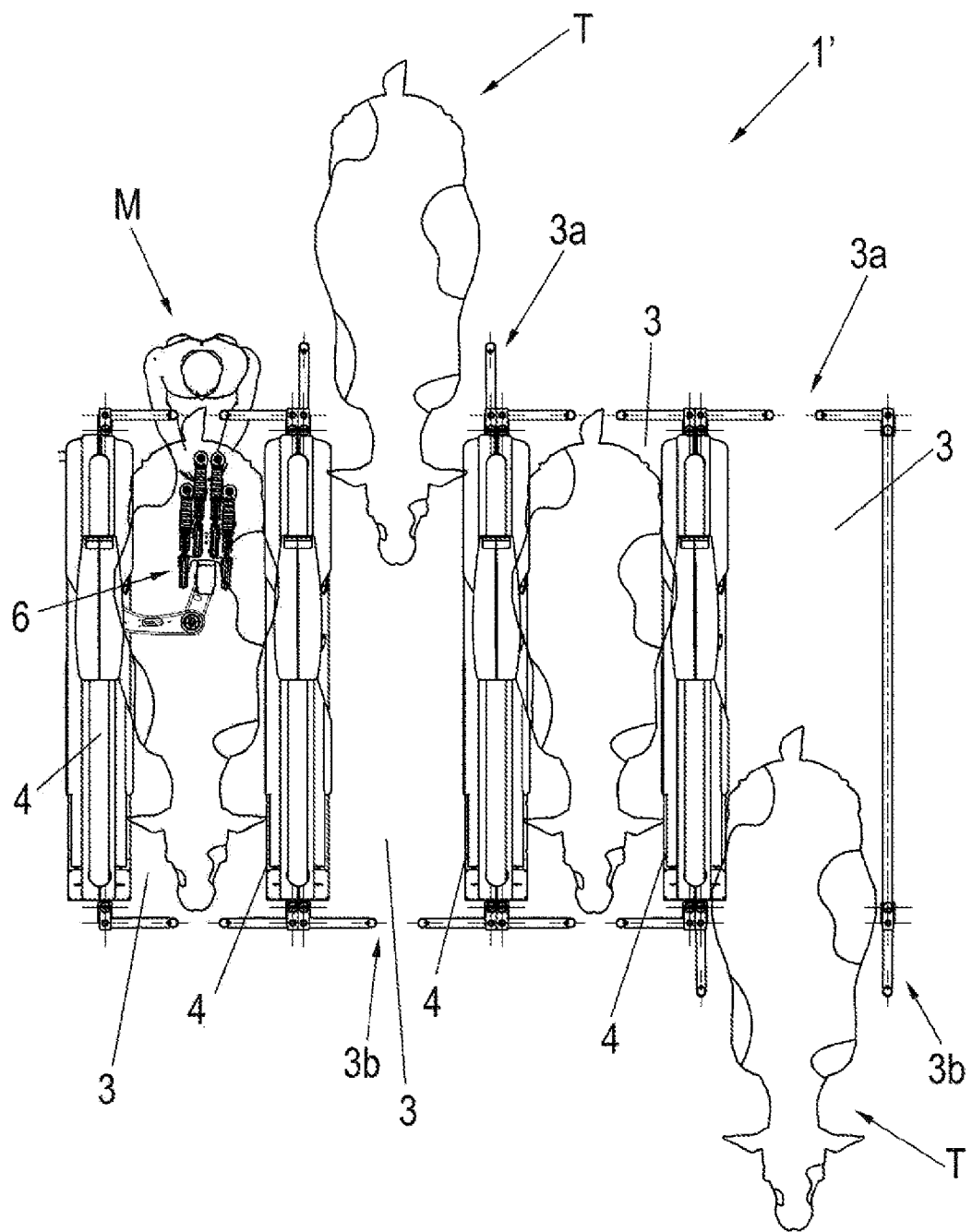

FIG. 27 shows a schematic plan view of a variant of the second exemplary embodiment according to FIGS. 2-2a. This variant is also referred to as a walk-through milking parlor 1'. The milking stalls 3 are separated laterally by the dividers 4. Gates 3a, 3b are arranged in each case on the narrow rear sides and front sides of the milking stalls 3, wherein the gates 3a are open on the rear sides in order to form an inlet for an animal T into the milking stall 3 (second milking stall 3 from the left in FIG. 27). The animal T cannot exit on the front side, since the front sides are closed by the gates 3b. If an animal T is located in its entirety in the milking stall 3, then the gates 3a of the rear side are closed (first and third milking stalls 3 from the left in FIG. 28).

Figure 28:
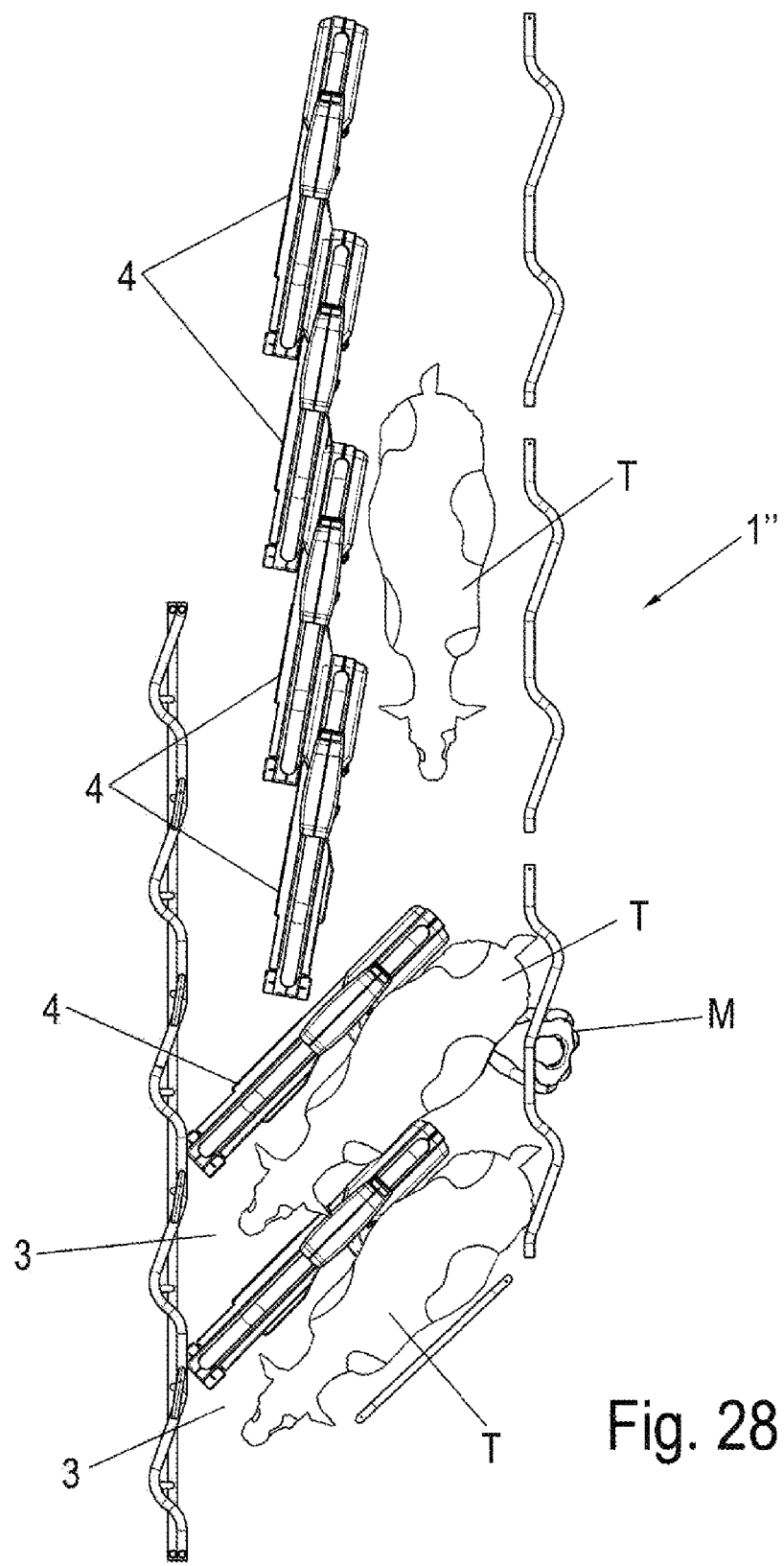
FIG. 28 shows a schematic plan view of a variant of the third exemplary embodiment according to FIG. 3.

Following completion of the milking operation, the gates 3*b* of the front side open, and the animals T can leave the milking stall 3 again, as is illustrated for the fourth milking stall 3 from the left in FIG. 28.

A type of fishbone construction is, of course, also possible, wherein the milking stalls 3 are separated by the dividers 4. This is shown in FIG. 28, in a schematic plan view of a variant of the third exemplary embodiment according to FIG. 3. In FIG. 3, the milking stalls 3 are formed by the dividers 4, which have been swung in relation to one another beforehand to form an entrance passage, wherein the dividers 4, swung in relation to one another, form a continuous boundary for this entrance. Once the first animal T reaches that end of the milking parlor which is formed by a boundary (not referred to in any more detail), which in FIG. 3 stands at right angles to the longitudinal axis of the entrance, and in FIG. 28 stands at an angle, e.g. 45°, to the longitudinal axis of the entrance, then the first divider 4 is rotated in the clockwise direction until it runs parallel to said boundary and forms the first milking stall 3 therewith. In this way, all the milking stalls are formed one after the other by corresponding pivoting of the dividers 4. The oblique positioning of the animals T, i.e. the imaginary longitudinal axes of the animals run at an angle to the longitudinal axis of the entrance, means that the hindquarters of the animals T are free from the side for access by a milker M. In FIG. 28, this side is the left-hand side of each animal T.

It is also possible, in the case of the milking parlors 1" according to FIGS. 3 and 28, for the dividers 4, rather than being swung in relation to one another, to be arranged such that they can be displaced along their longitudinal axes. This will be described in yet more detail hereinbelow. The dividers 4 have already been positioned parallel to the boundary (at right angles or obliquely) beforehand outside the region of the animals T. As soon as the first animal T has positioned itself with its imaginary longitudinal axis alongside the boundary, the first divider 4 is pushed, in the direction of its longitudinal axis, into the region of the animals T so as to stand on the other side of the animal T and form the milking stall 3. When the animals leave the milking stalls 3 formed in this way, the boundary is opened (pivoted or also displaced in the direction of its longitudinal axis), and the first animal T can leave the milking stall 3. Thereafter, the boundary of the first dividers 4 is pushed back again, in the direction of its longitudinal axis, into its starting position, etc.

Figure 29:
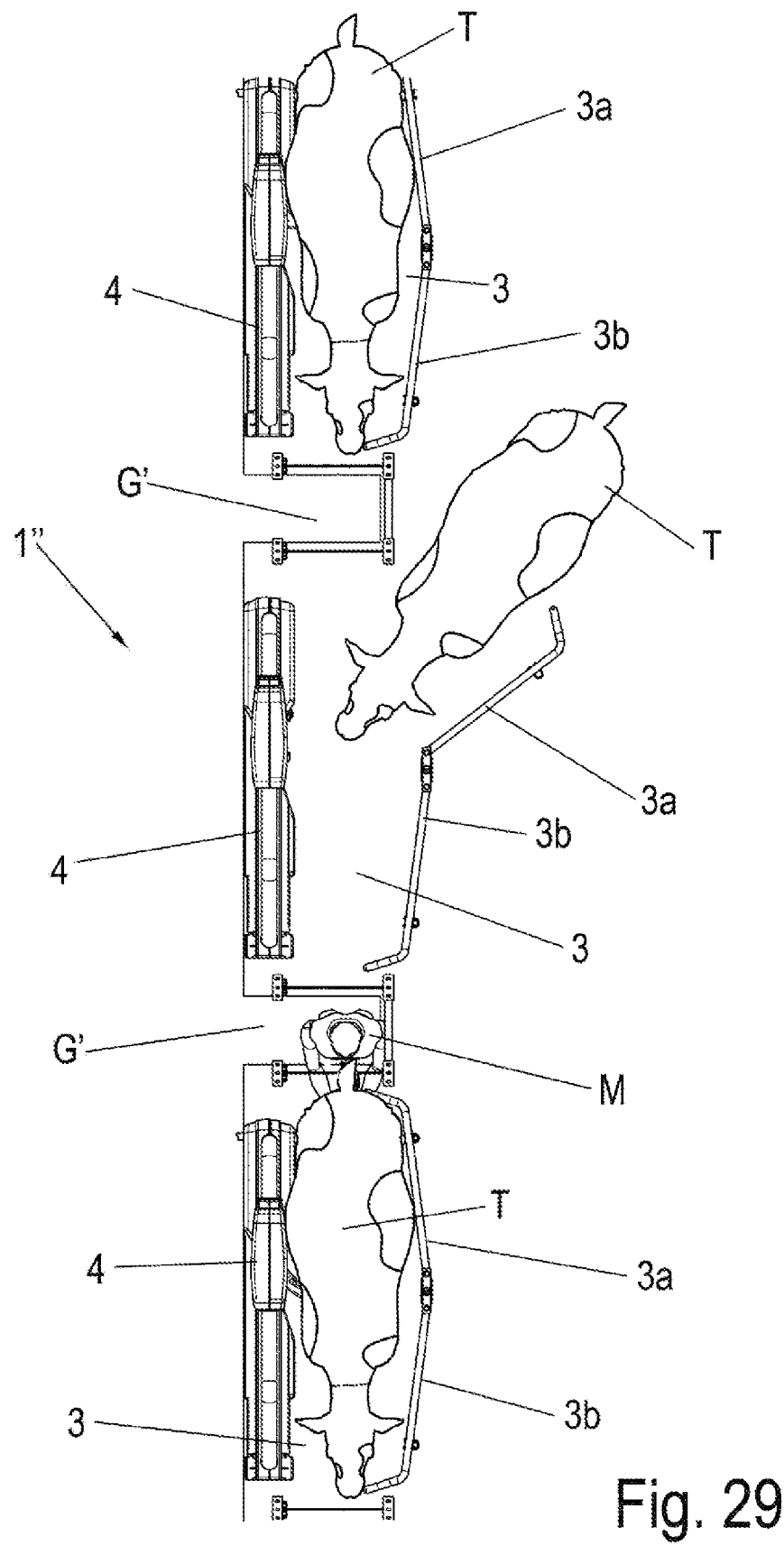
FIG. 29 shows a schematic plan view of a further variant of the third exemplary embodiment according to FIG. 3.

FIG. 29 illustrates a schematic plan view of a further variant of the third exemplary embodiment according to FIG. 3. This milking parlor 1" is also referred to as a tandem milking parlor. Here, the milking stalls 3 are arranged one behind the other or in a row, wherein their narrow sides are spaced apart by the pit G' for the milker M and each have boundaries, e.g. railings. The longitudinal sides of the milking stalls 3 are formed, on the one hand, by a divider 4 and, on the other hand, by a two-part boundary, designed in the form of gates 3*a*, 3*b*. The gate 3*a* of the central milking stall 3 has been pivoted open, in order to allow an animal T into the milking stall 3, the gate 3*b* being closed. Both gates 3*a*, 3*b* are closed during the milking operation. Following completion of milking, the gate 3*b*, which is oriented in the direction of the head of the animal T, opens, and the animal T can leave the milking stall 3.

Figure 30:
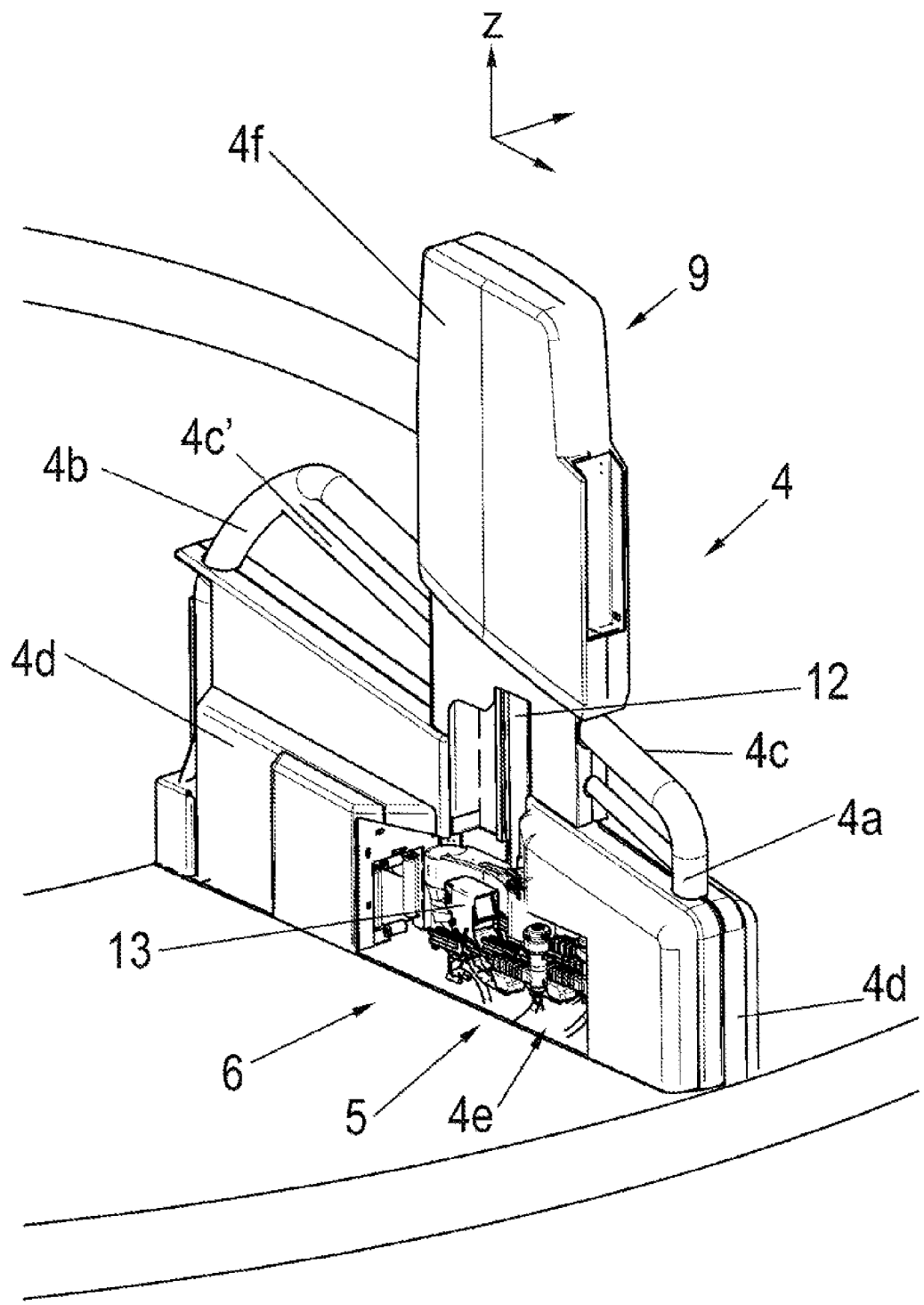
FIG. 30 shows a schematic view, in perspective, of the divider according to the invention from FIG. 4 with a cladding variant.
Figure 31:
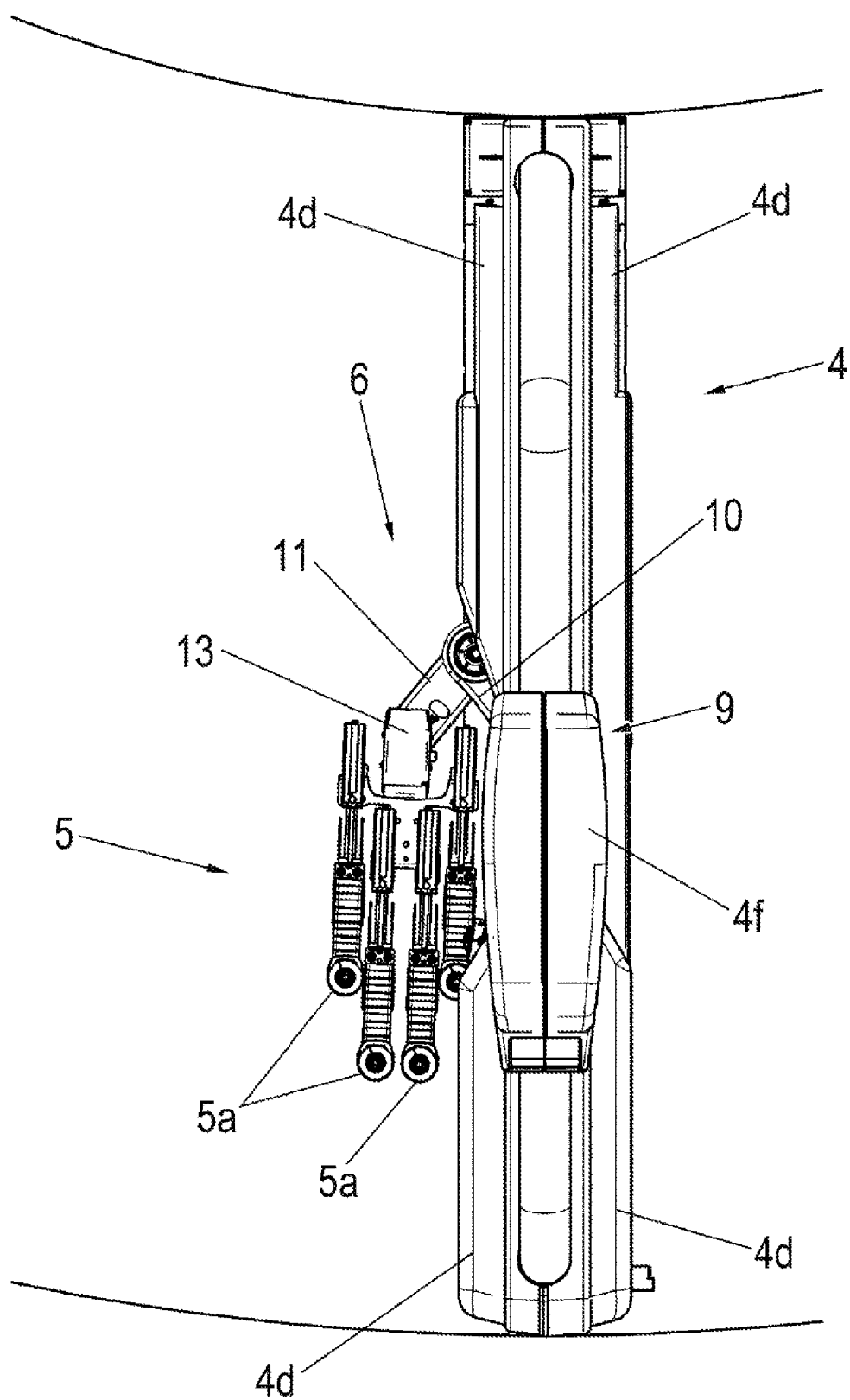
FIG. 31 shows a schematic plan view of the divider according to the invention from FIG. 30.

FIG. 30 illustrates a schematic view, in perspective, of the divider 4 according to the invention from FIG. 4 with a cladding variant. FIG. 31 shows a plan view with the milking cluster 5 partially extended. The post 4*a* is lower than the post 4*b*. This gives the advantage that a cow can leave the milking stall 3, in particular a milking stall 3 on the rotary milking parlor, more quickly since it can swing its head over the upper horizontal bar 4*c* as it rotates with it. This allows for quicker animal movement. The post 4*b* has a curved connection to the horizontal bar 4*c*. A further horizontal bar 4*c*' is arranged for reinforcing purposes beneath the upper horizontal bar 4*c*, between the posts 4*a* and 4*b*, and connects the latter in addition. The cladding as a whole comprises the aforementioned lateral claddings 4*d* of the divider 4 and a drive cladding 4*f*, which closes the entire drive region in the vertical direction and on the narrow sides thereof. The underside of the drive cladding 4*f* is connected to the upper side of the lateral cladding 4*d* such that the divider 4 is encased on all sides. This transition region, in which the upper-arm drive shaft 12 extends through between the drive cladding 4*f* and the upper side of the cladding 4*d*, is shown in a partly cut-away state in FIG. 30. It is, of course, possible for the mount 4*e* to be closed, as described above, by an additional covering, which is not shown, but is easily conceivable, here.

Figure 32:
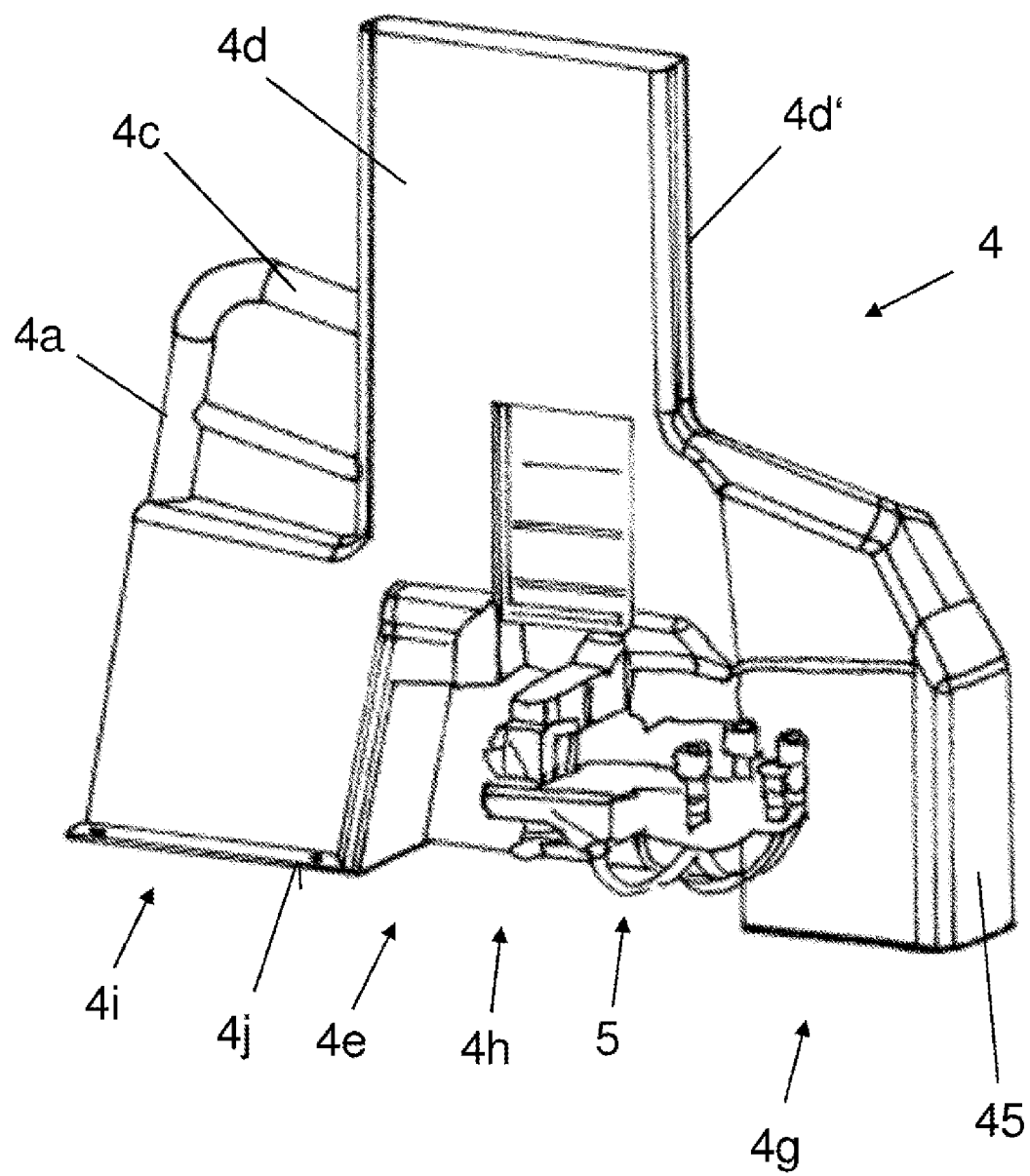
FIGS. 32-32b show schematic views of a further variant of the divider according to the invention from FIG. 4.
Figure 32A:
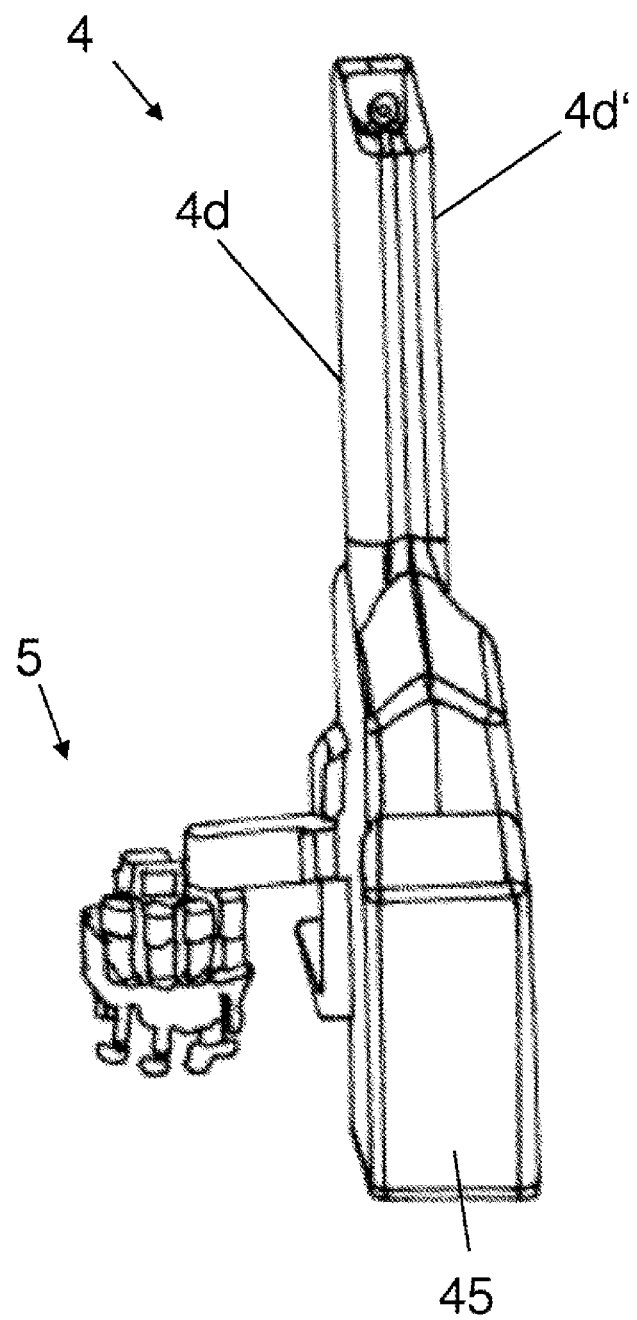
Figure 32B:
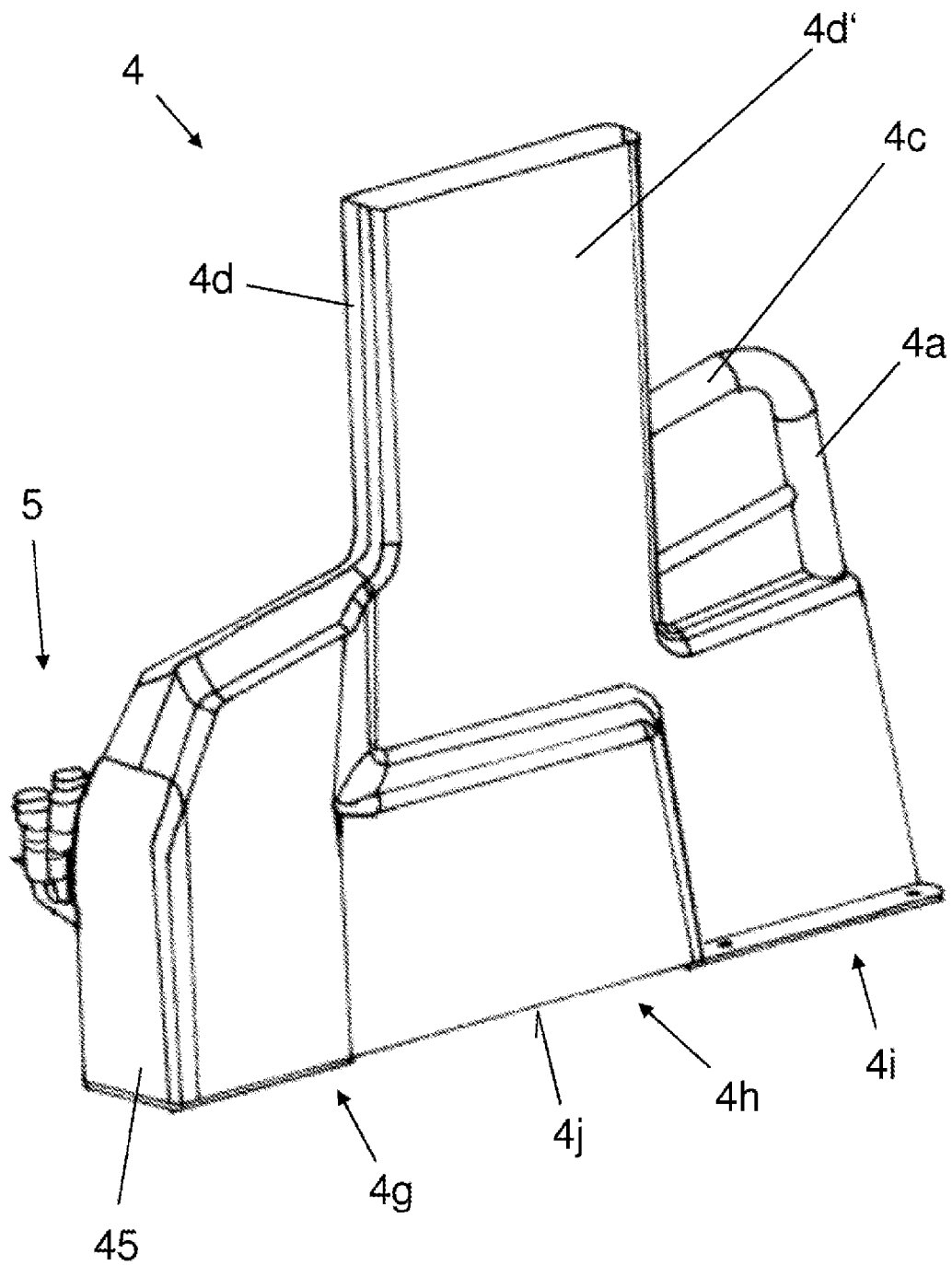

FIGS. 32, 32*a* and 32*b* show schematic views of a further variant of the divider 4 according to the invention from FIG. 4. FIG. 32 here shows a side view with the milking cluster 5. FIG. 32 illustrates a perspective view from the rear with the milking cluster 5 extended, and FIG. 32*b* shows a further side view.

The divider 4, in this variant, is of modular construction, which will be explained in detail hereinbelow. In this variant, the cladding 4*d* comprises two self-supporting half-shells, which are designated 4*d* and 4*d*'. They consist, for example, of 3 mm stainless-steel sheet and are formed by hydroforming.

These half-shells are divided up into portions 4*g*, 4*h* and 4*i*. The assignment of the portions 4*g*, 4*h* and 4*i* to the side of an animal T which is to be milked will be explained further hereinbelow in conjunction with FIG. 33*a*. The portion 4*g* is assigned to the hindquarters of an animal T which is to be milked and is referred to as the hindquarters portion 4*g*. It contains an accommodating space 47 for a service unit 46 (see FIGS. 34 and 34*a*). The accommodating space 47 can be closed on the end side by a cover 45 (see also FIGS. 34 and 34*a*). This will be described in yet more detail hereinbelow.

The hindquarters portion 4*g* is followed by a central portion 4*h*, which has the mount 4*e* for the milking cluster 5 with the arm device 6 and also the associated drives, as described above. The central portion 4*h* is assigned to the middle of the animal T which is to be milked.

A head portion 4*i* is assigned to the head of the animal T which is to be milked, and is connected to the post 4*a*, which is curved rearward over a radius on its upper side and merges into the horizontal bar 4*c*, which in this case is inclined downward to the rear. The horizontal bar 4*c* extends to a front end side of the central portion 4*h*, said front end side here extending upward and being connected to the horizontal bar 4*c*. The inclination of the horizontal bar 4*c* in the rearward direction continues in an inclination of the upper side of the hindquarters portion 4*g*.

An underside 4*j* of the divider 4 is configured such that the divider 4 can easily be removed from the milking stall 3 and installed on the milking stall 3. This is explained in yet more detail hereinbelow.

The divider 4 in this variant is formed with rounded edges and compact dimensions. This is easily possible using the relevant forming method. The two half-shells of the cladding 4d and 4d' may be connected to one another in different ways such that there are no problematic protrusions present on the outside.

Figure 33:
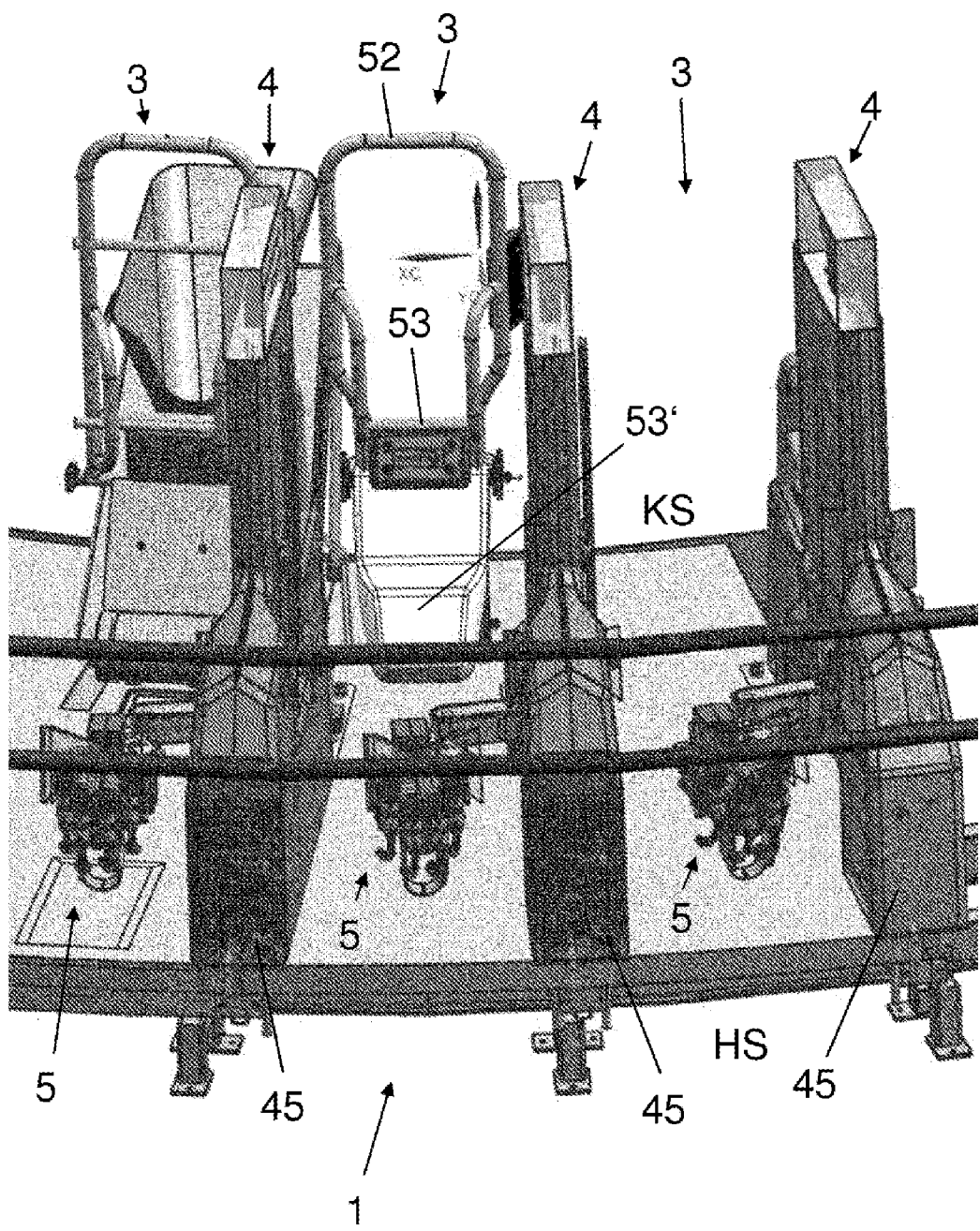
FIG. 33 shows a schematic view, in perspective, of a number of milking stalls according to the first exemplary embodiment from FIG. 1.
Figure 33A:
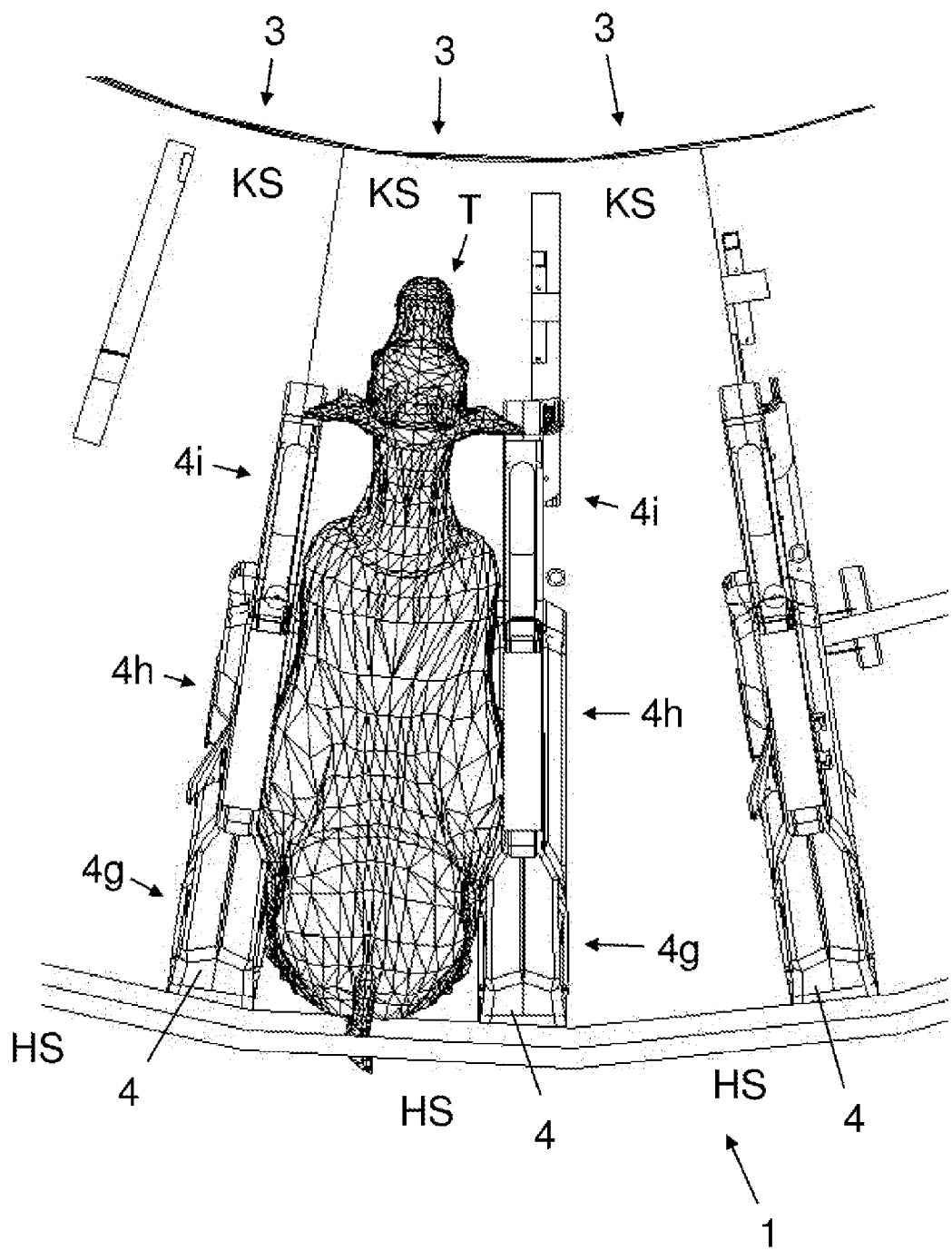
FIG. 33a shows a schematic plan view of the milking stalls according to FIG. 33.

FIG. 33 shows a schematic view, in perspective, of a number of milking stalls 3 according to the first exemplary embodiment from FIG. 1. FIG. 33a shows a schematic plan view of the milking stalls 3 according to FIG. 33.

The longitudinal sides of the milking stalls 3 are formed by the dividers 4, which in this case are arranged on a rotary milking parlor as in FIG. 1. The milking stalls 3 each have two narrow sides, each arranged between the front and rear ends of the longitudinal sides. One of the two narrow sides of a milking stall 3 here is referred to as the head side KS, that is to say that side which is assigned to the head of the animal T which is to be milked. The other of the two narrow sides is referred to as the hindquarters side HS; it is assigned to the hindquarters of the animal T which is to be milked.

The head sides KS of the two left-hand milking stalls 3 shown in FIG. 33 are each provided here with a frame 52 which has two detection devices 53, 53' arranged one above the other for the purpose of detecting the animal T which is to be milked, e.g. via RFID. This will not be described in any more detail here.

The dividers 4 are designed here in accordance with the variant of FIGS. 32-32b. This divider 4, despite its compact dimensions, contains all the components required for pre-dipping, teat cleaning, attaching the milking cluster, milking, removing the milking cluster and post-dipping. As a result, this variant of divider 4 is an independent module, which has all the components. This gives advantages for initial installation on site. Said dividers 4 are supplied in a completely assembled state and need just be connected to the common infrastructure (network, milk lines, compressed air, water, etc.) of the milking parlor. This can be done via respective quick-acting connections. There is also the advantage here that, for repair purposes, the entire divider 4, which may also be referred to as a stall unit, can easily be removed from the floor of the milking stall 3 and replaced by an overhauled or new divider 4. The modular construction of the divider 4 means that it is easily possible to provide embodiments corresponding to specific requirements, e.g. FDA (USA's Food and Drug Administration [FDA-conformity: the regulations of Good Manufacturing Practices—GMP—, which are contained in the Codes of Federal Regulations—CFR—of the USA's FDA, count as the worldwide standard in the milk-processing industry) and other versions.

It is, of course, also possible to provide, in addition (e.g. as a redundancy measure), functional groups in a further housing, e.g. on the head side of the milking stall 3, in the frame 52.

It is also possible here to use a dummy as a divider 4, if there is no replacement divider 4 available. This makes it possible for just one milking stall to be blocked off; otherwise, two milking stalls would have to be blocked off on account of the lack of divider 4.

FIG. 33a illustrates the assignment of the portions 4g, 4h and 4i of the dividers 4 on the longitudinal sides of a milking stall 3 to the animal T located for milking in the milking stall 3. The animal T, indicated here in the form of a cow, stands with its head directed toward the head side KS of the milking stall 3. The hindquarters of the animal T are located on the hindquarters side HS of the milking stall 3. The hindquarters portions 4g are assigned to the hindquarters of the animal T which is to be milked and the central portion 4h is assigned to the middle, and the head portions 4i are assigned to the head, of the animal T which is to be milked.

It can clearly be seen in FIGS. 33 and 33a that the dividers 4 adapt to the contour of the animal T which is to be milked. In the lower region (leg region), the dividers 4 are wider (accommodation of the CIP and of the swung-in milking cluster 5 with arm device 6). In the belly region of the animal T which is to be milked, the dividers 4 are extremely narrow. In the upper region of the animal T which is to be milked, slightly wider dividers 4 are possible.

FIG. 34 shows a schematic inside view of the variant according to FIG. 32 with a service unit 46 inserted.

Figure 35:
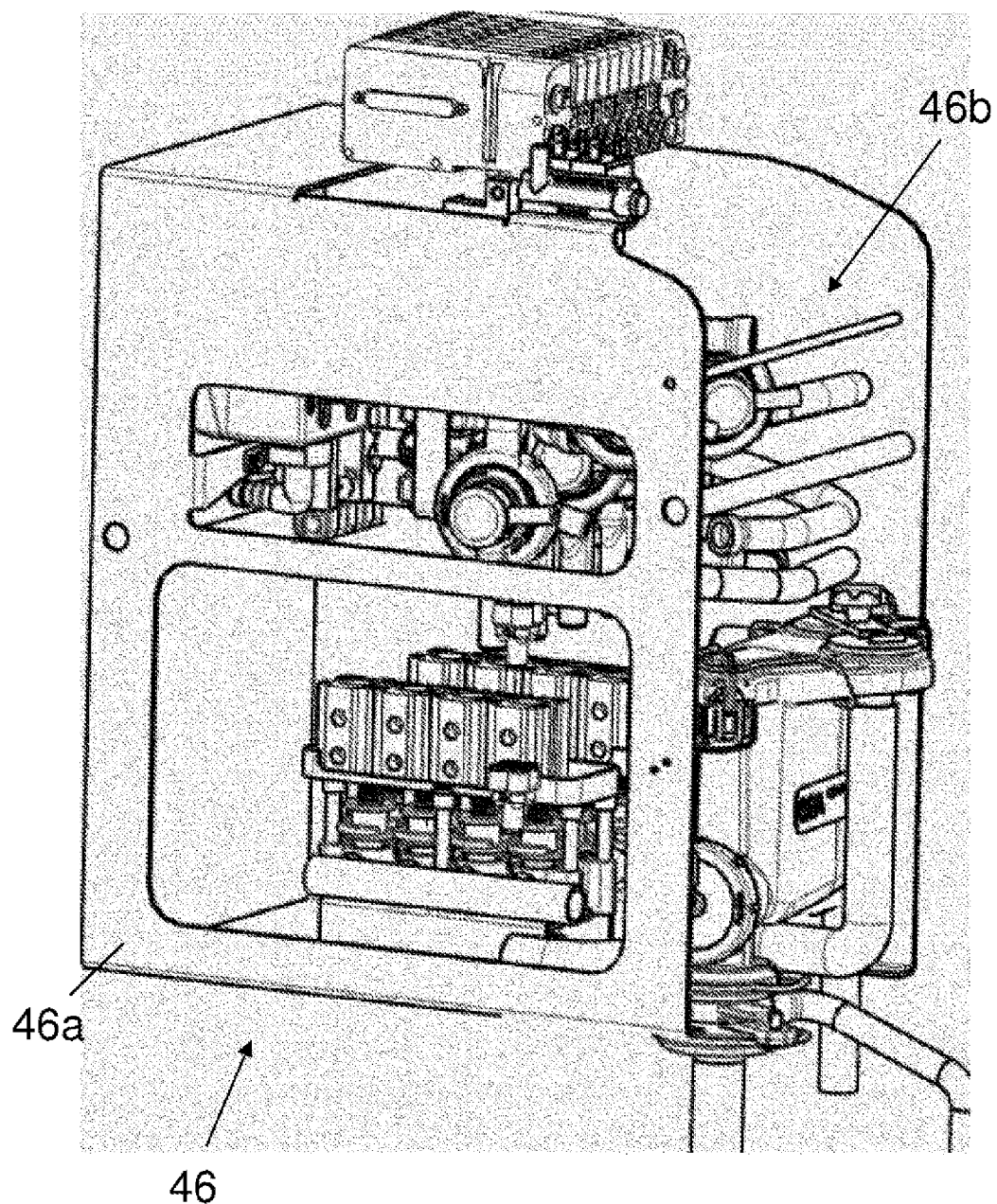
FIG. 35 shows a schematic view, in perspective, of a service unit.

FIG. 34a illustrates the inside view of the variant according to FIG. 34 with the service unit 46 removed. FIG. 35 shows a schematic view, in perspective, of the service unit 46.

The service unit 46 is inserted in the accommodating space 47 in the hindquarters portion 4g of the divider 4. The accommodating space 47 is closed by the covering 45. The service unit 46 contains all the service-specific, predominantly milk-channeling parts (seals, membranes, measuring devices, sensors and blood sensors). It can be replaced during operation by a new or overhauled service unit 46. For this purpose, the service unit 46 can easily be arrested within the accommodating space 47 and connected to an installation 49 via a suitable connecting device or devices 48 (e.g. quick-acting connectors). For this purpose, a specific connection configuration is provided for straightforward, correct changeover.

The installation 49 comprises centrally laid lines (e.g. control lines), which connect the devices of the service unit 46 to a control unit 50, which is arranged on the upper side of the central portion 4h of the divider 4. The installation 49 also connects the control unit 50 to a further functional-unit group 51. This functional-unit group 51 comprises, for example, pneumatics, electronics, dipping mechanisms, etc., and is arranged in the head portion 4i of the divider 4.

The service unit 46 (and also, correspondingly, the functional-unit group 51) has a carrying frame 46a, which can be inserted, and arrested, in the accommodating space 47 and carries all the components, e.g. a milk group with milk-channeling parts. The weight and the handling capability of the service unit 46 are therefore such that said unit is easy to insert and remove, carry and transport. The service unit 46 and the functional-unit group 51 are also referred to as a service rack, the expression rack meaning a carrying unit.

The covering 45 may be designed in the form of a separate part and/or fitted on the service unit 46.

The service unit 46 and the functional-unit group 51 are arranged in the respective portions 4g and 4i of the divider 4 such that they are readily accessible for straightforward assembly and repair.

The divider 4 may also have rollers on its underside 4j, following release of the quick-acting closures and a raising operation (weight approximately 300 kg), it can easily be removed. For assembly and maintenance purposes, the milking parlor 1 may be provided with a service stage (not shown), which interacts for example with an interruption in rear boundaries such that the divider 4 which is to be removed can easily be pushed onto this service stage. It is, of course, also possible for the service stage to have a crane for this purpose. Moreover, the milking parlor 1 or the service stage may be assigned a workbench, on which the divider 4 which is to be maintained or repaired can be connected on site by way of all the connections. For this purpose, said workbench may also have a clearance, so that the arm device 6 with the milking cluster 5 can be removed from the divider 4 or fitted. The changeover of a divider may thus last, for example, 10 minutes.

In the case of an exemplary milking parlor 1, an animal T is milked every 6 s, e.g. 3500 animals are milked three times a day. Two times one hour a day is therefore provided for cleaning, rinsing, etc. The milking parlor 1 should be in operation, as far as possible without any standstill, 24 hours a day and 7 days a week. To meet these requirements, the divider 4 in the above-described modular configuration is particularly advantageous since the quick maintenance and interchangeability minimize downtimes of the milking parlor 1.

Figure 36:
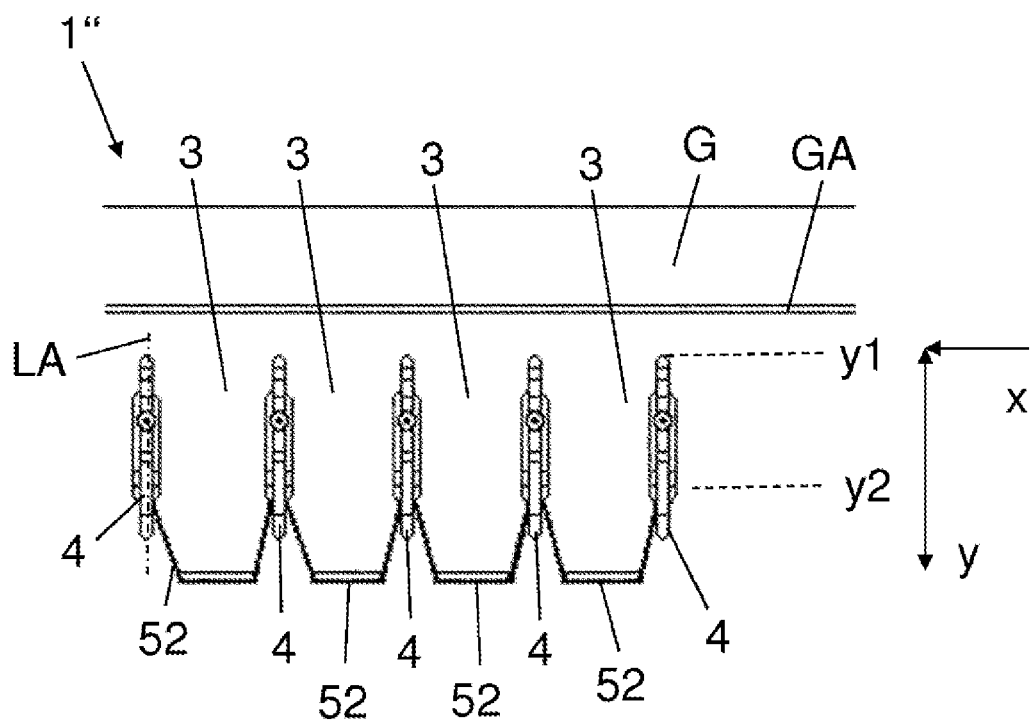
FIGS. 36-36c show a side-by-side milking parlor with adjustable dividers.
Figure 36A:
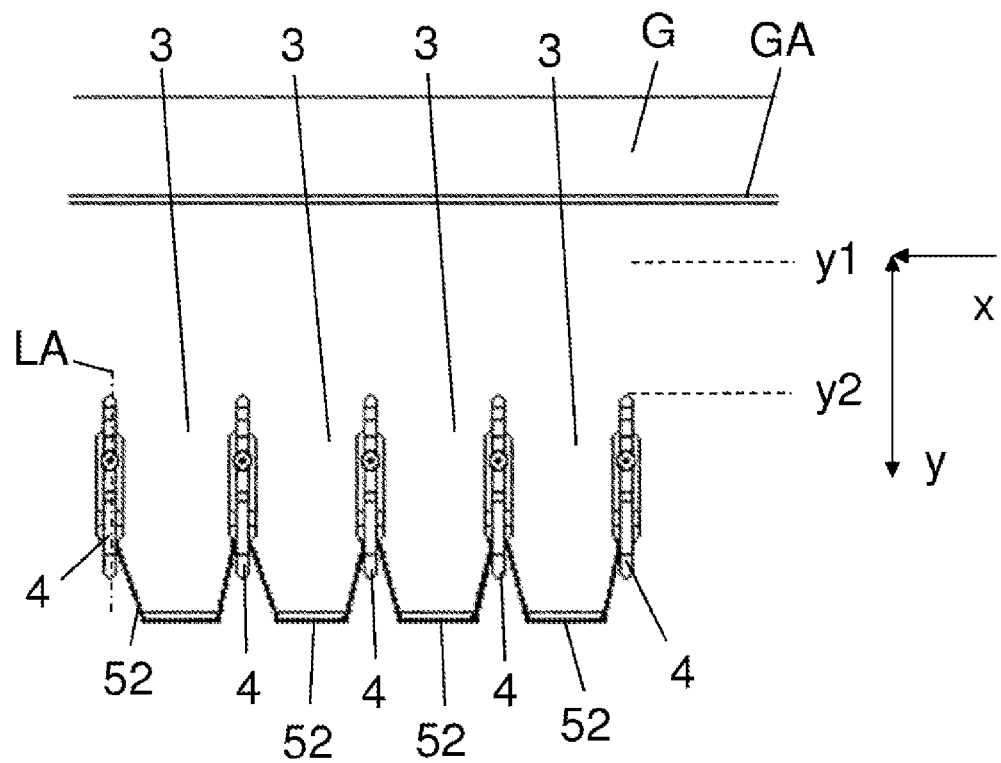
Figure 36B:
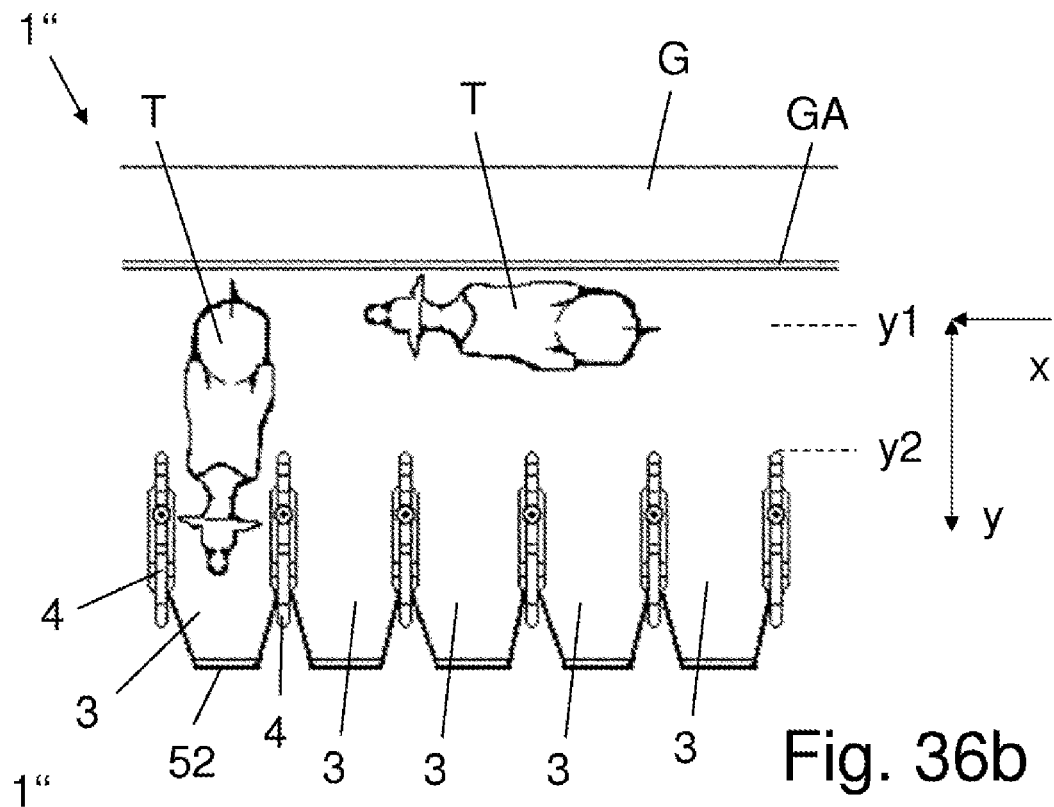
Figure 36C:
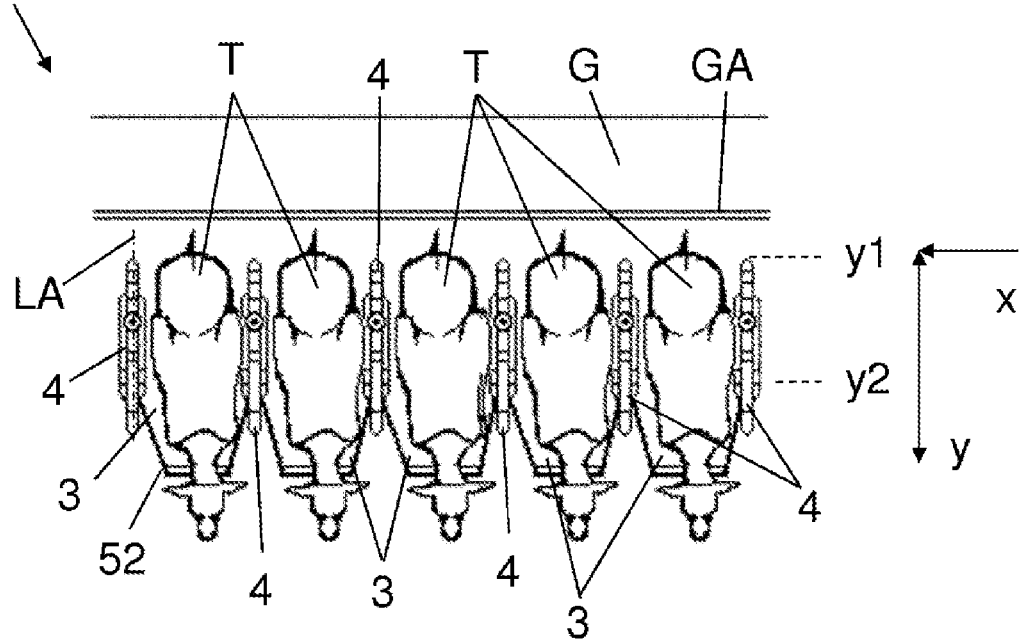

FIGS. 36 to 36c show a side-by-side milking parlor 1" with adjustable dividers 4. FIG. 36 shows a milking position y1 of the milking stalls 3 without any animals. FIG. 36a illustrates an access position y2 of the milking stalls 3 without any animals. FIG. 36b shows the access position y2 according to FIG. 36a with animals T, and FIG. 36c illustrates the milking position y1 according to FIG. 36 with animals T.

In FIGS. 36 to 36c, frames 52 are arranged between the front ends of the dividers 4 of each milking stall 3. The frames 52 may comprise, for example, the detection devices 53, 53' (FIG. 33) and also feed troughs (not shown).

In order for the divider 4 with the milking cluster 5 also to be used successfully in group milking parlors, e.g. the milking parlor 1" according to FIGS. 36-36c, a modification in relation to the fixed installation in tandem boxes (see FIG. 29) and in external rotary milking parlors (see FIG. 1) is necessary for side-by-side (see FIGS. 2-2a), steeply angled and normal fishbone milking parlors (see FIG. 28).

In the former cases, the divider 4 with the milking cluster 5 generally also serves as absolute partitioning between the milking stalls 3. It is not permissible for any animal T to get past to a milking stall 3 other than the one intended for it. Accordingly, said divider 4 does not allow throughpassage to another milking stall 3.

However, if use is made of a side-by-side or fishbone-type group milking parlor, then an animal T, in this case a cow, as it first enters the group milking parlor, has to make its way from the entrance, in an access direction x, to the furthest-away free milking stall 3 and occupy said stall. If the cow were to occupy an earlier milking stall 3, it would not be possible to fill the entire number of milking stalls 3 with cows which are to be milked. There is also the risk of the cows, which thus cannot be fixed, making use of the free space, and going looking for another milking stall 3, during the milking operation. This would interrupt the milking process and require re-attachment of the milking clusters 5.

The prior art therefore provides, in a number of forms of group milking parlor, for example in the side-by-side milking parlor, pivoting gates on each individual milking stall 3 (see FIG. 28). This makes it possible to provide the cows, during the operation of "filling the milking stalls 3", with a wider access route in the access direction x between the milking-stall partitioning and partitioning GA of the pit G for a milker M. This has an advantageous effect on animal movement, because the cows, en route to the milking stall, do not come into contact with the pit partitionings GA. This would usually be very painful and, in the long run, would result in very slow and cautious filling of the milking stalls 3. Since the design-related outlay for configuring the divider 4 in the form of a pivotable or rotatable unit may, in some circumstances, be fairly high, it would also be possible, as an alternative, for all the dividers 4 on one side of a group milking parlor to be adjusted in an adjustment direction y individually or in groups or as a unit, wherein the adjustment direction y runs in a longitudinal direction LA of the dividers 4.

If a new group of cows is to be let in, the dividers 4 are displaced from the milking position y1 into a "cow-loading position" or into the access position y2. This means that all the dividers 4 are displaced in the adjustment direction y, in the direction of the head of the animals T which are to be milked, i.e. in the longitudinal direction LA of the dividers 4. This gives rise to a greater distance between the divider 4 and pit partitioning GA, as can clearly be seen in FIGS. 36a and 36b.

During the "loading operation", the cows have sufficient space to reach the next possible milking stall 3, behind the individual partitionings, without coming into contact with the dividers 4. It may be possible, for this purpose, for each individual divider 4 to be configured such that the cows can enter first of all a sub-region of the respective milking stall 3, and it is only when the milking parlor is completely "filled up" with cows that the milking stall 3 is freed for the cow to enter in its entirety. The region which is to be freed is preferably dimensioned merely such that it is also possible for just one cow to pass through there, so that for example throughpassage-detection systems in the entrance region can also readily assign the cows to the milking stalls, which are each to be occupied one after the other.

Once all the milking stalls 3 have been occupied, the dividers 4 can then be displaced from the access position y2 into the milking position y1. For this purpose, they are displaced longitudinally LA in the adjustment direction toward the pit G/milker location. This ensures that the dividers 4 can be displaced in as close proximity as possible to the rear pit partitioning GA for the pit G. At the same time, the possibility of longitudinal adjustment of the dividers 4 along their longitudinal axis LA, the latter running essentially parallel to the longitudinal axis of the respective animal T, also makes it possible to take account of animals T of different sizes/lengths. By way of the position of the animal's legs being sensed, it would be possible here for the divider 4 to move automatically to the optimum attachment position. This would mean that the divider 4 would always be in the optimum position for the milker M, even for manual milking.

Figure 37:
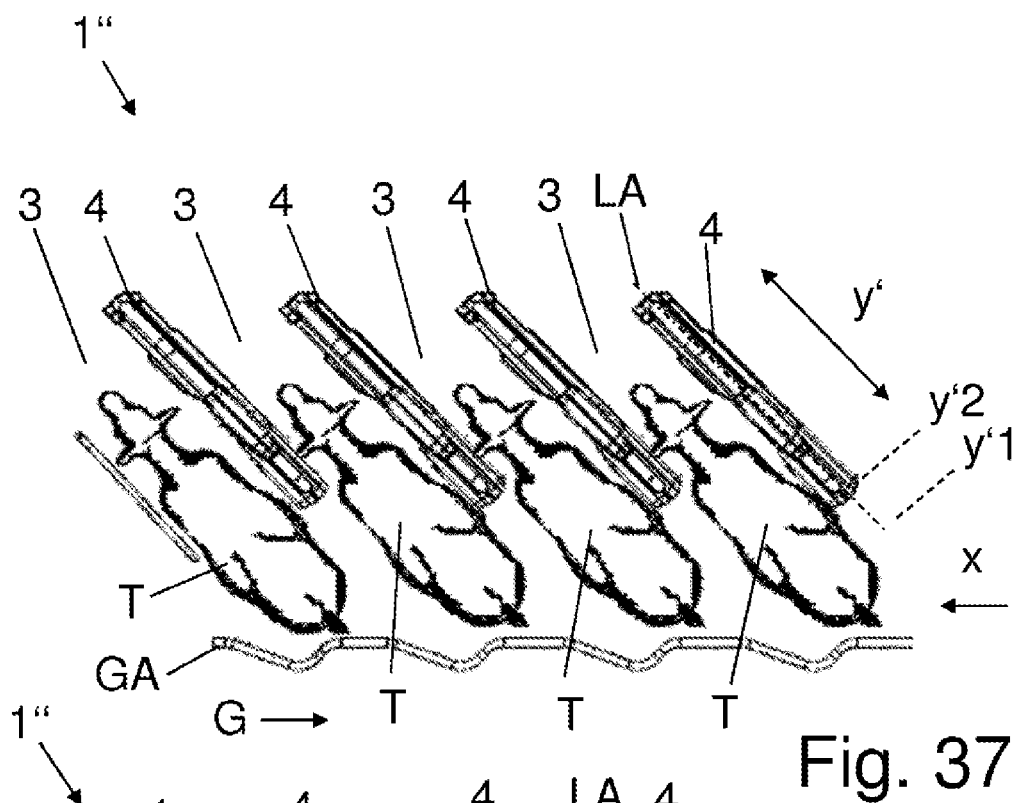
FIGS. 37-37a show a fishbone milking parlor with adjustable dividers.
Figure 37A:
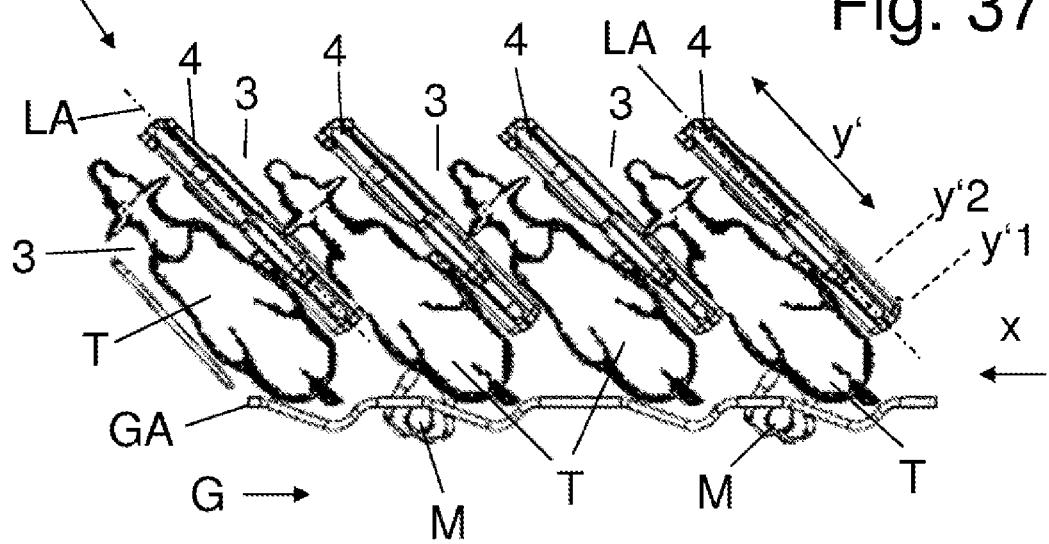

The same also applies, of course, to so-called fishbone milking parlors with the milking stalls angled by less than 90°. FIGS. 37 and 37a show a milking parlor 1" in this regard. FIG. 37 shows the access position y'2 of the dividers 4, and FIG. 37a illustrates the milking position y'1 of the dividers 4.

Here too, it is, indeed, possible to use a divider 4 in the form of a pivotable element. However, the forces to which the merely central fastening is subjected by animal contact may be considerably large. In addition, in the case of such a configuration of a milking stall 3, indexing, i.e. the correct positioning of the animal in relation to the milking cluster 5 and, possibly, the milker M being able to reach the same for manual intervention, may form a significant constituent part of the system.

For this purpose, it may also be expedient to have specific displacement between the feed trough/tray or front fixing on the head of the animal T in relation to the adjustment of the divider 4 which is to take place.

The milking position y'1 which can be achieved for the milking parlor 1" constructed in fishbone form is shown during the milking operation in FIG. 37a. The milker M is therefore also able, once again, to reach the actual milking cluster 5.

The invention is not limited to the exemplary embodiments presented above; rather, it can be modified within the context of the attached claims.

It is thus, for example, conceivable, in the case of the second exemplary embodiment of the milking parlor 1' according to the invention from FIG. 2, for a number of rows of the milking stalls 3 arranged one beside the other to be arranged one behind the other or even one above the other on a number of levels.

A further embodiment provides that the dockable drive units 9' of the variation of the first exemplary embodiment of the milking parlor 1''' according to FIG. 14 cannot be displaced on the rail 23; rather, they can each be attached, and removed, by a pivoting-arm arrangement. This is not shown, but is easily conceivable in conjunction with FIGS. 14-18.

It is possible for the position sensor 13, in a development, to supply, for example, also images relating to the state of the udder of the animal which is to be milked, and therefore to give an insight into the state of health of the animal which is to be milked.

Each milking stall 3 can be activated, or blocked off, in its own right. Even if milking stalls 3 are blocked off, the milking parlor 1 can continue operating, e.g. there is no need for the rotary milking parlor to stop.

Each milking stall 3 can be prepared individually for an animal, e.g. different predefined preliminary positions of the milking cluster 5 with the arm device 6, or individual displacement of the divider 4 along the longitudinal axis for finding the most advantageous milking and outlet positions for the respective animal. In the case of the semi-automatic version, the preliminary position of the milking cluster 5 can be adapted automatically to the animal which is to be expected in the respective milking stall 3 if a detection device (e.g. RFID) detects the respective animal which is entering the milking stall 3. Moreover, once the animal has been detected, it may be possible for preliminary positioning of the teat cups 5*a* to be carried out in adaptation to the dimensions of the udder of the animal detected.

It is also possible for each milking stall 3 to have a feed device.

In addition, it is also possible for the divider 4 to be provided in each case with two milking devices, i.e. in each case with two arm devices 6 each with a milking cluster 5, for an animal T positioned to the right of the divider 4 and one positioned to the left of the divider 4. It may be possible for a simplified divider without any milking equipment to be provided between two such dividers 4. Nevertheless, the overall installation outlay is reduced as a result.

The traction means of the arm device 6 may also be chains, toothed belts and the like.

The milking cluster can, of course, also be used for milk-producing animals with udders having a different number of teats, e.g. 2, 3 or 4 teats.

The milking parlor 1 in the form of a rotary milking parlor may be designed such that it is also possible for a number of rotations of 360° to take place for the operation of milking a certain animal, if necessary. In this case, the animal is prevented from being let out of the milking stall 3 when it arrives at the exit 8.

The service stage may be vertically adjustable, displaceable or installed in a fixed manner with displacement means. A large number of embodiments are conceivable here.

The invention claimed is:

1. A divider for a longitudinal side of a milking parlor milking stall for milking milk producing animals, the divider comprising:
   a housing having first and second lateral cladding arranged on respective lateral sides of the divider, wherein the first and second lateral cladding each have a hindquarters portion, a central portion, and a head portion laterally arranged so that the central portion is laterally between the hindquarters and head portions, wherein the hindquarters portions of the first and second lateral cladding form a service unit enclosure, and wherein the central portions of the first and second lateral claddings forms an arm enclosure that is laterally closed on one lateral side of the housing by the first lateral cladding and is open on an opposite lateral side of the housing by an opening in the second lateral cladding;
   a cover operatively joined to a rear side of the first and second lateral claddings to at least partially enclose the service unit enclosure;
   an arm for supporting a milking cluster, and the arm is adjustable between a parked position in which the arm and milking cluster are arranged in the arm enclosure and an operating position in which the milking cluster and a portion of the arm are arranged between front and hind legs of a milk-producing animal; and
   a service unit having a stationary position inside the service unit enclosure during a plurality of milking operations and a service position that is removed from the service enclosure and disconnected from all milking equipment in the milking stall, wherein the service unit includes milk channel parts, including a seal, a measuring device, and a milk sensor, wherein the service unit is releasably couplable to a plurality of quick connectors arranged in the hindquarters portion of the first and second lateral claddings.

2. The divider of claim 1, wherein the service unit includes a milk-channel frame disposed in the service unit enclosure to support at least a portion of a milk channel.

3. The divider of claim 1, and the service unit comprises:
   a central communication line connected between the service unit and a control unit that is arranged on an upper side of a central portion of the divider.

4. The divider of claim 1, wherein the arm is further adjustable between an attachment position and the parked position and the operating position, and the attachment position is predetermined to support the milking cluster in a position for an automatic attachment of the milking cluster to teats of a milk-producing animal, and the divider further comprises:
   a position sensor operatively associated with the arm and directed to obtain teat position data of the milk-producing animal.

5. The divider of claim 1, wherein the arm operating position is a fixed preliminary position defined by a stop and to support the milking cluster in the fixed preliminary position.

6. The divider of claim 1, wherein the arm comprises:
   an upper arm; and
   a lower arm coupled to the upper arm.

7. The divider of claim 1, and further comprising:
   a drive unit arranged at an above-animal position and operatively engaged with the arm.

8. The divider of claim 1, and further comprising:
   an arm device drive unit arranged beneath a milking platform elevation and the arm device drive unit is operatively engaged with the arm device.

9. The divider of claim 1, and further comprising:
   an arm drive unit releasably engaged with the arm.

10. The divider of claim 9, wherein the arm device drive unit is arranged beneath a milking platform elevation.

11. The divider of claim 1, and further comprising:
an arm drive unit including a servomotor operatively engaged with the arm.

12. The divider of claim 1, and further comprising:
an arm drive unit including a direct drive operatively engaged with the arm.

13. The divider of claim 1, and further comprising:
an arm drive unit including a torque motor operatively engaged with the arm.

14. The divider of claim 1 wherein, the arm in the parked position is arranged at least partially in a milking cluster opening defined by the divider.

15. The divider of claim 1, and further comprising:
a milking cluster cleaner joined to the divider.

16. The divider of claim 1, wherein the arm includes a parallel milking cluster guide.

17. The divider of claim 16, wherein the parallel milking cluster guide includes a plurality of rods.

18. The divider of claim 16, wherein the arm includes a plurality of parallel-guide drive elements.

19. The divider of claim 18, wherein at least one of the parallel-guide drive elements includes a connector disposed between the arm and the milking cluster.

20. The divider of claim 19, wherein the connector includes a belt.

21. The divider of claim 1, wherein the arm includes a driver.

22. The divider of claim 19, wherein the connector includes a plurality of belts.

23. The divider of claim 1, wherein the divider and the arm are preassembled into a modular unit.

24. The divider of claim 1, wherein the arm is adjusted into the parked position in a scissors movement.

25. The divider of claim 1, wherein:
the cladding includes two self-supporting half-shells.

26. The divider of claim 25, wherein the two self-supporting half-shells are hydro-formed from a stainless-steel sheet.

27. The divider of claim 1, and wherein:
the service unit is interchangeable with a second service unit.

28. The divider of claim 1, and further comprising:
transporting rollers.

29. The divider of claim 1, wherein the service unit further comprises:
a carry frame.

30. The divider of claim 1, wherein
the divider further comprises:
a second service unit having substantially the same milk channel parts and quick connectors as the service unit to alternate position and connections with the service unit.

31. The divider of claim 30, wherein the service unit further comprises:
a carry frame.

32. A milking parlor for milking milk-producing animals, having at least one divider for a longitudinal side of a milking stall, the divider comprising:
a housing having first and second lateral cladding arranged on respective lateral sides of the divider, wherein the first and second lateral cladding each have a hindquarters portion, a central portion, and a head portion laterally arranged so that the central portion is laterally between the hindquarters and head portions, wherein the hindquarters portions of the first and second lateral cladding form a service unit enclosure, and wherein the central portions of the first and second lateral claddings forms an arm enclosure that is laterally closed on one lateral side of the housing by the first lateral cladding and is open on an opposite lateral side of the housing by an opening in the second lateral cladding;
a cover operatively joined to a rear side of the housing first and second lateral claddings and disposed to at least partially enclose the service unit enclosure;
an arm for supporting a milking cluster and the arm is adjustable between a parked position in which the arm and milking cluster are in the arm enclosure and an operating position between in which the milking cluster and a portion of the arm are arranged outside of the arm enclosure; and
a service unit having a stationary position inside the service unit enclosure during a plurality of milking operations and a service position that is removed from the service enclosure and disconnected from all milking equipment in the milking stall, and the service unit comprises:
milk channel parts including;
a seal,
a measuring device,
a milk sensor,
wherein the service unit is releasably couplable to a plurality of quick connectors arranged in the hindquarters portion of the first and second lateral claddings to releasably join the service unit to the divider and a central control line.

33. The milking parlor of claim 32, wherein the milking parlor is a rotary milking parlor.

34. The milking parlor of claim 33, wherein the rotary milking parlor is an external rotary milking parlor.

35. The milking parlor of claim 32, wherein the milking parlor divider can be adjusted between the longitudinal direction of the milking stall, and an animal access position.

36. The milking parlor of claim 32, wherein the divider is adjustable between a longitudinal direction milking position and an access position, wherein an end of the divider is oriented in the direction of a partitioning of a pit for milkers and is arranged in closer proximity to the pit partitioning in the milking position than in the access position.

37. The milking parlor of claim 32, wherein the divider is adjustable with other dividers, between a longitudinal direction position and an animal access position.

38. The milking parlor of claim 35, wherein the dividers in the access position at least partially define a sub-region of the associated milking stall, and at least partially define a full milking stall in the milking position.

39. The milking parlor of claim 32, and further comprising:
a through passage-detection system joined to at least one divider.

40. A divider for a longitudinal side of a milking parlor milking stall for milking milk producing animals, the divider comprising:
a housing defining a milking cluster opening in the divider, and including first and second lateral cladding arranged on respective lateral sides of the divider, wherein the first and second lateral cladding each have a hindquarters portion, a central portion, and a head portion laterally arranged so that the central portion is laterally between the hindquarters and head portions, wherein the hindquarters portions of the first and second lateral cladding form a service unit enclosure, and wherein the central portions of the first and second lateral claddings forms an arm enclosure that is laterally closed on one lateral side of the housing by the first lateral cladding and is open on an opposite lateral side of the housing by an opening in the second lateral cladding;

an arm for supporting a milking cluster, and the arm is adjustable between a parked position in which the arm and milking cluster are arranged in the arm enclosure, and an operating position in which the milking cluster and a portion of the arm are arranged between front and hind legs of the milk-producing animal; and a service unit having a stationary position inside the service unit enclosure during a plurality of milking operations and a service position that is removed from the service enclosure and disconnected from all milking equipment in the milking stall.

* * * * *